US012297909B2

(12) United States Patent
Hoehle et al.

(10) Patent No.: US 12,297,909 B2
(45) Date of Patent: *May 13, 2025

(54) SHAFT SEAL ASSEMBLY

(71) Applicant: Inpro/Seal LLC, Rock Island, IL (US)

(72) Inventors: Neil F. Hoehle, Solon, IA (US); Chintan Shah, Bettendorf, IA (US)

(73) Assignee: Inpro/Seal LLC, Rock Island, IL (US)

(*) Notice: Subject to any disclaimer, the term of this patent is extended or adjusted under 35 U.S.C. 154(b) by 54 days.

This patent is subject to a terminal disclaimer.

(21) Appl. No.: 17/182,003

(22) Filed: Feb. 22, 2021

(65) Prior Publication Data
US 2021/0172530 A1    Jun. 10, 2021

Related U.S. Application Data

(63) Continuation of application No. 15/801,220, filed on Nov. 1, 2017, now Pat. No. 10,927,961, which is a continuation-in-part of application No. 15/134,714, filed on Apr. 21, 2016, now Pat. No. 10,364,895.

(60) Provisional application No. 62/416,082, filed on Nov. 1, 2016, provisional application No. 62/210,066, filed
(Continued)

(51) Int. Cl.
F16J 15/34    (2006.01)
F16J 15/3248  (2016.01)
F16J 15/447   (2006.01)

(52) U.S. Cl.
CPC ......... *F16J 15/447* (2013.01); *F16J 15/3248* (2013.01); *F16J 15/34* (2013.01); *F16J 15/3404* (2013.01); *F16J 15/3472* (2013.01); *F16J 15/4474* (2013.01); *F16J 15/4478* (2013.01)

(58) Field of Classification Search
CPC .... F16J 15/447; F16J 15/4474; F16J 15/4478; F16J 15/3248; F16J 15/3404; F16J 15/3472
See application file for complete search history.

(56) References Cited

U.S. PATENT DOCUMENTS

| | | |
|---|---|---|
| 2,014,859 A | 9/1935 | Mitchell, Jr. |
| 2,879,093 A | 3/1959 | Dolhum |
| (Continued) | | |

FOREIGN PATENT DOCUMENTS

| | | | |
|---|---|---|---|
| GB | 2517452 A | * 2/2015 | .............. F16C 33/80 |
| JP | 11108202 | 4/1999 | |
| (Continued) | | | |

OTHER PUBLICATIONS

European Patent Office, Extended Search Report of Jan. 2, 2019 for European application 16783864.8 from PCT/US2016/028667.
(Continued)

*Primary Examiner* — Vishal A Patel
(74) *Attorney, Agent, or Firm* — Fish & Richardson P.C.

(57) ABSTRACT

A shaft seal assembly comprises a stator configured to engage a housing and a rotor positioned within the stator. The stator may include a main body, a stator inward radial projection extending radially inward from the stator main body, and a collection groove adjacent the stator inward radial projection. The rotor may include a rotor main body and a rotor axial projection extending from the rotor main body. The rotor axial projection may be positioned adjacent a distal end of the stator inward radial projection.

16 Claims, 43 Drawing Sheets

Related U.S. Application Data on Aug. 26, 2015, provisional application No. 62/150,633, filed on Apr. 21, 2015.

(56) References Cited

U.S. PATENT DOCUMENTS

| | | | |
|---|---|---|---|
| 3,029,082 A * | 4/1962 | Horger | F16C 33/7813 |
| | | | 277/412 |
| 3,062,554 A | 11/1962 | Mcgahan et al. | |
| 3,117,792 A | 1/1964 | Glenn et al. | |
| 3,127,181 A | 3/1964 | Crego et al. | |
| 3,168,871 A | 2/1965 | Sieghartner | |
| 3,218,085 A | 11/1965 | Grace | |
| 3,583,710 A | 6/1971 | Burelle | |
| 3,602,559 A | 8/1971 | Hirschler | |
| 3,697,088 A | 10/1972 | Hummer | |
| 4,022,479 A | 5/1977 | Orlowski | |
| 4,114,902 A | 9/1978 | Orlowski | |
| 4,175,752 A | 11/1979 | Orlowski | |
| 4,304,409 A | 12/1981 | Orlowski | |
| 4,415,166 A | 11/1983 | Beia | |
| 4,460,180 A | 7/1984 | Koistinen | |
| 4,466,620 A | 8/1984 | Orlowski | |
| 4,471,964 A | 9/1984 | Kotzur | |
| 4,484,754 A | 11/1984 | Ballard | |
| 4,630,458 A | 12/1986 | Kakabaker | |
| 4,679,801 A | 7/1987 | Poloni | |
| 4,706,968 A | 11/1987 | Orlowski | |
| 4,743,034 A | 5/1988 | Kakabaker et al. | |
| 4,832,350 A | 5/1989 | Orlowski | |
| 4,890,941 A * | 1/1990 | Calafell, II | F16J 15/4474 |
| | | | 277/423 |
| 4,989,883 A | 2/1991 | Orlowski | |
| 5,024,451 A | 6/1991 | Borowski | |
| 5,028,054 A | 7/1991 | Peach | |
| 5,069,461 A * | 12/1991 | Orlowski | F16J 15/4474 |
| | | | 277/303 |
| 5,074,567 A | 12/1991 | Orlowski | |
| 5,158,304 A | 10/1992 | Orlowski | |
| 5,137,049 A | 11/1992 | Orlowski | |
| 5,161,804 A | 11/1992 | Orlowski et al. | |
| 5,174,583 A | 12/1992 | Orlowski et al. | |
| 5,221,095 A * | 6/1993 | Orlowski | F16J 15/4474 |
| | | | 277/303 |
| 5,290,047 A * | 3/1994 | Duffee | F16J 15/4474 |
| | | | 277/419 |
| 5,335,921 A | 8/1994 | Orlowski | |
| 5,378,000 A | 1/1995 | Orlowski | |
| 5,430,589 A * | 7/1995 | Moir | G11B 25/043 |
| | | | 360/97.2 |
| 5,498,006 A | 3/1996 | Orlowski | |
| 5,658,127 A | 8/1997 | Bond et al. | |
| 5,865,441 A | 2/1999 | Orlowski | |
| 5,904,356 A | 5/1999 | Mundy | |
| 5,951,020 A * | 9/1999 | Orlowski | F16J 15/4474 |
| | | | 277/423 |
| 5,957,462 A | 9/1999 | Nishiyama et al. | |
| 5,967,524 A | 10/1999 | Fedorovich | |
| 6,062,568 A | 5/2000 | Orlowski et al. | |
| 6,182,972 B1 | 2/2001 | Orlowski | |
| 6,234,489 B1 | 5/2001 | Orlowski et al. | |
| 6,311,984 B1 | 11/2001 | Orlowski | |
| 6,390,477 B1 | 5/2002 | Drago et al. | |
| 6,419,233 B2 | 7/2002 | Orlowski | |
| 6,629,816 B2 | 10/2003 | Langston et al. | |
| 7,052,014 B1 * | 5/2006 | Orlowski | F16J 15/4478 |
| | | | 277/303 |
| 7,090,403 B2 | 8/2006 | Orlowski et al. | |
| 7,396,017 B2 | 7/2008 | Orlowski et al. | |
| 7,521,827 B2 | 4/2009 | Orlowski et al. | |
| 7,631,878 B1 | 12/2009 | Orlowski et al. | |
| 7,726,661 B2 | 6/2010 | Orlowski et al. | |
| 7,839,294 B2 | 11/2010 | Orlowski et al. | |
| 8,047,548 B2 * | 11/2011 | Roddis | F16J 15/344 |
| | | | 384/477 |
| 8,130,113 B1 | 3/2012 | Orlowski et al. | |
| 8,604,653 B2 | 12/2013 | Orlowski et al. | |
| 8,664,812 B2 | 3/2014 | Vicars et al. | |
| 8,979,093 B2 | 3/2015 | Orlowski et al. | |
| 9,004,491 B2 | 4/2015 | Orlowski et al. | |
| 9,048,603 B2 | 6/2015 | Vicars et al. | |
| 9,071,092 B2 | 6/2015 | Hoehle et al. | |
| 10,206,036 B1 | 2/2019 | Feng et al. | |
| 10,364,895 B2 | 7/2019 | Shah et al. | |
| 10,927,961 B2 | 2/2021 | Hoehle et al. | |
| 11,002,362 B2 | 5/2021 | Hoehle et al. | |
| 2002/0167131 A1 | 11/2002 | Orlowski et al. | |
| 2003/0141668 A1 * | 7/2003 | Tones | F16J 15/4478 |
| | | | 277/413 |
| 2008/0078648 A1 | 4/2008 | Orlowski et al. | |
| 2011/0109047 A1 * | 5/2011 | Tones | F16J 15/3244 |
| | | | 277/412 |
| 2014/0183998 A1 | 7/2014 | Hoehle et al. | |
| 2016/0208857 A1 * | 7/2016 | Rea | F16J 15/3264 |
| 2016/0369895 A1 * | 12/2016 | Hoehle | F16J 15/4478 |
| 2018/0073640 A1 | 3/2018 | Hoehle et al. | |

FOREIGN PATENT DOCUMENTS

| | | |
|---|---|---|
| TW | 201405035 | 1/2014 |
| WO | WO 0011380 | 3/2000 |
| WO | WO 2007001525 | 1/2007 |
| WO | WO 2014100515 | 6/2014 |

OTHER PUBLICATIONS

PCT/US2016/028667, ISR & Opinion, International Searching Authority, Korean Intellectual Property Office, Aug. 4, 2016.

Taiwan Patent Office, Office Action with Taiwan attorney summary and comments, about May 16, 2017, for Shaft Seal Assembly application 105112368.

* cited by examiner

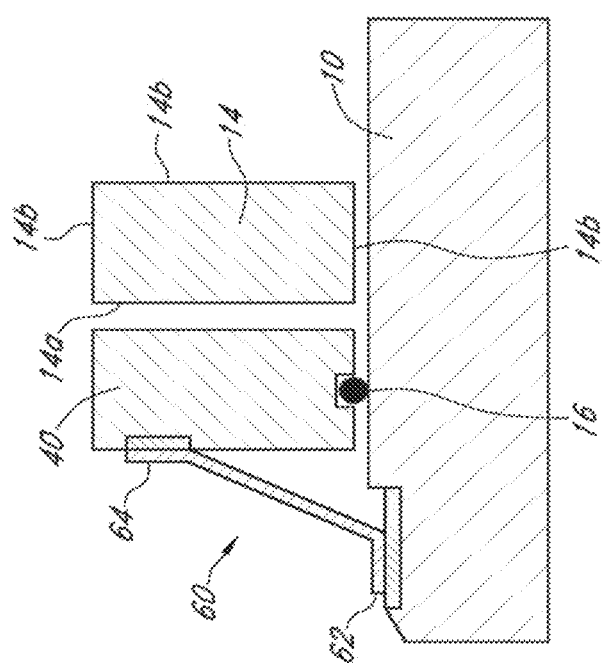

SHAFT SEAL ASSEMBLY

CROSS REFERENCE TO RELATED APPLICATIONS

This application is a continuation application of and claims priority under 35 U.S.C. § 120 to U.S. application Ser. No. 15/801,220, filed on Nov. 1, 2017, which claims priority to U.S. Application Ser. No. 62/416,082, filed Nov. 1, 2016, and is a continuation-in-part and claims priority to U.S. application Ser. No. 15/134,714, filed on Apr. 21, 2016 and U.S. Application Ser. No. 62/210,066, filed on Aug. 26, 2015 and U.S. Application Ser. No. 62/150,633, filed on Apr. 21, 2015, each of which are incorporated by reference herein in their entireties.

FIELD OF THE INVENTION

The present invention relates to a shaft seal assembly and/or bearing isolator with multiple embodiments. In certain embodiments, the shaft seal assembly may be used as a product seal between a product vessel and a shaft therein.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

BACKGROUND OF THE INVENTION

For years there have been a multitude of attempts and ideas for providing a satisfactory seal when a rotatable shaft is angularly misaligned resulting in run out of the shaft. Typically the solutions presented have failed to provide an adequate seal while allowing for an acceptable amount of shaft misalignment during operation. The problem is especially acute in product seals where the potential for shaft to bore misalignment may be maximized. A typical solution in the prior art is to increase the operating clearance between the rotating shaft and sealing members to create a "loose" clearance or operating condition. "Loose" running for adjustment or response to operational conditions, especially misalignment of the shaft with respect to the stator or stationary member, however, typically reduces or lowers the efficiency and efficacy of sealing members.

Labyrinth seals, for example, have been in common use for many years for application to sealing rotatable shafts. A few of the advantages of labyrinth seals over contact seals are increased wear resistance, extended operating life and reduced power consumption during use. Labyrinth seals, however, also depend on a close and defined clearance with the rotatable shaft for proper function. Shaft misalignment is also a problem with "contact" seals because the contact between the seal and misaligned shaft typically results in greater wear. Abrasiveness of the product also affects the wear pattern and the useful life of the contact seals.

Prior attempts to use fluid pressure (either vapor or liquid) to seal both liquid and solid materials in combination with sealing members such as labyrinth seals or contact seals have not been entirely satisfactory because of the "tight" or low clearance necessary to create the required pressure differential between the seal and the product on the other side of the seal (i.e., the tighter the seal, the lower the volume of fluid required to maintain the seal against the external pressure of material.) Another weakness in the prior art is that many product seals expose the movable intermeshed sealing faces or surfaces of the product seal to the product resulting in aggressive wear and poor reliability. Furthermore, for certain applications, the product seal may need to be removed entirely from the shaft seal assembly for cleaning, because of product exposure to the sealing faces or surfaces.

The prior art then has failed to provide a solution that allows both a "tight" running clearance between the seal members and the stationary member for efficacious sealing and a "loose" running clearance for adjustment or response to operational conditions especially misalignment of the rotatable shaft with respect to the stator or stationary member.

BRIEF DESCRIPTION OF THE DRAWINGS

The accompanying drawings, which are incorporated in and constitute a part of this specification, illustrate embodiments and together with the description, serve to explain the principles of the shoe covering.

FIG. 27B is an axial, cross-sectional view of a portion of the embodiment of a porous media shaft seal assembly shown in FIG. 27A.

DETAILED DESCRIPTION—ELEMENT LISTING (FIGS. 1-12)

Figure 2:
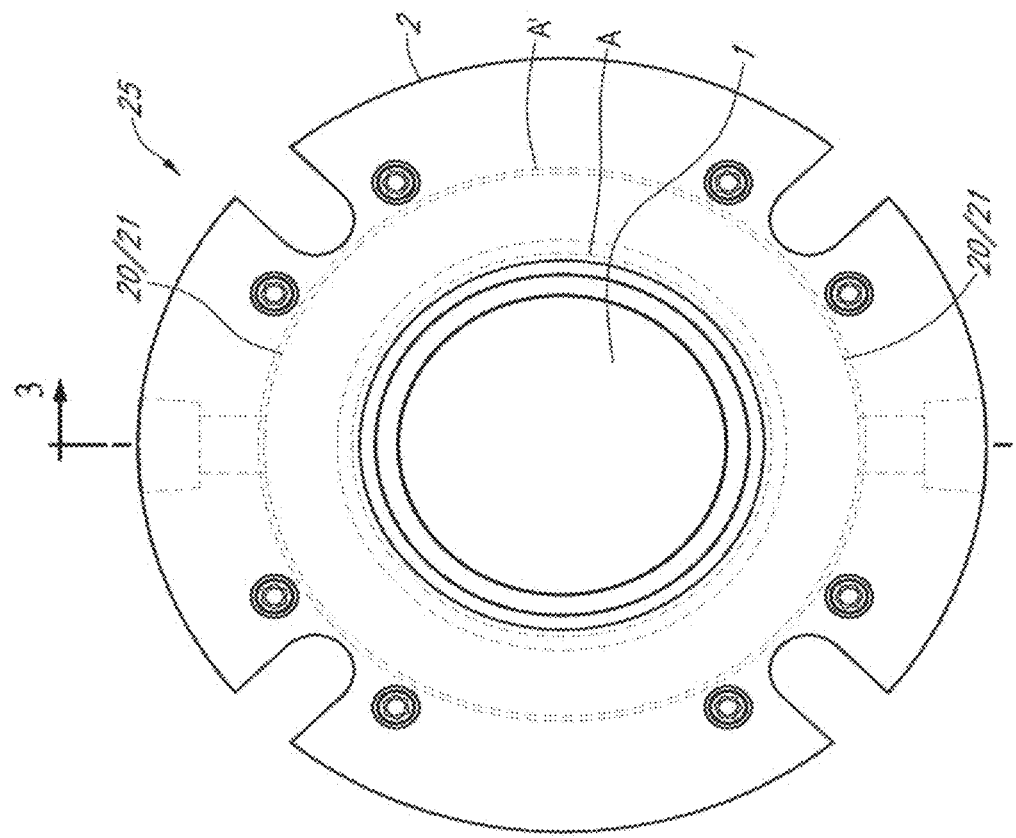
FIG. 2 is an exterior end view of the embodiment of a shaft seal assembly shown in FIG. 1 with the shaft element aligned.

| Description | Element No. |
| --- | --- |
| Shaft | 1 |
| Fixed stator | 2 |
| Fixed stator (part-line) | 2a |
| Labyrinth seal | 3 |
| Radiused face | 3a |
| Floating stator | 4 |
| Fluid return pathway | 5 |
| Shaft seal clearance | 6 |
| First o-ring | 7 |
| Anti-rotation pin | 8 |
| Vent | 9 |
| Anti-rotation groove (floating stator) | 10 |
| Spherical interface | 11 |
| Anti-rotation pin | 12 |
| Second o-ring | 13 |
| Labyrinth seal pattern grooves | 14 |
| First o-ring channel | 15 |
| Cavity for anti-rotation device (fixed stator) | 16 |
| Axial face of labyrinth seal | 17 |
| Axial face of floating stator | 18 |
| Second o-ring channel | 19 |
| First clearance between floating stator/fixed stator | 20 |
| Second clearance between floating stator/fixed stator | 21 |
| Throttle groove | 22 |
| Labyrinth pattern annular groove | 23 |
| Sleeve | 24 |
| Shaft seal assembly | 25 |
| Throttle (alignment skate) | 26 |
| Floating stator annular groove | 27 |
| Labyrinth seal passage | 28 |
| Floating stator passage | 29 |
| Housing | 30 |
| Angle of misalignment | 31 |
| Bearings and bearing cavity | 32 |
| Mounting bolts | 33 |
| Vessel wall | 34 |
| Pressure balanced shaft seal assembly | 40 |
| Labyrinth seal interior face | 42 |
| Floating stator interior face | 44 |
| Pressure balancing annular channel | 46 |
| First radial interface | 47a |
| Second radial interface | 47b |
| Fixed stator annular groove | 48 |
| Annular groove radial-interior surface | 48a |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Furthermore, any dimensions recited or called out herein are for exemplary purposes only and are not meant to limit the scope of the invention in any way unless so recited in the claims.

Figure 4:
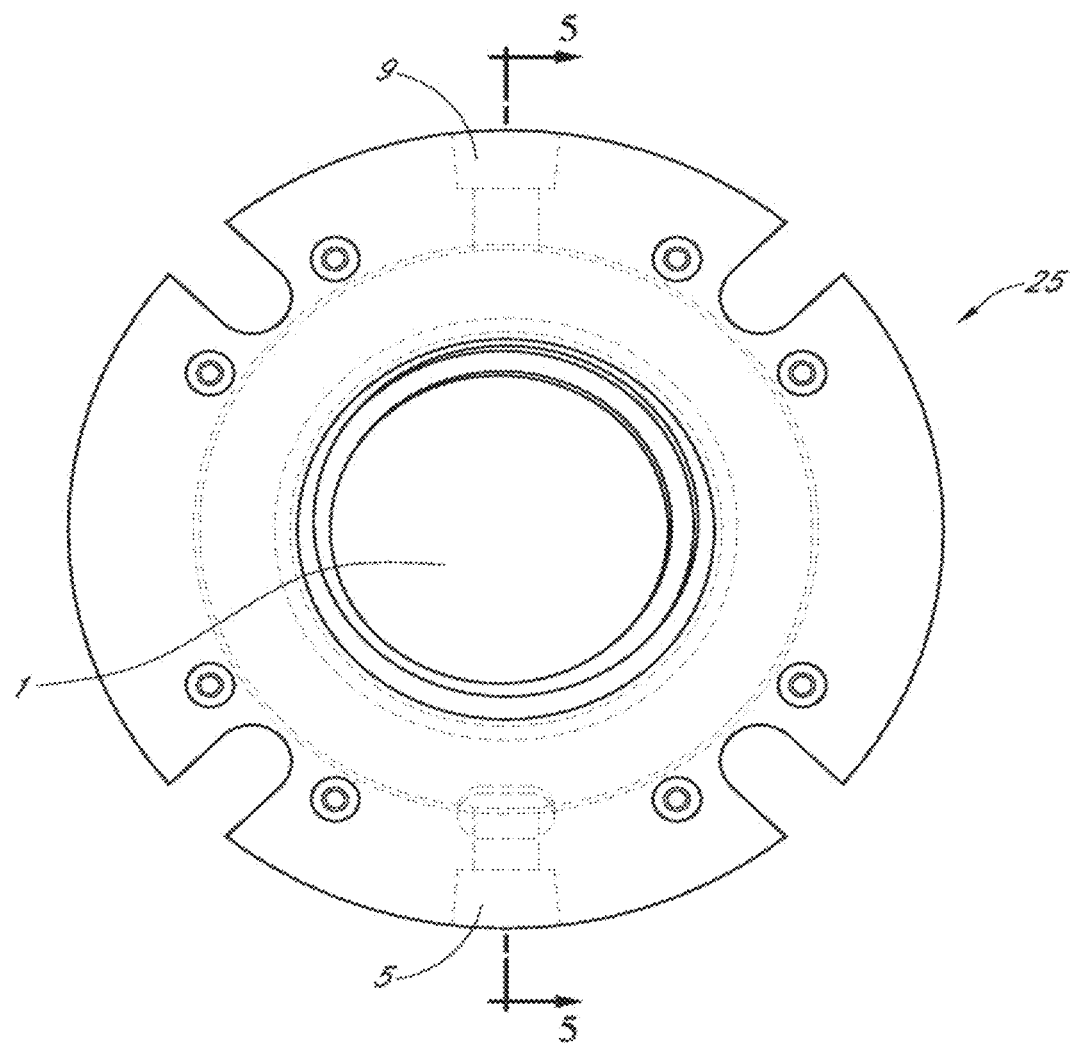
FIG. 4 is an exterior end view of the first illustrative embodiment of a shaft seal assembly with the shaft misaligned.
Figure 5:
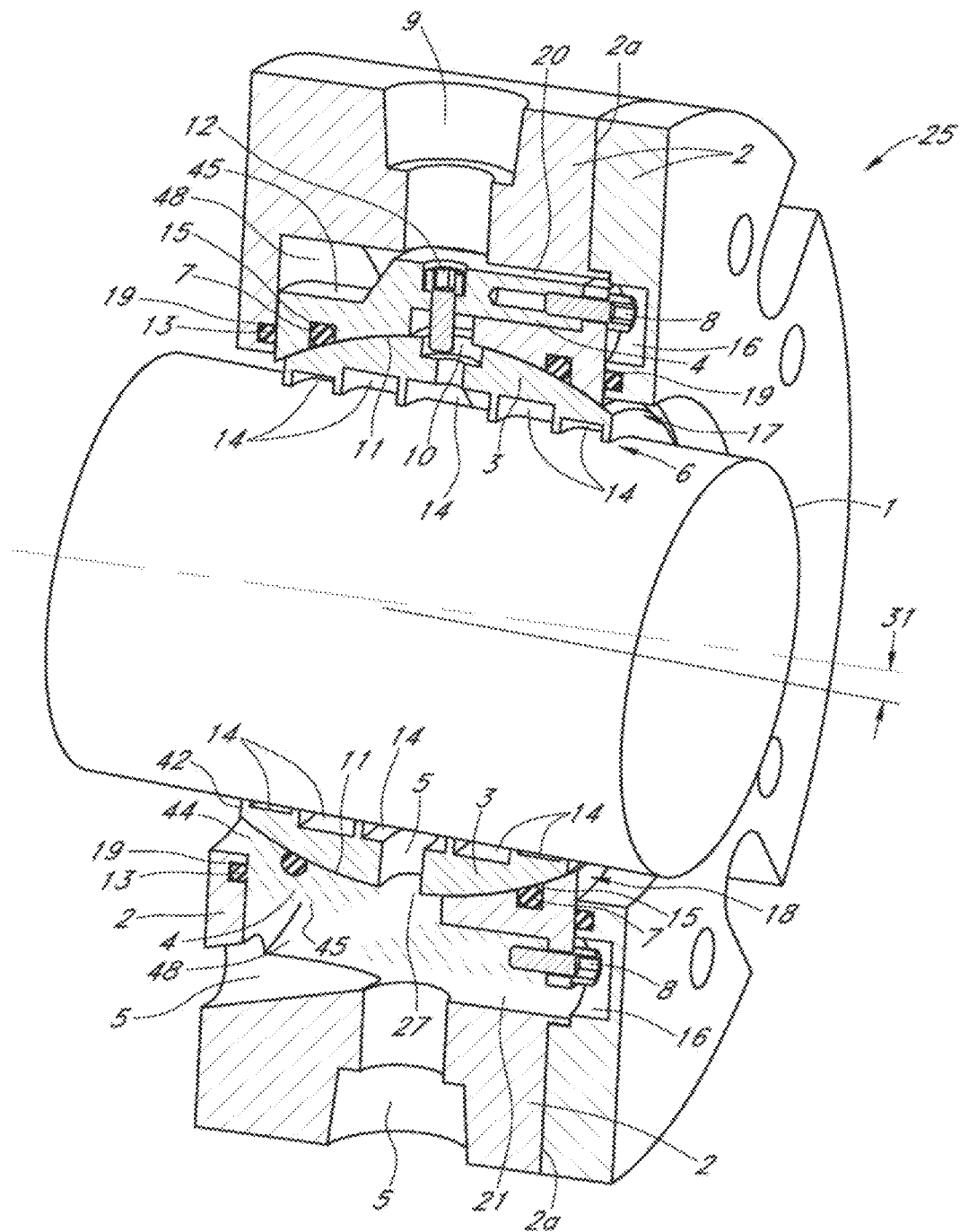
FIG. 5 is a cross-sectional view of the first embodiment of a shaft seal assembly as shown in FIG. 3 during both angular and radial misalignment of the shaft.
Figure 6:
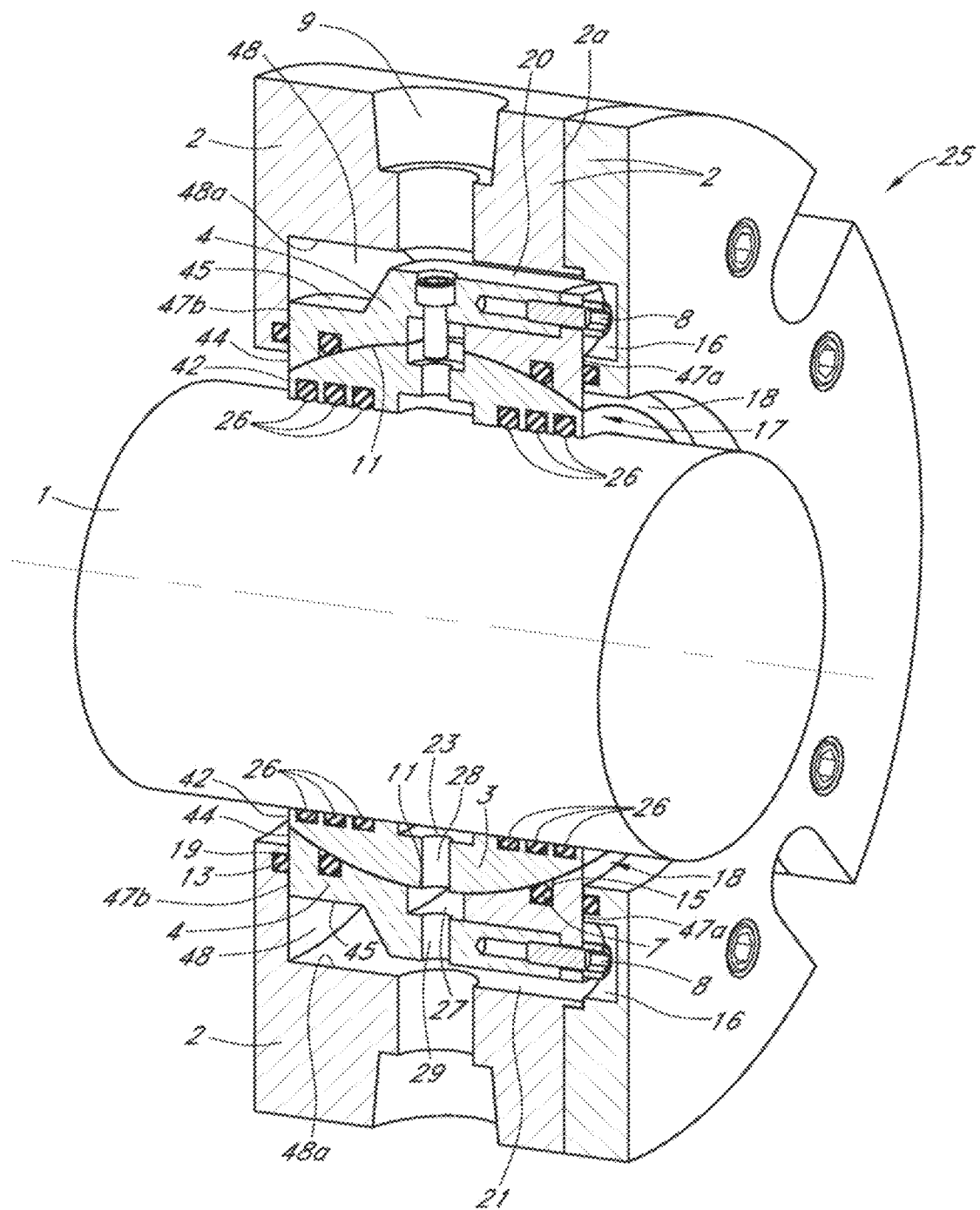
FIG. 6 is a cross-sectional view of a second embodiment of a shaft seal assembly
Figure 7:
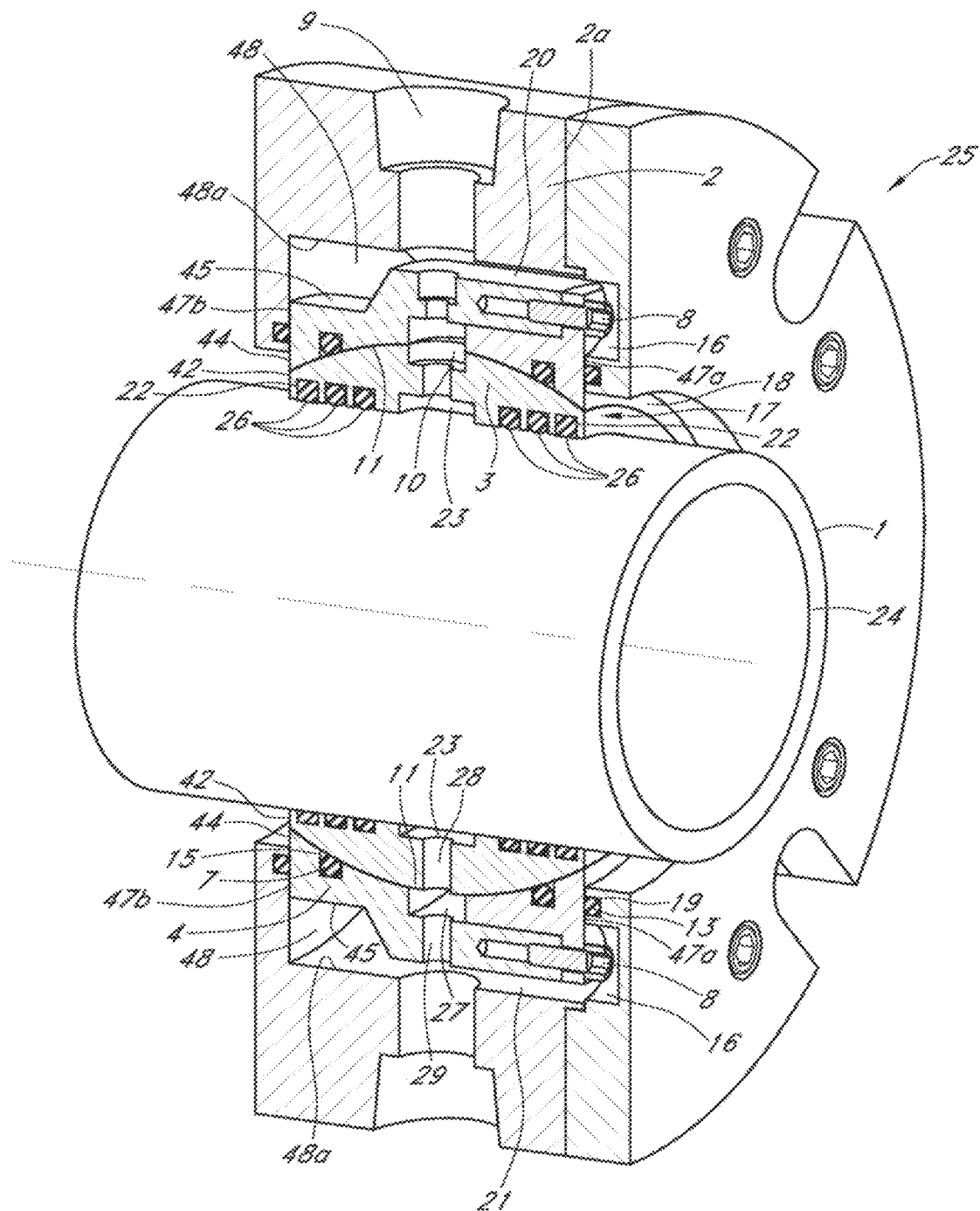
FIG. 7 is a cross-sectional view of a third embodiment of a shaft seal assembly.

FIGS. 1-5 provide a view of a first embodiment of the shaft seal assembly 25 that allows for sealing various lubricating solutions within bearing housing 30. FIGS. 6 and 7 provide alternative embodiments of the shaft seal assembly 25 wherein sealing fluids are used. Applicant herein defines sealing fluids to include both liquids and vapors. Applicant considers air, nitrogen, water and steam as well as any other fluid which may work with the proposed shaft seal assembly to provide a pressurized fluid barrier for any and all embodiments disclosed herein to be within the purview of the present disclosure. The gas or fluid chosen is based on process suitability with the product to be sealed.

Figure 1:
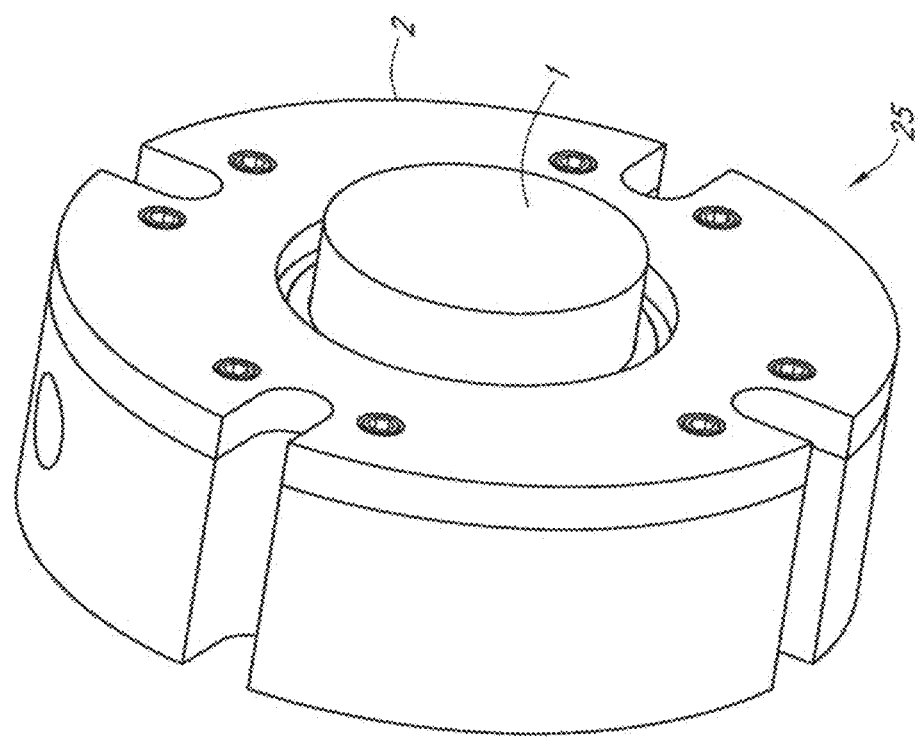
FIG. 1 is a perspective exterior view of an illustrative embodiment of a shaft seal assembly.

FIG. 1 is a perspective exterior view of the shaft seal assembly 25 arranged and engaged with a shaft 1 inserted through the fixed stator 2 of shaft seal assembly 25. FIG. 2 is an exterior end view of the shaft seal assembly with shaft 1 aligned within the shaft seal assembly 25.

Figure 3:
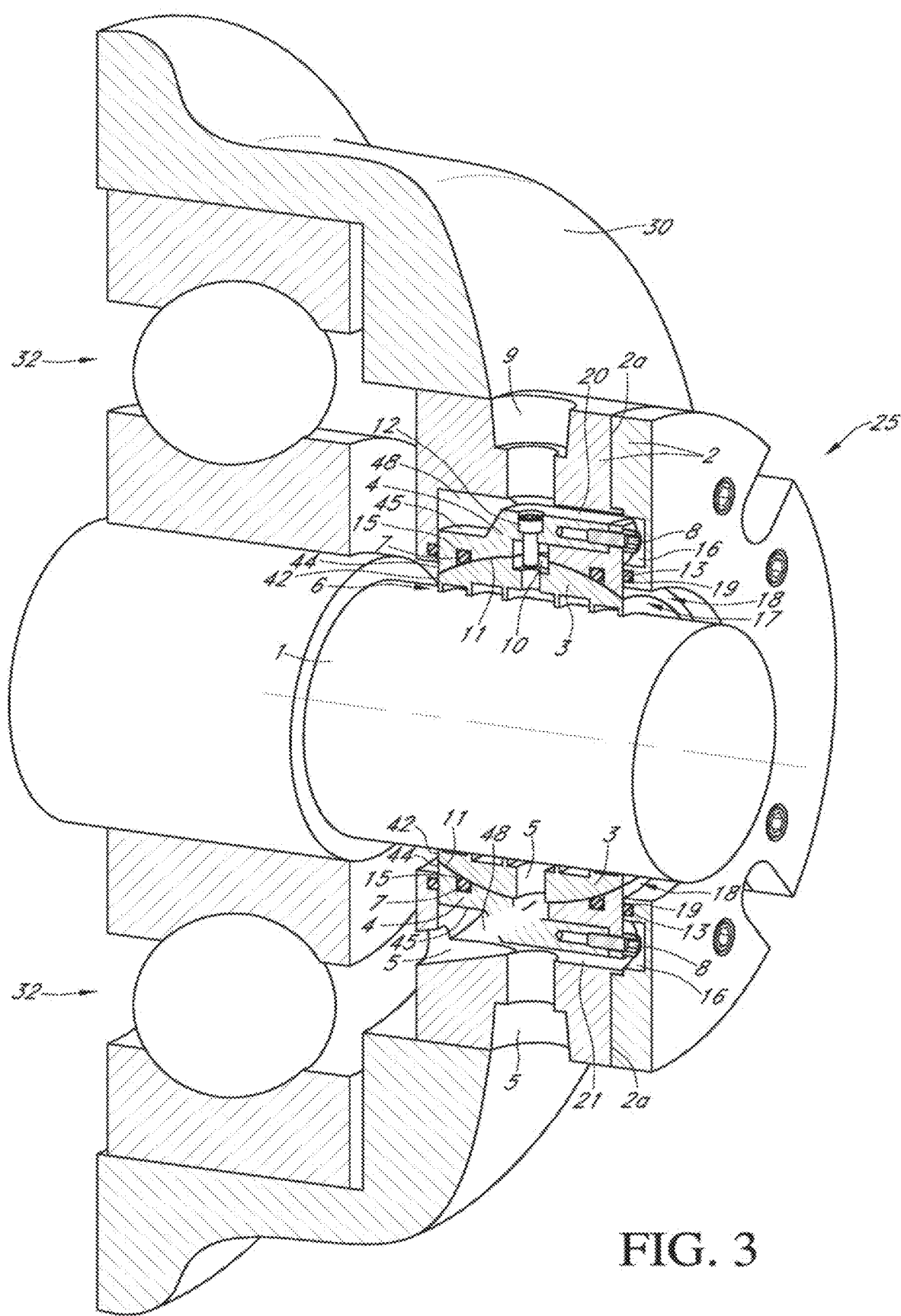
FIG. 3 is a cross-sectional view of a first embodiment of the shaft seal assembly, as shown in FIG. 2 and mounted to a housing.

FIG. 3 is a sectional view of a first embodiment of the shaft seal assembly 25 shown in FIG. 2 illustrating the shaft seal assembly 25 as a labyrinth seal for retaining lubrication solution within the bearing cavity 32 of housing 30. The shaft 1 shown in FIG. 3 is the type which may experience radial, angular or axial movement relative to the fixed stator element or portion of the fixed stator 2 during rotation. The fixed stator portion of the shaft seal assembly 25 may be flange-mounted or press-fit or attached by other means to a housing 30. The invention will also function with a rotating housing and stationary shaft. (Not shown) As required by the particular application, the shaft 1 is allowed to move freely in the axial direction in relation to the shaft seal assembly 25.

A labyrinth seal 3 having an interior surface is engaged with shaft 1. A defined clearance 6 exists between the interior surface of said labyrinth seal 3 and the shaft 1. Opposite the interior surface of said labyrinth seal 3 is the radiused surface 3a of said labyrinth seal 3. The radiused surface 3a of the labyrinth seal 3 and the interior of the floating stator 4 forms a spherical interface 11. O-ring channels 15 and o-rings 7 are disposed to cooperate with said radiused surface 3a of said labyrinth seal 3 to seal (or trap) fluid migration through, between and along engaged labyrinth seal 3 and floating stator 4 while maintaining spherical interface 11 which allows limited relative rotational movement (articulation) between labyrinth seal 3 and floating stator 4. O-ring channels 15, as shown, are machined into the floating stator 4 and positioned at the spherical interface 11 with labyrinth seal 3. O-ring channels 15 are annular and continuous in relation to labyrinth seal 3. The o-ring channel 15 and o-ring 7 may also be placed in the labyrinth seal 3 adjacent the spherical interface 11. O-rings 7 should be made of materials that are compatible with both the product to be sealed and the preferred sealing fluid chosen. O-ring channels 15 and o-rings 7 are one possible combination of sealing means that may be used within the shaft seal assembly 25 as recited in the claims. Strategically placed anti-rotation pin(s) 12 inserted into anti-rotation grooves 10 limit relative rotational movement between labyrinth seal 3 and floating stator 4. A plurality of anti-rotation grooves 10 and pins 12 may be placed around the radius of the shaft 1. If the shaft seal assembly 25 is used in combination with a sealing fluid, strategic anti-rotation pins 12 may be removed allowing corresponding anti-rotation grooves 10 to serve as a fluid passage through vent 9 and lubricant return 5. (See FIG. 7) Additionally, the relationship of the diameters of anti-rotation pins 12 and anti-rotation grooves 10 may be selected to allow more or less angular misalignment of the shaft 1. A small diameter anti-rotation pin 12 used with a large diameter anti-rotation groove 10 would allow for greater relative movement of the labyrinth seal 3 in relation to the floating stator 4 in response to angular misalignment of shaft 1. Labyrinth seal 3 is one possible embodiment of a sealing means that may be used adjacent to the shaft 1 within the shaft seal assembly 25 as recited in the claims.

A continuous annular channel is formed within fixed stator 2 and defined by clearance 20 and 21 as allowed between the exterior of said floating stator 4 and said interior of said fixed stator 2 of shaft seal assembly 25. The annular channel of fixed stator 2 is highlighted as A-A' in FIG. 2. The annular channel of the fixed stator has interior surfaces which are substantially perpendicular to said shaft 1. The exterior surfaces of the floating stator 4, which is substantially encompassed within the annular channel of the fixed stator 2, cooperatively engage with the first and second interior perpendicular faces of the fixed stator 2. An inner annular interface is formed by the first (shaft seal assembly inboard side) perpendicular annular channel surface of the fixed stator 2 engaging with the first (inboard side) perpendicular face of the floating stator 4. An outer annular interface is formed by the second (shaft seal assembly outboard side) perpendicular annular interior channel surface of the fixed stator 2 engaging with the second (outboard side) perpendicular face of the floating stator 4. O-ring channels 19 and o-rings 13 disposed therein cooperate with the surfaces of floating stator 4 which are in perpendicular to relation to shaft 1 to seal (or trap) fluid migration between and along engaged floating stator 4 while allowing limited relative rotational movement between floating stator 4 and fixed stator 2. Floating stator 4 and fixed stator 2 are one possible embodiment of cooperatively engaged sealing means that may be used in combination with labyrinth seal 3 within the shaft seal assembly 25 as recited in the claims.

O-ring channels 19 are annular and continuous in relation to shaft 1. The o-ring channels 19 and o-rings 13 may be placed in the body of the floating stator 4 instead of the fixed stator 2 (not shown) but must be placed in similar proximal relation. O-rings 13 should be made of materials that are compatible with both the product to be sealed and the preferred sealing fluid chosen. O-ring channels 19 and o-rings 13 are one possible combination of sealing means that may be used within the shaft seal assembly 25 as recited in the claims.

Strategically placed anti-rotation pin(s) 8 inserted into anti-rotation groove(s) 16 limit both relative radial and rotational movement between floating stator 4 and interior side of fixed stator 2. A plurality of anti-rotation grooves 16 and pins 8 may be placed around the radius of the shaft 1. The relationship of the diameters of anti-rotation pins 8 and anti-rotation grooves 16 may also be selected to allow more or less angular misalignment of the shaft. A small diameter anti-rotation pin 8 and large diameter fixed stator anti-rotation groove allow for greater relative movement of the labyrinth seal 3 in response to angular misalignment of shaft 1.

The labyrinth pattern seal grooves 14 may be pressure equalized by venting through one or more vents 9. If so desired, the vents may be supplied with a pressurized sealing fluid to over-pressurize the labyrinth area 14 and shaft seal clearance 6 to increase the efficacy of shaft seal assembly 25. A spherical interface 11 between the labyrinth seal 3 and the floating stator 4 allow for angular misalignment between the shaft 1 and fixed stator 2. O-ring channels 19 are annular with the shaft 1 and, as shown, are machined into the fixed stator 2 and positioned at the interface between the fixed stator 2 and floating stator 4. O-ring channel 19 may also be placed in the floating stator 4 for sealing contact with the fixed stator 2.

Figure 3A:
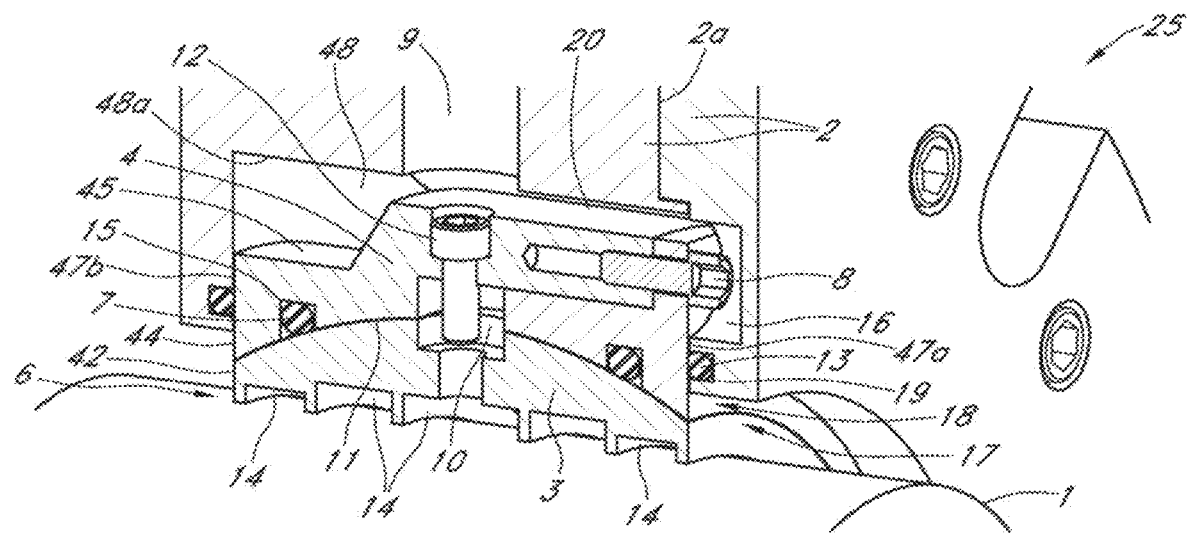
FIG. 3A provides a detailed view of a top portion of the first embodiment of a shaft seal assembly during angular and radial shaft alignment.
Figure 3B:
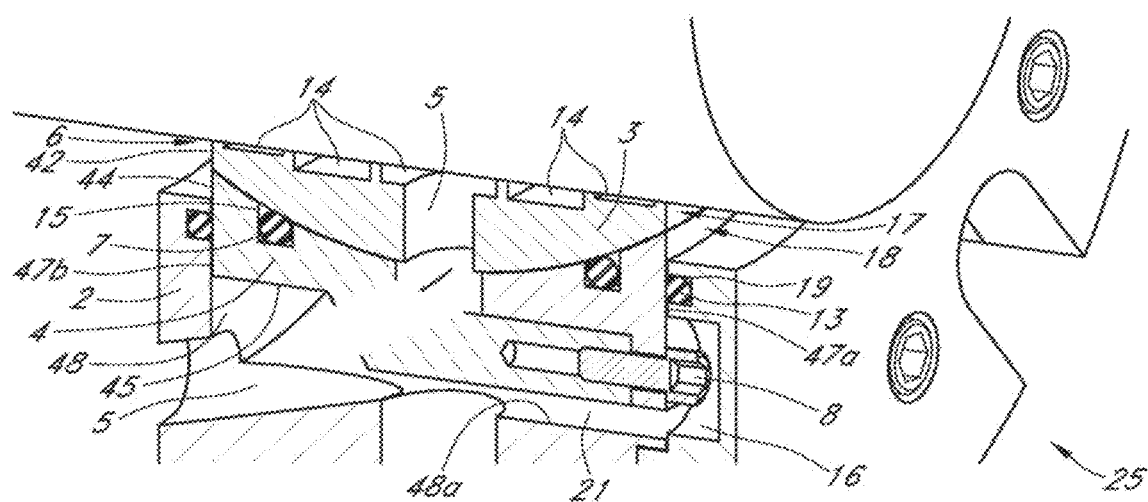
FIG. 3B provides a detailed view of a bottom portion of the first embodiment of a shaft seal assembly during angular and radial shaft alignment.

FIG. 3A illustrates seal-shaft integrity during angular and radial shaft alignment. This view highlights the alignment of the axial face 17 of the labyrinth seal 3 and the axial face 18 of the floating stator 4. Particular focus is drawn to the alignment of the axial faces 17 and 18 at the spherical interface 11 between the floating stator 4 and labyrinth 3. FIG. 3B illustrates the shaft-seal integrity during angular and radial shaft alignment at the surface opposite that shown in FIG. 3A. This view highlights the alignment of the axial faces 17 and 18 of labyrinth seal 3 and floating stator 4, respectively, for the opposite portion of the shaft seal assembly 25 as shown in FIG. 3A. Those practiced in the arts will appreciate that because the shaft 1 and shaft seal assembly 25 are of a circular shape and nature, the surfaces are shown 360 degrees around shaft 1. Again, particular focus is drawn to the alignment of the axial faces 17 and 18 at the spherical interface 11 between the labyrinth seal 3 and floating stator 4. FIGS. 3A and 3B also illustrate the first defined clearance 20 between the floating stator 4 and the fixed stator 2 and the second defined clearance 21 between the floating stator 4 and fixed stator 2 and opposite the first defined clearance 20.

In FIGS. 2, 3, 3A and 3B, the shaft 1 is not experiencing radial, angular or axial movement and the width of the defined clearances 20 and 21, which are substantially equal, indicate little movement or misalignment upon the floating stator 4.

FIG. 4 is an exterior end view of the shaft seal assembly 25 with the rotatable shaft 1 misaligned therein. FIG. 5 is a sectional view of the first embodiment of the shaft seal assembly 25 as shown in FIG. 3 with both angular and radial misalignment of the shaft 1 applied. The shaft 1 as shown in FIG. 5 is also of the type which may experience radial, angular or axial movement relative to the fixed stator 2 portion of the shaft seal assembly 25.

As shown at FIG. 5, the defined radial clearance 6 of labyrinth seal 3 with shaft 1 has been maintained even though the angle of shaft misalignment 31 has changed. The shaft 1 is still allowed to move freely in the axial direction even though the angle of shaft misalignment 31 has changed. The arrangement of the shaft seal assembly 25 allows the labyrinth seal 3 to move with the floating stator 4 upon introduction of radial movement of said shaft 1. The labyrinth seal 3 and floating stator 4 are secured together by one or more compressed o-rings 7. Rotation of the labyrinth seal 3 within the floating stator 4 is prevented by anti-rotation means which may include a screws, pins or similar devices 12 to inhibit rotation. Rotation of the labyrinth seal 3 and floating stator 4 assembly within the fixed stator 2 is prevented by anti-rotation pins 8. The pins as shown in FIGS. 3, 3A, 3B, 5, 6 and 7 are one means of preventing rotation of the labyrinth seal 3 and floating stator 4, as recited in the claims. Lubricant or other media to be sealed by the labyrinth seal 3 may be collected and drained through a series of one or more optional drains or lubricant return pathways 5. The labyrinth seal 3 may be pressure equalized by venting through one or more vents 9. If so desired, the vents 9 may be supplied with pressurized air or other gas or fluid media to over-pressurize the labyrinth seal 3 to increase seal efficacy. The combination of close tolerances between the cooperatively engaged mechanical portions of the shaft seal assembly 25 and pressurized sealing fluid inhibit product and contaminate contact with the internals of the shaft seal assembly 25. The spherical interface 11 between the labyrinth seal 3 and the floating stator 4 allow for angular misalignment between the shaft 1 and fixed stator 2. O-ring channel 19 and o-ring 13 disposed therein cooperate with the opposing faces of the floating stator 4, which are substantially in perpendicular relation to shaft 1, to seal (or trap) fluid migration between and along engaged floating stator 4 while allowing limited relative radial (vertical) movement between stator 4 and fixed stator 2.

Figure 5A:
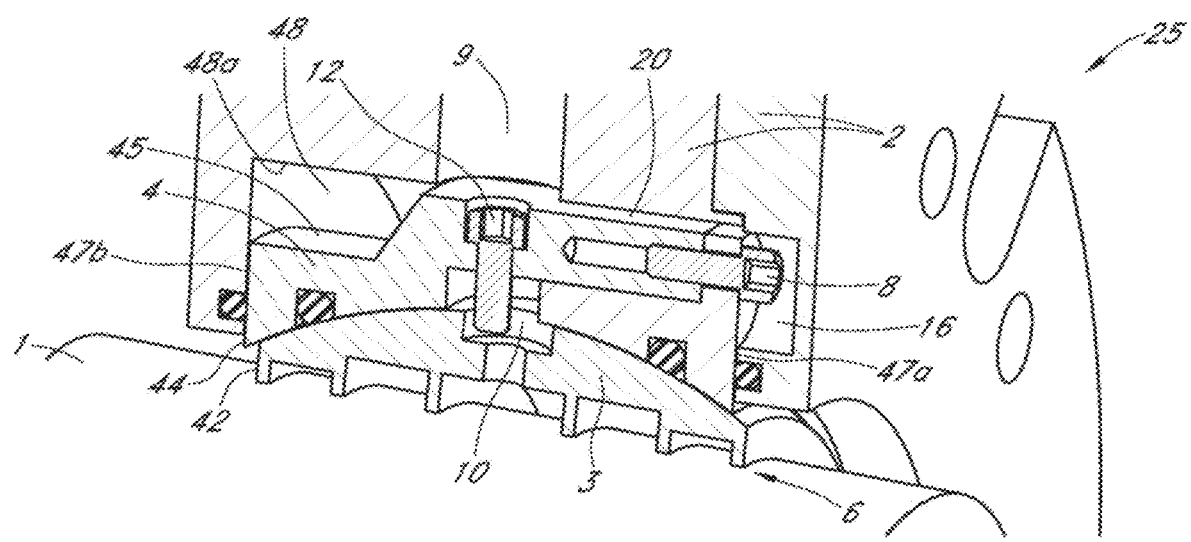
FIG. 5A provides a detailed view of a top portion of the first embodiment of a shaft seal assembly during angular and radial shaft misalignment.

FIG. 5A illustrates seal-shaft integrity allowed by the shaft seal assembly 25 during angular and radial shaft misalignment. This view highlights the offset or articulation of the axial faces 17 of the labyrinth seal in relation the axial faces 18 of the floating stator 4 for a first portion of the shaft seal assembly 25. Particular focus is drawn to the offset of the axial faces 17 and 18 at the spherical interface 11 between labyrinth seal 3 and floating stator 4.

Figure 5B:
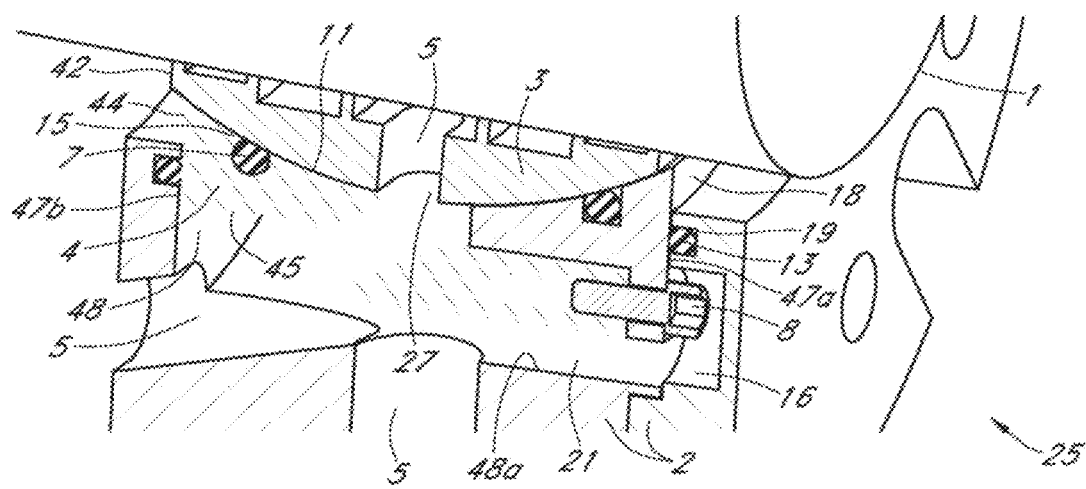
FIG. 5B provides a detailed view of a top portion of the first embodiment of a shaft seal assembly during angular and radial shaft misalignment.

FIG. 5B illustrates seal-shaft integrity for a second surface, opposite the first surface shown in FIG. 5A, during angular and radial shaft misalignment. This view highlights that during misalignment of shaft 1, axial faces 17 and 18, of the labyrinth seal 3 and floating stator 4, respectively, are not aligned but instead move (articulate) in relation to each other. The shaft to seal clearance 6 is maintained in response to the shaft misalignment and the overall seal integrity is not compromised because the seal integrity of the floating stator 4 to fixed stator 2 and the floating stator 4 to labyrinth seal 3 are maintained during shaft misalignment. Those practiced in the arts will appreciate that because the shaft 1 and shaft seal assembly 25 are of a circular shape and nature, the surfaces are shown 360 degrees around shaft 1.

FIGS. 5A and 5B also illustrate the first clearance or gap 20 between the floating stator 4 and the fixed stator 2 and the second clearance or gap 21 between the floating stator 4 and fixed stator 2 and opposite the first clearance or gap 20.

In FIGS. 4, 5, 5A and 5B, the shaft 1 is experiencing radial, angular or axial movement during rotation of the shaft 1 and the width of the gaps or clearances 20 and 21, have changed in response to said radial, angular or axial movement. (Compare to FIGS. 3, 3A and 3B.) The change in width of clearance 20 and 21 indicate the floating stator 4 has moved in response to the movement or angular misalignment of shaft 1. The shaft seal assembly 25 allows articulation between axial faces 17 and 18, maintenance of spherical interface 11 and radial movement at first and second clearance, 20 and 21, respectively, while maintaining shaft seal clearance 6.

FIG. 6 is a sectional view of a second embodiment of the shaft seal assembly 25 as shown in FIG. 2 for over-pressurization with alternative labyrinth seal pattern grooves 14. In this figure the labyrinth seal pattern grooves 14 are composed of a friction reducing substance such as polytetrafluoroethylene (PTFE) that forms a close clearance to the shaft 1. PTFE is also sometimes referred to as Teflon® which is manufactured and marketed by Dupont. PTFE is a plastic with high chemical resistance, low and high temperature capability, resistance to weathering, low friction, electrical and thermal insulation, and "slipperiness." The "slipperiness" of the material may also be defined as lubricous or adding a lubricous type quality to the material. Carbon or other materials may be substituted for PTFE to provide the necessary sealing qualities and lubricous qualities for labyrinth seal pattern grooves 14.

Pressurized sealing fluids are supplied to over-pressurize the lubricious labyrinth pattern 26 as shown in FIG. 6. The pressurized sealing fluids make their way into the annular groove 23 of the throttle 26 through one or more inlets. Throttle 26 is also referred to as "an alignment skate" by those practiced in the arts. Throttle 26 allows the labyrinth seal 3 to respond to movement of the shaft caused by the misalignment of the shaft 1. The pressurized sealing fluid escapes past the close clearance formed between the shaft 1 and labyrinth seal 3 having throttle 26. The close proximity of the throttle 26 to the shaft 1 also creates resistance to the sealing fluid flow over the shaft 1 and causes pressure to build-up inside the annular groove 23. Floating annular groove 27 in cooperation and connection with annular groove 23 also provides an outlet for excess sealing fluid to be "bled" out of shaft seal assembly 25 for pressure equalization or to maintain a continuous fluid purge on the shaft sealing assembly 25 during operation. An advantage afforded by this aspect of the shaft sealing assembly 25 is its application wherein "clean-in place" product seal decontamination procedures are preferred or required. Examples would include food grade applications.

FIG. 7 illustrates shaft seal assembly 25 with the anti-rotation pin 12 removed to improve visualization of the inlets. These would typically exist, but are not limited to, a series of ports, inlets or passages about the circumference of the shaft seal assembly 25. FIG. 7 also shows the shape and pattern of the labyrinth seal 3 may be varied. The shape of throttles 26 may also be varied as shown by the square profile shown at throttle groove 22 in addition to the circular-type 26. Also note that where direct contact with the shaft 1 is not desired, the shaft seal assembly 25 be used in combination with a separate sleeve 24 that would be attached by varied means to the shaft 1.

Figure 8:
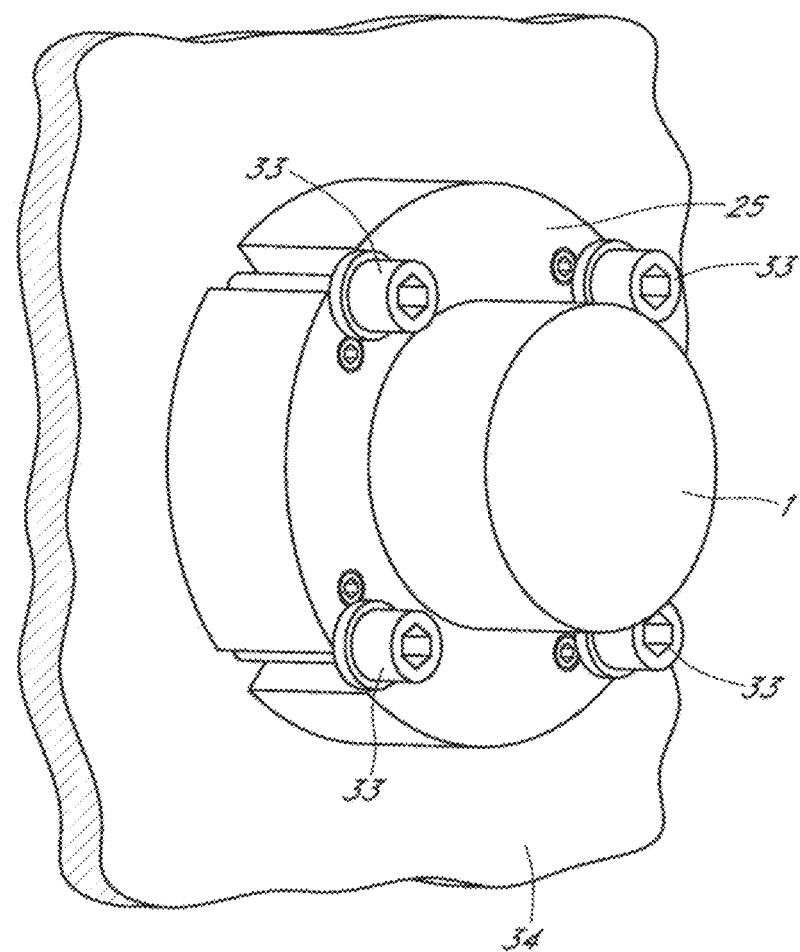
FIG. 8 is a perspective view of a fourth embodiment of a shaft seal assembly engaged with a vessel wall.

FIG. 8 shows that another embodiment of the present disclosure wherein the shaft seal assembly 25 has been affixed to a vessel wall 34. The shaft seal assembly 25 may be affixed to vessel wall 34 through securement means such as mounting bolts 33 to ensure improved sealing wherein shaft 1 is subjected to angular misalignment. The mounting bolts 33 and slots (not numbered) through the shaft seal assembly 25 exterior are one means of mounting the shaft seal assembly 25, as recited in the claims.

In certain applications, especially those wherein the process side of shaft seal assembly 25 (generally the area to the left of the shaft seal assembly 25 as shown in FIGS. 3-3B and 5-7) is at an increased pressure, it is desirable for the shaft seal assembly 25 to be configured to balance the pressure experienced by the shaft seal assembly 25 in the axial direction. A pressure balanced shaft seal assembly 40 that balances the pressure (in the axial direction) the product applies to the labyrinth seal interior face 42 and floating stator interior face 44 is shown in FIGS. 9-12.

Figure 9:
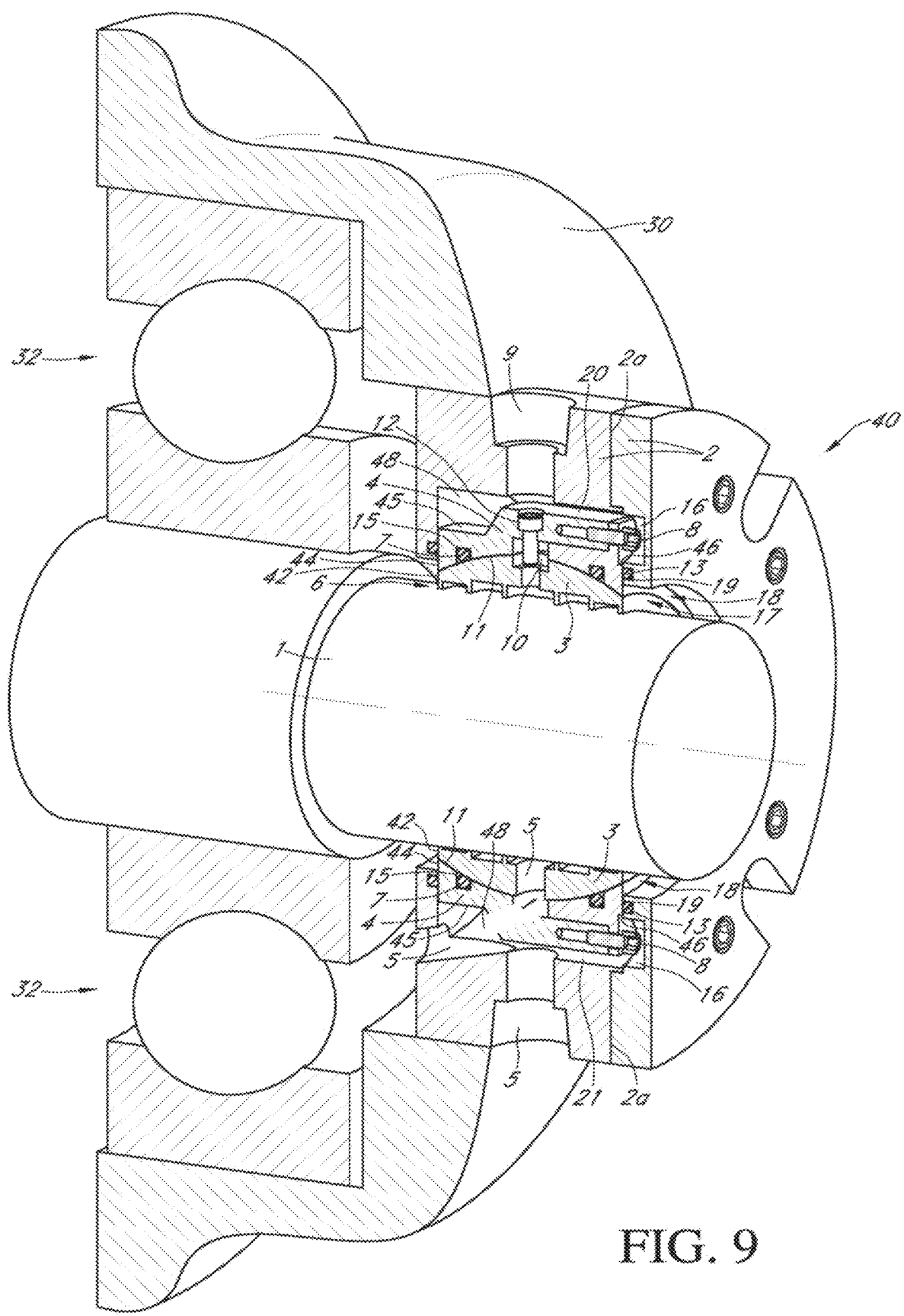
FIG. 9 is a cross-sectional of view of another embodiment of the shaft seal assembly with the shaft aligned with respect to the housing.
Figure 9A:
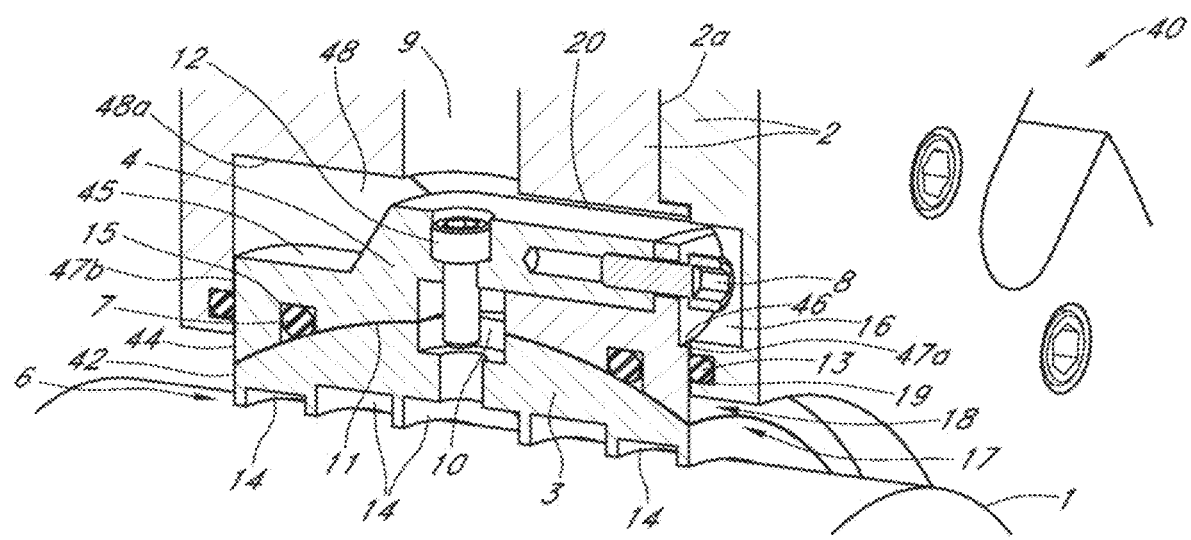
FIG. 9A provides a detailed view of a top portion of the embodiment of the shaft seal assembly shown in FIG. 9.
Figure 9B:
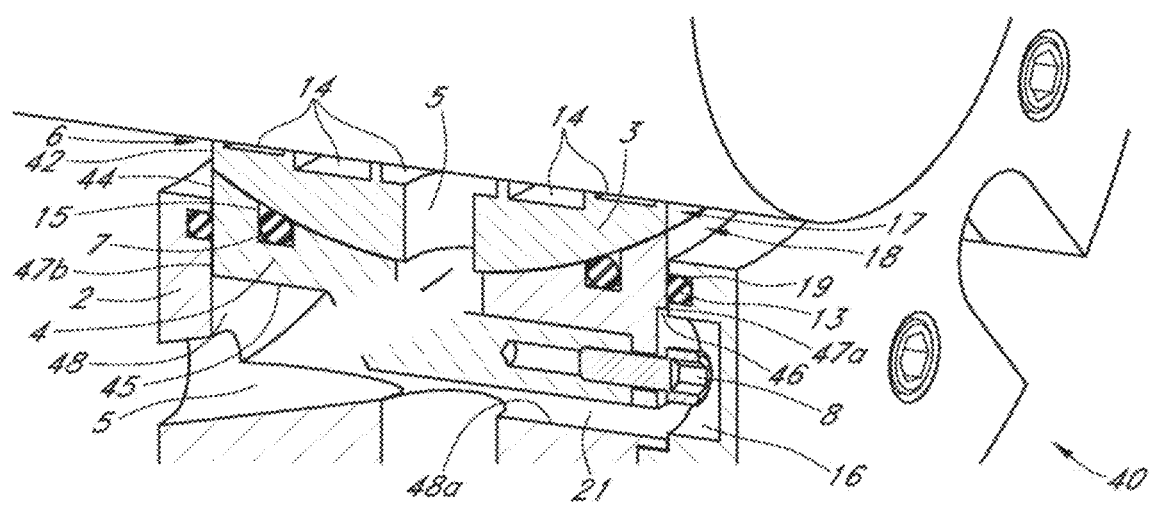
FIG. 9B provides a detailed view of a bottom portion of the embodiment of the shaft seal assembly shown in FIG. 9.
Figure 10:
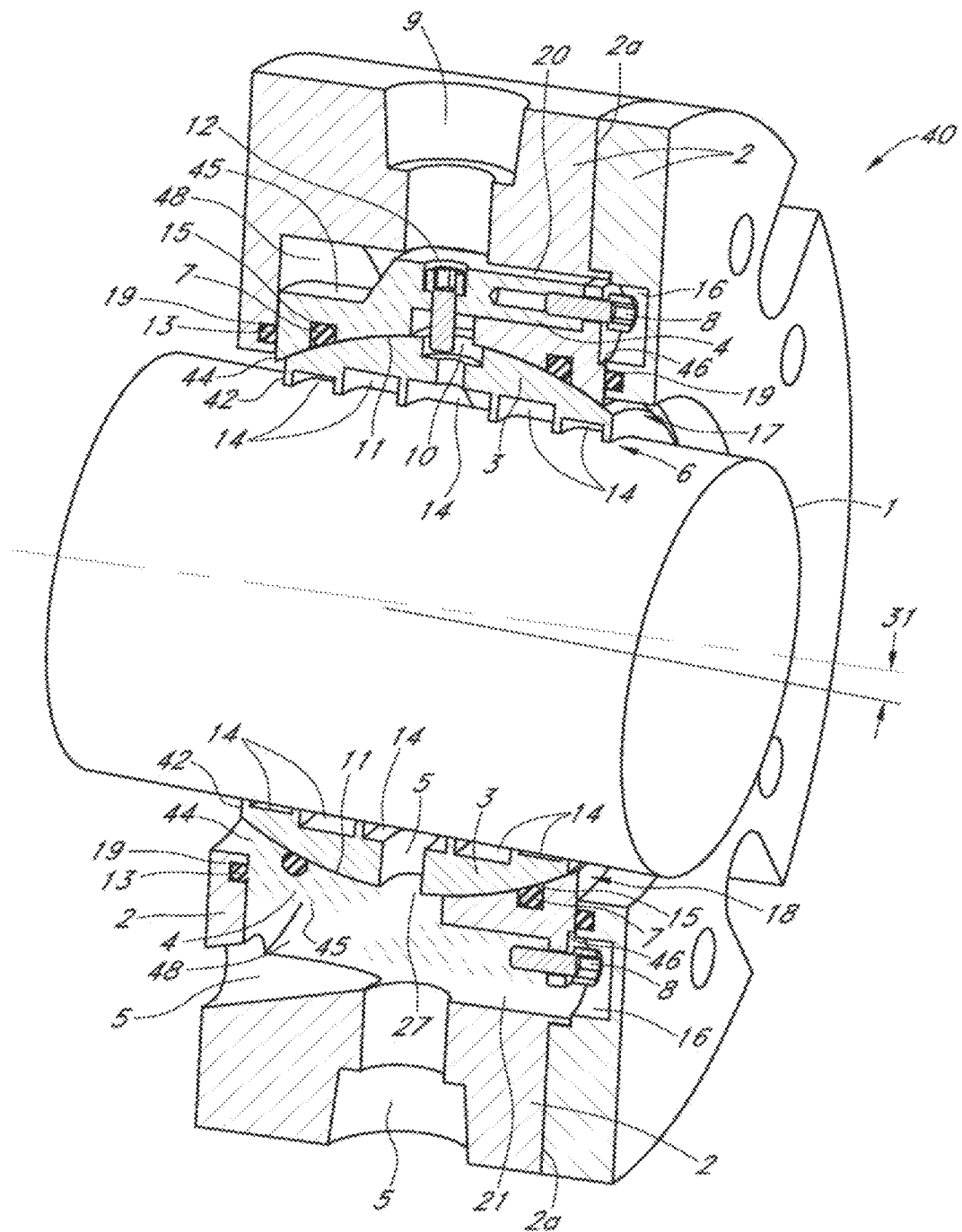
FIG. 10 is a cross-sectional view of another embodiment of the shaft seal assembly with the shaft aligned with respect to the housing.
Figure 10A:
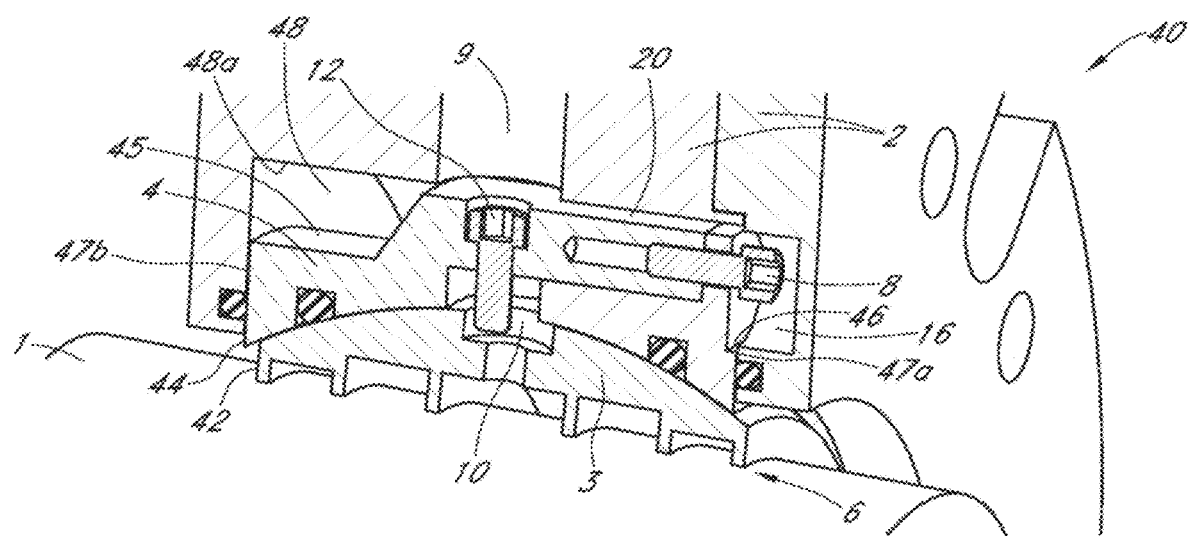
FIG. 10A provides a detailed view of a top portion of the embodiment of the shaft seal assembly shown in FIG. 10.
Figure 10B:
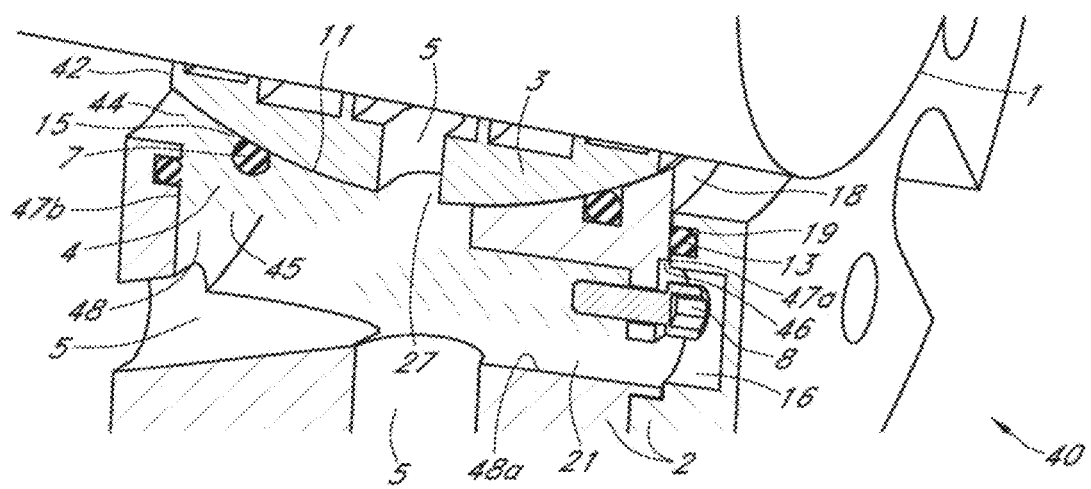
FIG. 10B provides a detailed view of a bottom portion of the embodiment of the shaft seal assembly shown in FIG. 10.

In the first embodiment of the pressure balanced shaft seal assembly as shown in FIGS. 9-10B, the shaft sealing member (i.e., the labyrinth seal 3 in combination with the floating stator 4) includes a pressure balancing annular channel 46. Save for the pressure balancing annular channel 46, the pressure balanced shaft seal assembly 40 operates in the same manner as the shaft seal assembly 25 shown in FIGS. 1-8 and described in detail above. That is, the floating stator 4 is positioned in the fixed stator annular groove 48. The first clearance between floating stator/fixed stator 20, which in the embodiments pictured herein is between the floating stator radial-exterior surface 45 and the annular groove radial-interior surface 48a (shown in FIGS. 9A and 9B), accounts at least for radial perturbations of the shaft 1. The spherical interface 11 between the floating stator 4 and the labyrinth seal 3 accounts at least for angular perturbations of the shaft 1.

The pressure balancing annular channel 46 is formed in the floating stator 4 adjacent the first radial interface 47a between the floating stator 4 and the fixed stator 2, as shown in FIGS. 9-10 for the first embodiment. As shown in the various embodiments pictured herein, the first radial interface 47a between the floating stator 4 and the fixed stator 2 is adjacent the portion of the fixed stator 2 fashioned with the cavity for anti-rotation device 16. That is, the axial face of the floating stator 4 that is positioned within the fixed stator 2 and furthest from the process side of the pressure balanced shaft seal assembly 40. A second radial interface 47b between the floating stator 4 and fixed stator 2, which is substantially parallel to the first radial interface 47a, is positioned closer to the process side of the pressure balanced shaft seal assembly 40 as compared to the first radial interface 47a.

In many applications the optimal radial dimension of the pressure balancing annular channel 46 will be the substantially similar to the radial dimension of the floating stator interior face 44 so that the area of the floating stator 4 acted upon by the product and the area of the floating stator 4 acted upon by the sealing fluid have equal surface areas. In such a configuration, the axial forces will balance if the product and the sealing fluid are pressurized to approximately the same value. Accordingly, the optimal radial dimension of the pressure balancing annular channel 46 will depend on the design characteristics of the entire system, and the radial dimension of the pressure balancing annular channel 46 may be any suitable amount for a particular application, whether greater or less than the radial dimension of the floating stator interior face 44. The axial dimension of the pressure balancing annular channel 46 will also vary depending on the design characteristics of the entire system, including but not limited to the specific sealing fluid that is used, the product pressure, and the pressure of the sealing fluid. In some applications the optimal axial dimension of the pressure balancing annular channel 46 will be 0.005 of an inch, but may be greater in other embodiments and less in still other embodiments.

The pressure balancing annular channel 46 allows sealing fluid introduced into the first clearance between floating stator/fixed stator 20 (from where the sealing fluid may enter the pressure balancing annular channel 46) to act upon the floating stator in an axial direction. Typically, the process side of the pressure balanced shaft seal assembly 40 (generally the area to the left of the pressure balanced shaft seal assembly 40 as shown in FIGS. 9-12) experiences forces from the process fluid acting upon the labyrinth seal interior face 42 and floating stator interior face 44. These forces are most often due to the pressure generated by the rotating equipment to which the shaft 1 is coupled. For example, if the shaft 1 is coupled to a fluid pump generating seventy pounds per square inch (psi) of head pressure, the process side of the pressure balanced shaft seal assembly 40 will be pressurized to approximately seventy psi. This pressurized fluid will act upon the labyrinth seal interior face 42 and floating stator interior face 44, and consequently urge the labyrinth seal 3 and floating stator 4 in the axial direction away from the process side of the pressure balancing shaft seal assembly 40 (i.e., generally to the right side of the drawing as depicted in FIGS. 9-12). By contrast, sealing fluid located in the pressure balancing annular channel 46 will urge the labyrinth seal 3 and floating stator 4 in the axial direction toward the process side of the pressure balancing shaft seal assembly 40, which may substantially cancel the axial force the product exerts upon the pressure balancing shaft seal assembly 40, depending on the design of the sealing fluid system.

Figure 11:
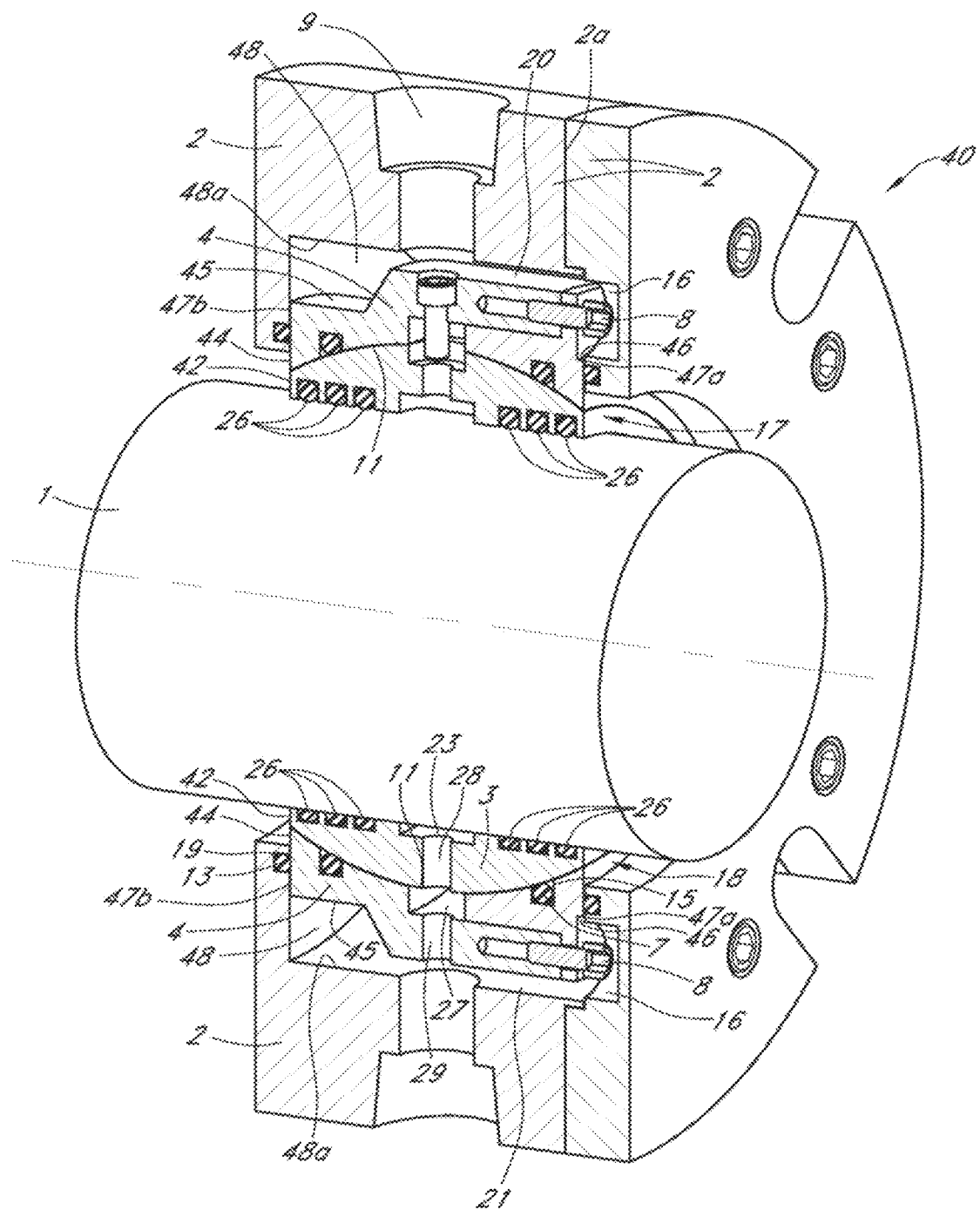
FIG. 11 is a cross-sectional view of the embodiment shown in FIG. 10 with the shaft misaligned with respect to the housing.
Figure 12:
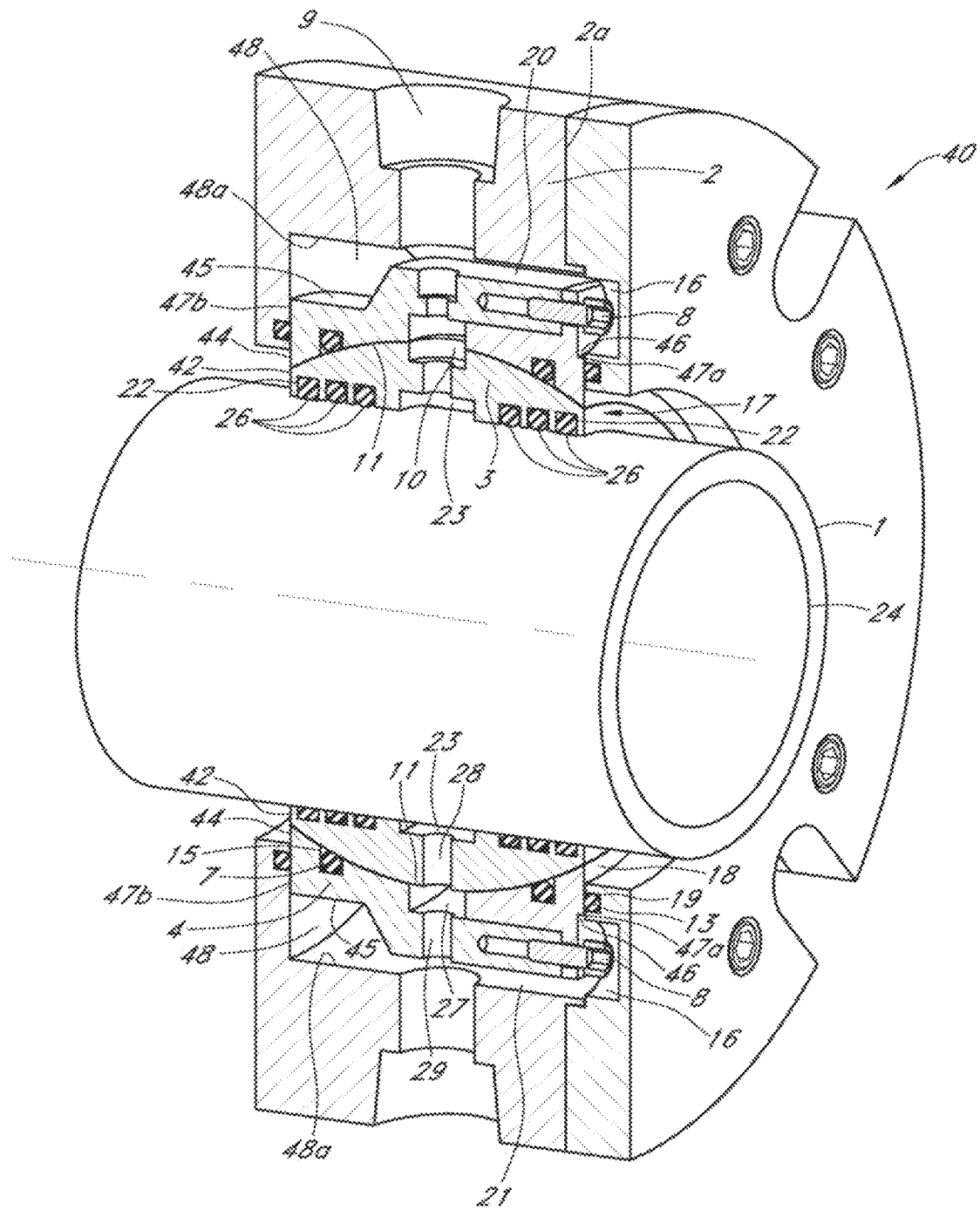
FIG. 12 is a cross-sectional view of the embodiment shown in FIG. 9 with the shaft misaligned with respect to the housing.

FIGS. 11 and 12 show a second and third embodiment of the pressure balanced shaft seal assembly 40. The second and third embodiments of the pressure balanced shaft seal assembly 40 generally correspond to the second and third embodiments of the shaft seal assembly 25 as shown in FIGS. 7 and 8 and described in detail above. However, as with the first embodiment of the pressure balanced shaft seal assembly 40 as shown in FIGS. 9-10B, the second and third embodiments include a pressure balancing annular channel 46.

The various embodiments of the pressure balanced shaft seal assembly 40 pictured and described herein are formed with a fixed stator 2 and floating stator 4 that are comprised of two distinct portions. These embodiments facilitate assembly of the pressure balanced shaft seal assembly 40 since in the embodiments pictured herein the majority of the floating stator 4 is positioned within the fixed stator 2. When installing a pressure balanced shaft seal assembly 40 according to the first embodiment (as pictured in FIGS. 9-10B), the first portion of fixed stator 2 (i.e., the portion adjacent the process side of the pressure balanced shaft seal assembly 40) would be affixed to a housing 30. Next, the floating stator 4 and labyrinth seal 3 may be positioned as one assembled piece (wherein the components forming the spherical interface 11 have been preassembled) between the shaft 1 and the first portion of the fixed stator 2. The placement of the floating stator 4 and labyrinth seal 3 within the fixed stator 3 forms the second axial interface 47*b* between the fixed stator 2 and floating stator 4. Finally, the second portion of the fixed stator 2 (i.e., the portion furthest from the process side of the pressure balanced shaft seal assembly 40) may be positioned adjacent to and affixed to the first portion of the fixed stator 2. The positioning of the second portion of the fixed stator 2 subsequently forms the first radial interface 47*a* between the fixed stator 2 and floating stator 4.

Alternatively, the floating stator 4 and labyrinth seal 3 may be separately positioned within the fixed stator annular groove 48. For example, after the first portion of the fixed stator 2 has been affixed to the housing 30, the first portion of the floating stator 4 may be positioned within the fixed stator annular groove 48. The placement of the first portion of the floating stator 4 within the fixed stator annular groove 48 forms the second axial interface 47*b* between the fixed stator 2 and floating stator 4. Next, the labyrinth seal 3 may be positioned adjacent the shaft 3, the placement of which forms a portion of the spherical interface 11 between the floating stator 4 and labyrinth seal 3. Next, the second portion of the floating stator 4 may be positioned adjacent the first portion of the floating stator 4 and affixed thereto with a plurality of anti-rotation pins 8, which completes the spherical interface 11 between the floating stator 4 and labyrinth seal 3. Finally, the second portion of the fixed stator 2 is affixed to the first portion of the fixed stator 2 with a plurality of bolts or rivets, the placement of which forms the first axial interface 47*a* between the floating stator 4 and fixed stator 2. Any suitable securing members known to those skilled in the art may be used to affix the first and second portions of the floating stator 4 to one another or to affix the first and second portions of the fixed stator 2 to one another.

Although the embodiments pictured herein are directed to pressure balanced shaft seal assemblies 40 wherein the fixed stator 2 and floating stator 4 are comprised of two separate portions, in other embodiments not pictured herein, the fixed stator 2 and/or floating stator 4 are formed of one integral member.

Element Listing (FIGS. 13-22D)

| Description | Element No. |
| --- | --- |
| Shaft | 10 |
| Bearing isolator | 18 |
| Housing | 19 |
| Rotor | 20 |
| Stator | 30, 31a |
| Fixed stator | 31 |
| Passage | 40, 40a |
| Spherical surface | 50, 51 |
| Clearance | 52 |
| Frictional seal | 60 |
| Flange unit | 61a |
| Center point | 80 |
| Conduit | 99 |
| Fluid | 100 |
| Pin | 101 |
| Annular recess | 102 |
| Shaft seal assembly | 200 |
| Multi-shaft seal assembly | 202 |
| Fastener | 204 |
| Aperture | 206 |
| Fixed stator | 210 |
| Main body | 211 |
| Face plate | 212 |
| Pin recess | 212a |
| Inlet | 214 |
| Annular recess | 216 |
| Sealing member | 218 |
| Floating stator | 220 |
| Radial exterior surface | 222 |
| Pin | 224 |
| First radial passage | 226 |
| Concave surface | 228 |
| Rotor | 230 |
| Roller cavity | 232 |
| Cavity wall | 233 |
| Roller | 234 |
| Second radial passage | 236 |
| Convex surface | 238 |
| First seal | 240 |
| Collar | 241 |
| Collar lip | 241a |
| Collar cutaway | 242 |
| Second seal | 250 |
| Cutaway | 251 |
| Shaft seal assembly | 300 |
| O-ring channel | 302 |
| O-ring | 303 |
| Unitizing ring | 304 |
| Slip ring | 305 |
| First cooperating cavity | 306a |
| Second cooperating cavity | 306b |
| Axial passage | 307 |
| Radial passage | 308 |
| Stator | 310 |
| Stator body | 311 |
| Shoulder | 312 |
| Radial bore | 313 |
| Axial projection | 314 |
| Radial projection | 315 |
| Axial channel | 316 |
| Radial channel | 317 |
| Unitizing ring channel | 318 |
| Rotor | 320 |

-continued

| Description | Element No. |
| --- | --- |
| Rotor body | 321 |
| Rotor axial projection | 324 |
| Rotor radial projection | 325 |
| Rotor axial channel | 326 |
| Rotor radial channel | 327 |
| Rotor unitizing ring channel | 328 |

Figure 13:
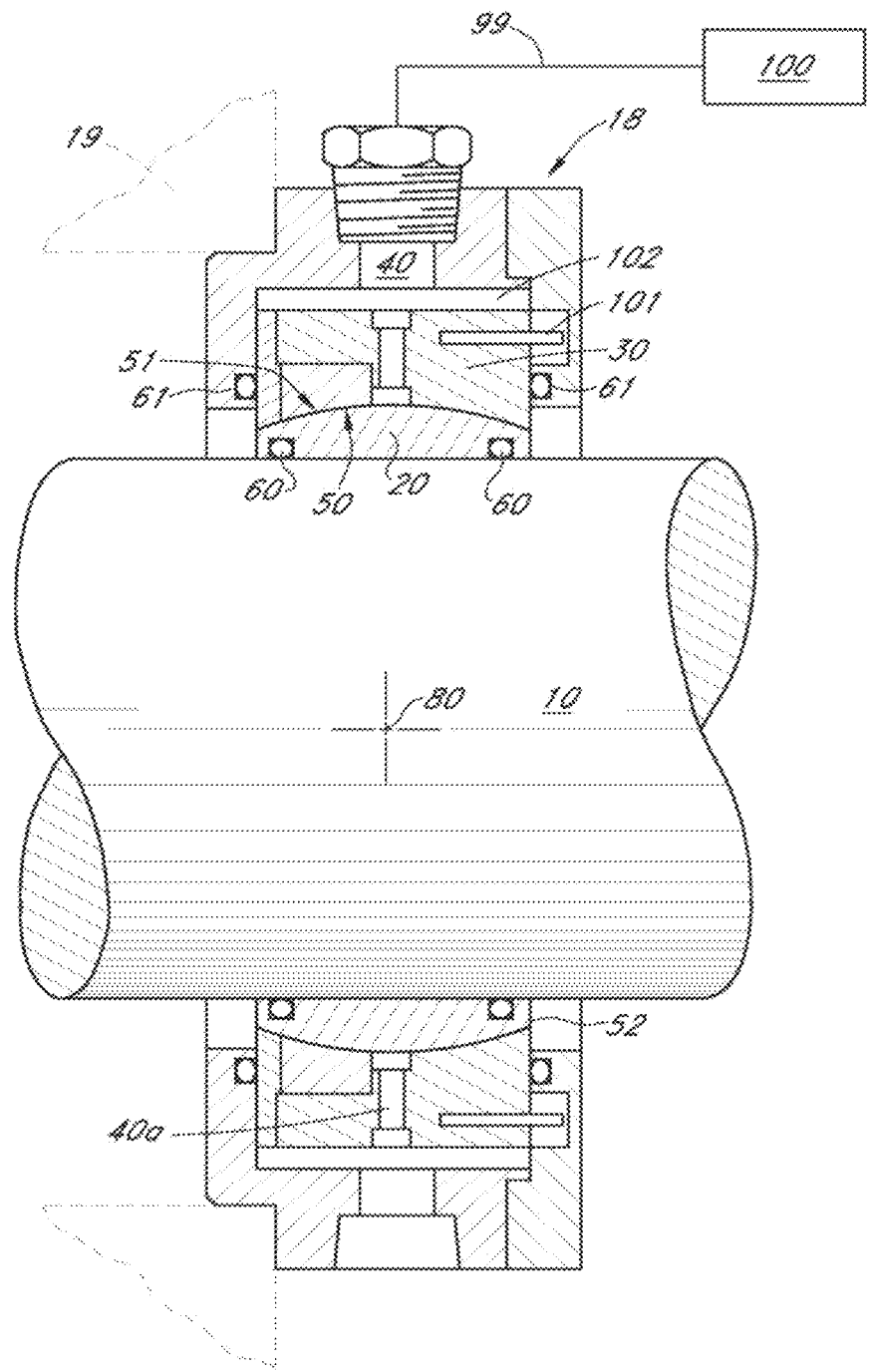
FIG. 13 is a cross-sectional view of the embodiment shown in FIG. 9 with the shaft misaligned with respect to the housing.

FIG. 13 shows another embodiment of a bearing isolator 18 mounted on a shaft 10. The shaft 10 extends through the bearing isolator 18 and the housing 19. A source of gas or fluid, 100 which may include water or lubricant, may also be in communication with the bearing isolator 18 via conduit 99. The rotor 20 is affixed to the shaft 10 by means by a frictional seal 60, which may be configured as one or more o-rings. The rotor 20 follows the rotational movement of the shaft 10 because of the frictional engagement of the seals 60. The passages 40 and 40a are as shown but will not be described in detail here because such description is already understood by those skilled in the art.

Figure 15:
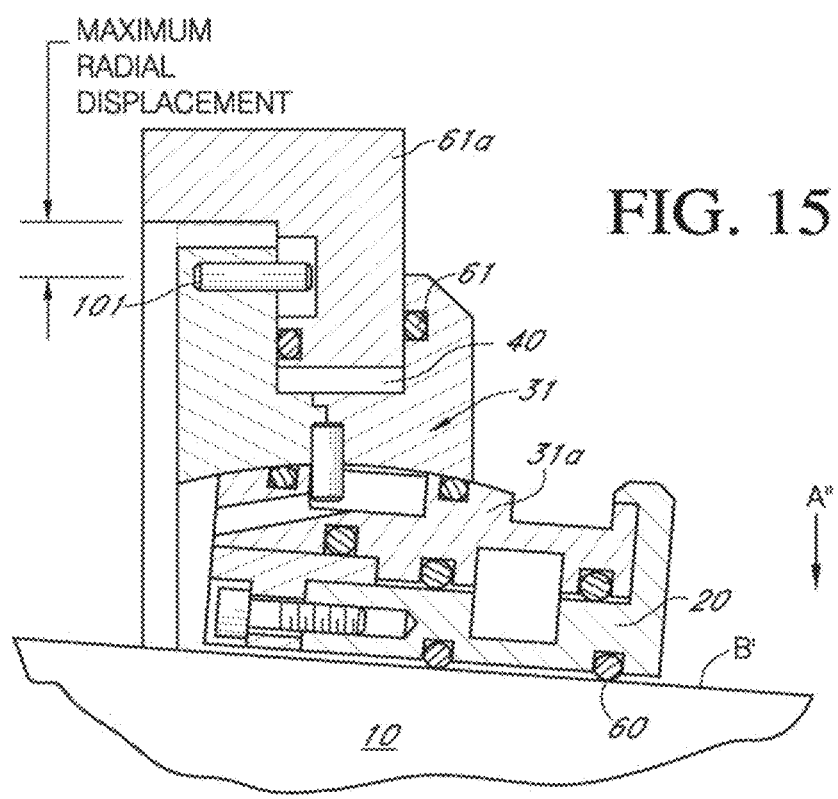
FIG. 15 is a perspective view of a first embodiment of a multi-shaft seal assembly.
Figure 16:
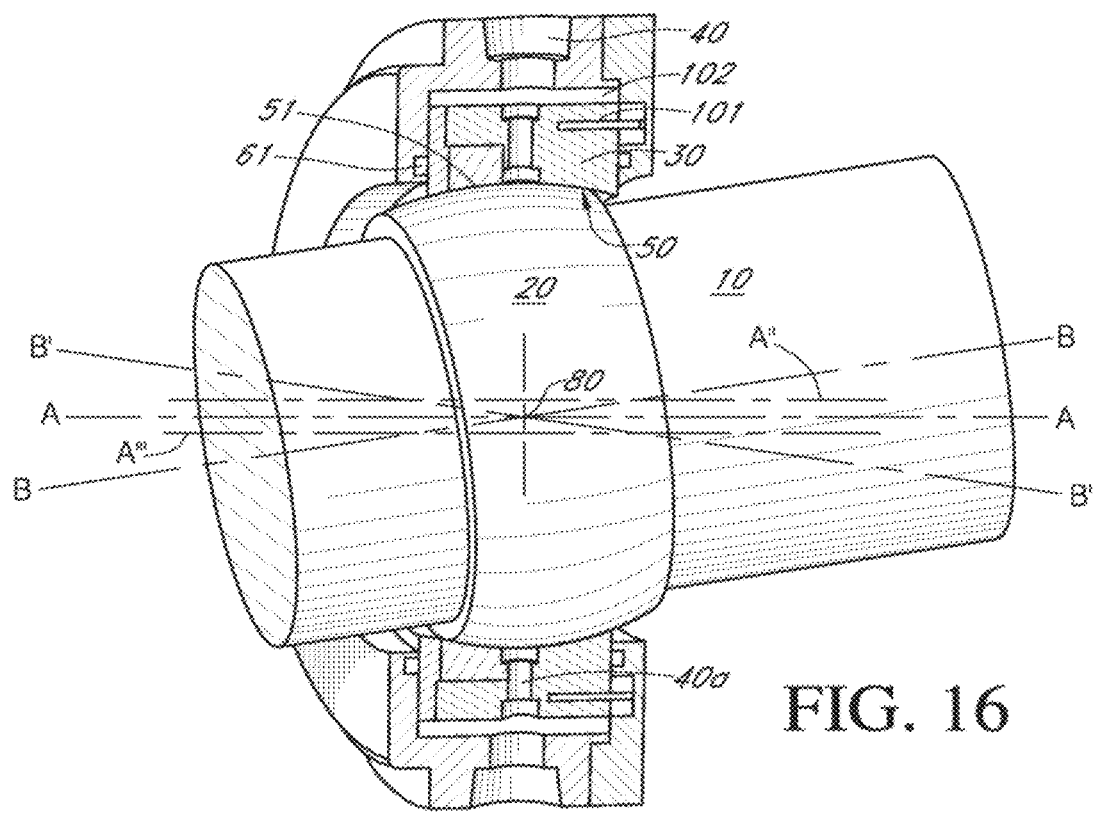
FIG. 16 is a plane vertical view of another embodiment of a shaft seal assembly.
Figure 17:
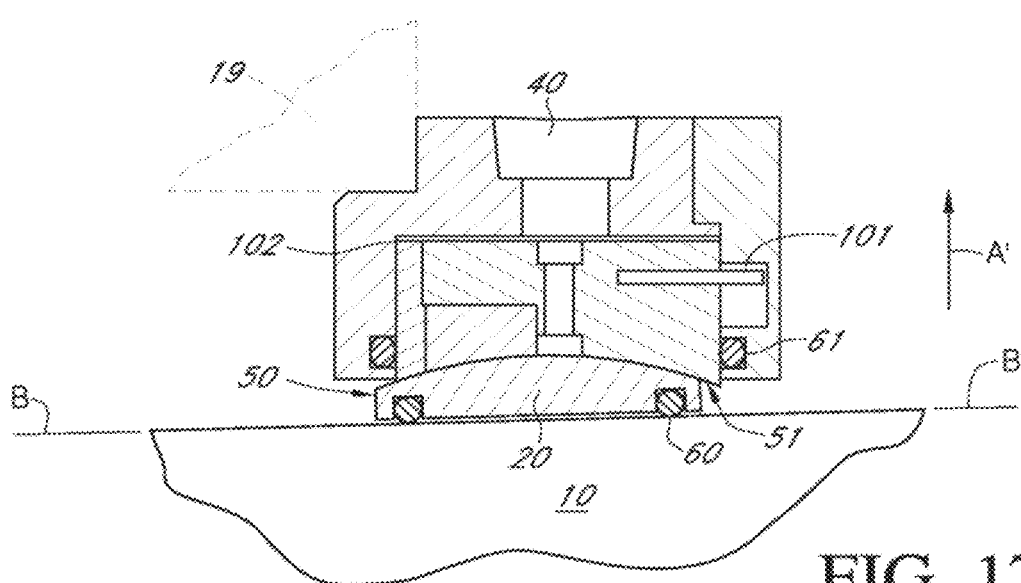
FIG. 17 is an axial, cross-sectional view of the shaft seal assembly shown in the embodiment in FIG. 16.

A pair of corresponding spherical surfaces 50 and 51 may be used to create a self-aligning radial clearance 52 between the rotor 20 and the stator 30 prior to, during, and after use. This clearance 52 may be maintained at a constant value even as the shaft 10 becomes misaligned during use. Various amounts and direction of misalignment between the centerline of the shaft 10 and the housing 19 are illustrated in FIGS. 15-17. An annular recess 102 between the stator 30 and fixed stator 31 allows the bearing isolator 18 to accommodate a predetermined amount of radial shaft displacement.

In the embodiments shown herein, the spherical surfaces 50, 51 have a center point identical from the axial faces of both the rotor and stator 20, 30, respectively. However, the spherical surfaces 50, 51 may be radially, and/or as shown, vertically spaced apart. These spherical surfaces 50, 51 may move radially in response to and/or in connection with and/or in concert with the radially positioning of other components of the bearing isolator 18. Typically, if the shaft 10 becomes misaligned with respect to the housing 19, the rotor 20 will consequently become misaligned with respect thereto, and then the spherical surfaces 50, 51 and/or the stator 30 moving radially within the annular recess of the fixed stator 31 may compensate for the misalignment.

FIGS. 15 and 17 illustrate that in one embodiment of the bearing isolator 18, the rotor 20 may move with respect to the stator 30, 31 as shaft 10 is misaligned with respect to housing 19 through the interaction between spherical surfaces 50, 51 so as to ensure the distances between the center points of the rotor 20 and stator 30 and a fixed point on the housing 19 are constant.

Figure 14:
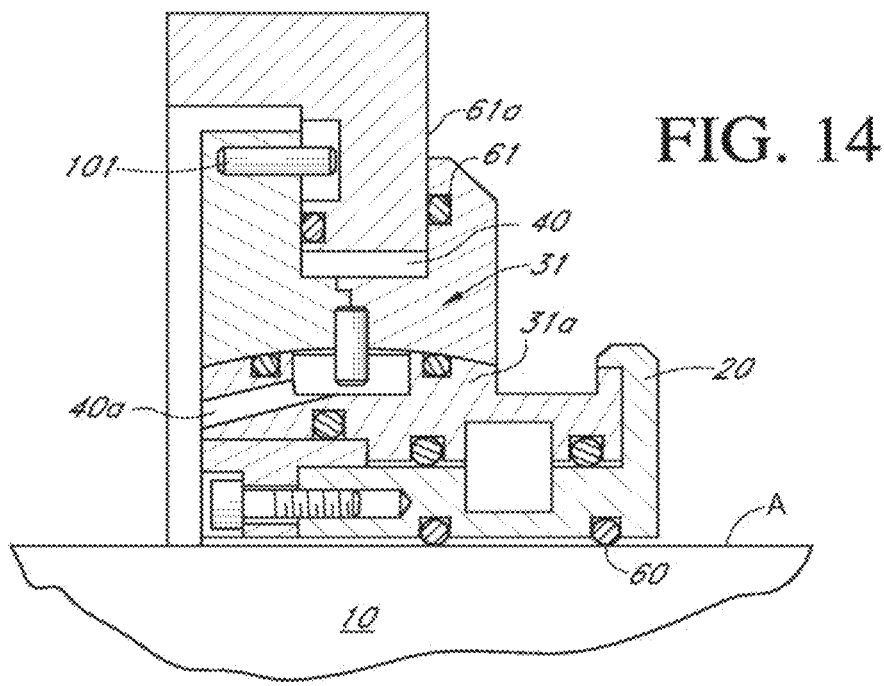
FIG. 14 is a cross-sectional view of a third embodiment of the shaft seal assembly.

In the embodiment of the bearing isolator 18 shown in FIGS. 14 & 15, the spherical surfaces 50, 51 may be positioned on a fixed stator 31 and stator 31a rather than on the rotor 20 and stator 30. Still referring to FIGS. 14 & 15, this design allows the rotor 20 and stator 31a to move with respect to the fixed stator 31, flange unit 61a, and housing 19. The rotor 20, stator 31a, and fixed stator 31 may move radially with respect to the flange unit 61a (and consequently with respect to the housing 19) as best shown in FIG. 15. In this embodiment of the bearing isolator 18 there is a very minimal amount of relative rotation between the spherical surfaces 50, 51.

The embodiment of the bearing isolator 18 shown in FIGS. 14 & 15 may provide for controlled radial movement of the fixed stator 31, stator 31a, and rotor 20 with respect to flange unit 61a, which flange unit 61a may be securely mounted to a housing 19. Rotational movement of the fixed stator 30 with respect to the flange unit 61a may be prevented by anti-rotational pins 101. The fixed stator 31 may be frictionally secured to the flange unit 61a using a frictional seal 61, which may be made of any material with sufficient elasticity and frictional characteristics to hold the fixed stator 31 in a fixed radial position with respect to the flange unit 61a but still be responsive to the radial forces when the shaft 10 is misaligned. Changes to the radial position of the fixed stator 31, stator 31a, and rotor 20 and the resulting positions thereof (as well as the resulting position of the interface between the fixed stator 31 and stator 31a) occurs until the radial force is fully accommodated or unit the maximum radial displacement of the bearing isolator 18 is reached.

In operation, the rotor 20 may be moved radially as shaft 10 is misaligned with respect to the housing 19. Radial movement of the spherical surfaces 50, 51 between the stator 31a and fixed stator may result from this pressure. FIG. 3 shows the resultant radial movement of center point 80 as the shaft 10 is misaligned. During normal operation, the shaft 10 is typically horizontal with respect to the orientation shown in FIG. 3, as represented by line A. As the shaft 10 becomes misaligned in a manner represented by line B, the center point 80 may move to a point along line A". As the shaft 10 becomes misaligned in a manner represented by line B', the center point 80 may move to a point along line A'. However, in other shaft 10 misalignments, the radial positions of the rotor 20, stator 30, and/or fixed stator 31 may be constant and the spherical surfaces 50, 51 may compensate for the shaft misalignment. From the preceding description it will be apparent that the bearing isolator 18 provides a constant seal around the shaft 10 because the distance between the spherical surfaces 50, 51 is maintained as a constant regardless of shaft 10 misalignment of a normal or design nature.

The physical dimensions of the spherical surfaces 50 and 51 may vary in linear value and in distance from the center point 80, depending on the specific application of the bearing isolator. These variations will be utilized to accommodate different sizes of shafts and seals and different amounts of misalignment.

Axial Displacement Shaft Seal Assembly

Figure 18:
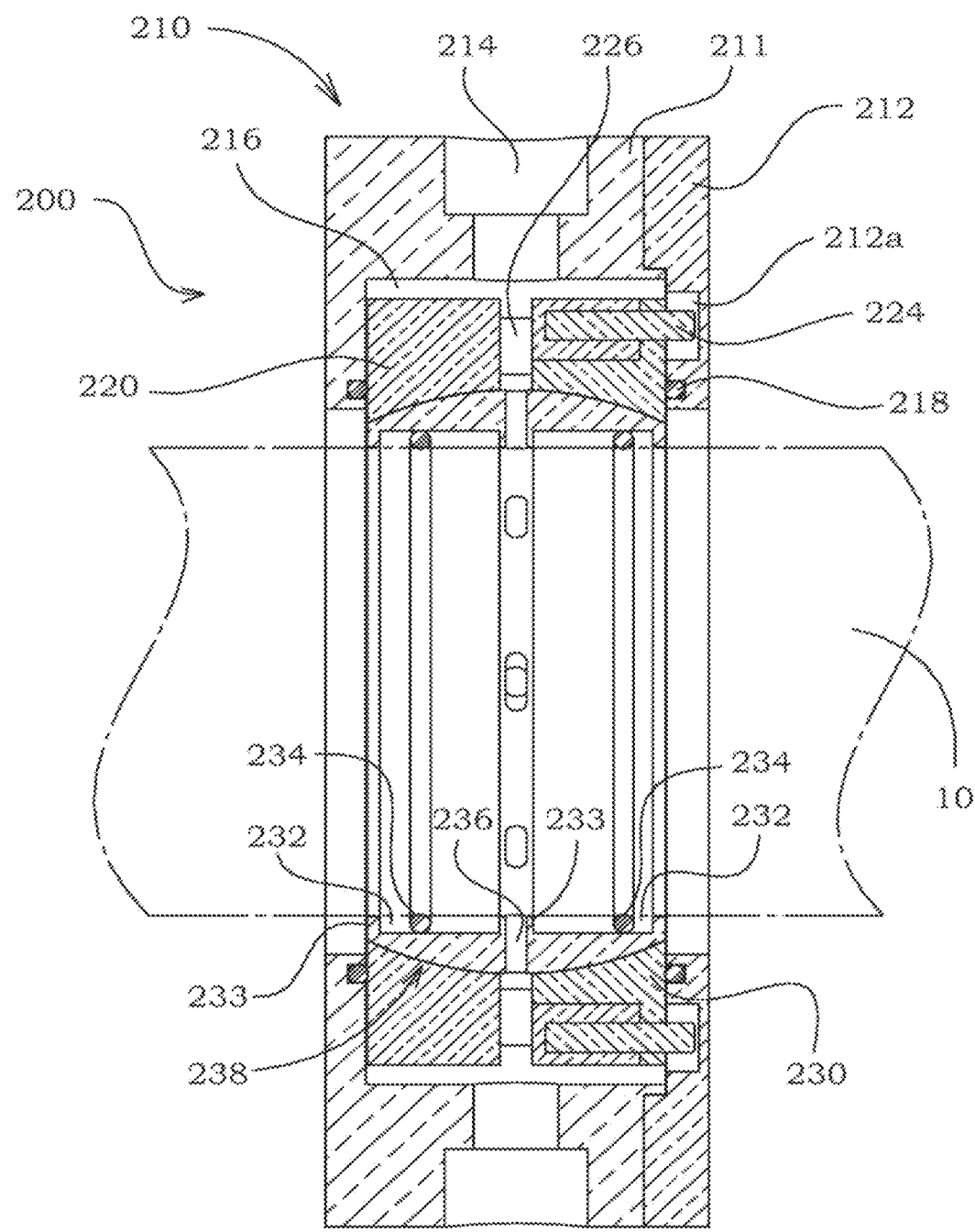
FIG. 18 is an axial, cross-sectional view of another embodiment of a shaft seal assembly.
Figure 18A:
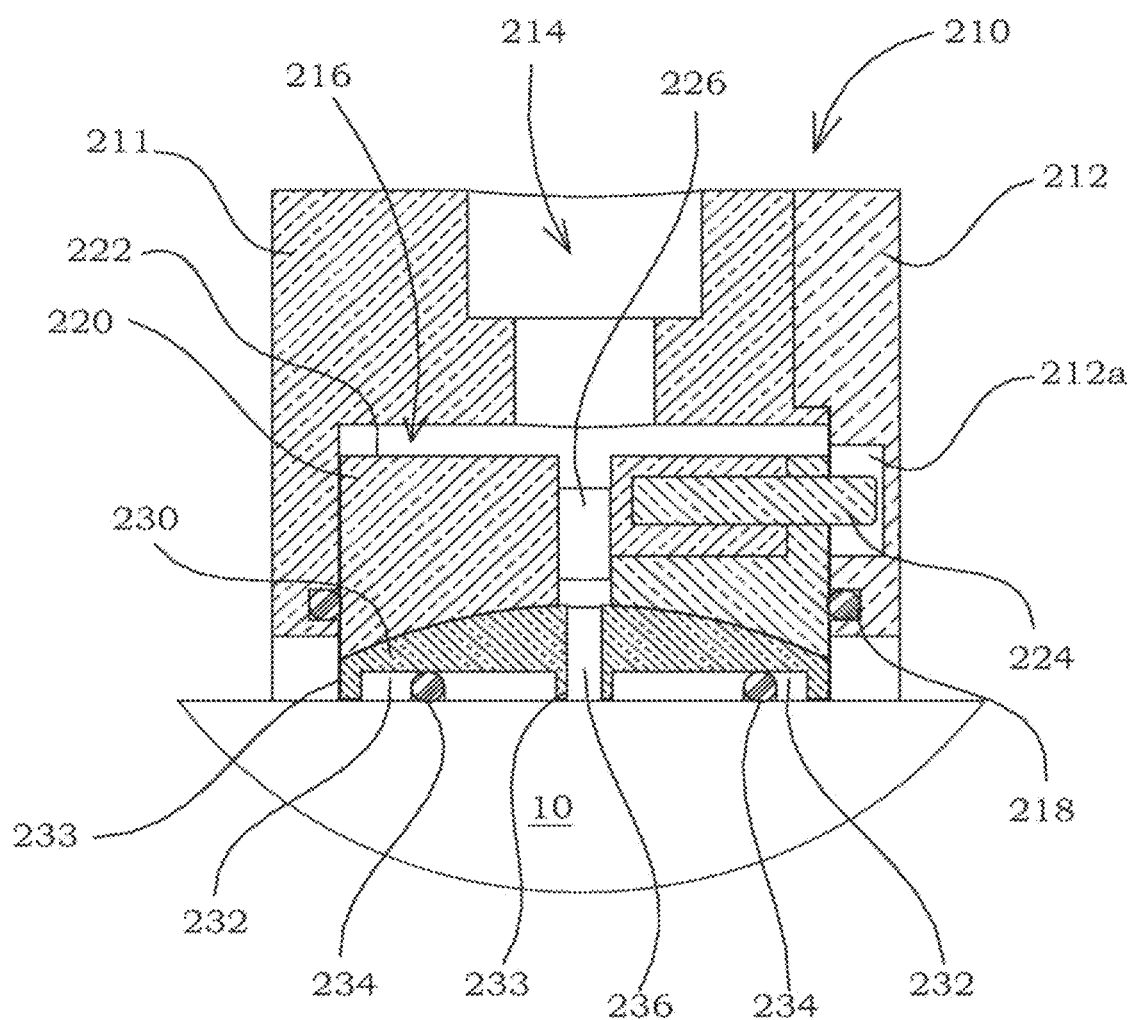
FIG. 18A is an axial, cross-sectional view of a top portion of the embodiment of a shaft seal assembly shown in FIG. 18.

Another embodiment of a shaft seal assembly 200 is shown in FIGS. 18 & 18A. This embodiment is similar to the embodiment of the bearing isolator 18 described above and shown in FIGS. 13, 16, & 17. The shaft seal assembly 200 may include a fixed stator 210, floating stator 220, and a rotor 230, as shown. In the pictured embodiment, the rotor 230 typically rotates with the shaft 10 while the fixed stator 210 and stator 220 do not. Accordingly, a rotational interface may exist between a concave surface 228 of the floating stator 220 and a convex surface 238 of the rotor 230. In other embodiments of the shaft seal assembly 200 not pictured herein, but which embodiments are a corollary to the embodiment of the bearing isolator 18 shown in FIGS. 14 & 15, the floating stator 220 may be configured with a convex surface that corresponds to a concave surface of the fixed stator. In such an embodiment, the rotational interface may be located at a position other than the interface between the concave and convex surfaces.

The embodiment of the shaft seal assembly 200 shown in FIGS. 18 & 18A includes a fixed stator 210 that may be securely mounted to a housing (not shown in FIGS. 18 & 18A) my any suitable methods and/or structure. The fixed stator 210 may include a main body 211 and a face plate 212 that may be secured to one another. It is contemplated that a fixed stator 210 formed with a main body 211 and face plate 212 may facilitate ease of installation of the shaft seal assembly 200 in certain applications. In such applications, the main body 211 may be affixed to the housing, the rotor 230 and floating stator 220 may be positioned appropriately, and then the face plate 212 may be secured to the main body 211.

The fixed stator 210 may be formed with an annular recess 216 into which a portion of the floating stator 220 and/or rotor 230 may be positioned. A predetermined clearance between the radial exterior surface 222 of the floating stator 220 and the interior surface of the annular recess 216 may be selected to allow for relative radial movement between the fixed stator 210 and floating stator 220. At least one pin 224 may be affixed to the floating stator 220, and a portion of the pin 224 may extend into a pin recess 212a formed in the face plate 212 so as to prevent the floating stator 220 from rotating with the rotor 230. The axial interfaces between the floating stator 220 and fixed stator 210 may be sealed with sealing members 218, which sealing members may be configured as o-rings.

The floating stator 220 may also be formed with a concave surface 228 in a radial interior portion thereof. This concave surface 228 may form a semi-spherical interface with a corresponding convex surface 238 formed in the radial exterior portion of the rotor 230. Accordingly, the shaft seal assembly 200 shown in FIGS. 18 & 18A accommodates shaft 10 misalignment and radial movement in an identical and/or similar manner to that previously described for the bearing isolators 18.

The shaft seal assembly 200 may be configured to accommodate for axial movement of the shaft 10. In the pictured embodiment this is accomplished by forming at least one roller cavity 232 in the rotor 230 adjacent the shaft 10. The illustrative embodiment includes two roller cavities 232 bound by a cavity wall 233 on either end thereof. At least one roller 234 may be positioned in each roller cavity 232. Axial movement of the shaft 10 may be accommodated by a roller 234 rolling along the surface of the shaft 10 and within the roller cavity 232. The illustrative embodiment includes two roller cavities 232 with one roller 234 in each roller cavity 232, but the shaft seal assembly 200 is in no way limited by the number of roller cavities 232 and/or rollers 234 associated therewith. The roller(s) 234 may be constructed of any suitable material for the specific application of the shaft seal assembly 200. It is contemplated that an elastomeric material (e.g., rubber, silicon rubber, other polymers) will be especially suitable for many applications.

The illustrative embodiment of the shaft seal assembly 200 also includes various fluid conduits for applying a sealing fluid to the shaft seal assembly 200. The fixed stator 210 is formed with an inlet 214 for introduction of a sealing fluid to the shaft seal assembly 200. The inlet 214 may be in fluid communication with one or more first radial passages 226 in the floating stator 220, which first radial passages 226 may in turn be in fluid communication with one or more second radial passages 236 in the rotor 230. The roller(s) 234, roller cavity(ies) 232, and cavity wall(s) 233 may be configured so that the sealing fluid introduced to the inlet 214 exits the shaft seal assembly 200 from an area between the rotor 230 and shaft 10 at a predetermined rate for a given set of operation parameters (e.g., sealing fluid viscosity and pressure, shaft 10 rpm, etc.). The illustrative embodiment of the shaft seal assembly 200 may be formed with eight first radial passages 226 formed in the floating stator 220, which correspond to eight second radial passages 236 formed in the rotor 230, and the first radial passages 226 and second radial passages 236 may be evenly spaced about the circumference of the shaft seal assembly 200. However, in other embodiments, different numbers, spacing, and/or configurations of the first radial passages 226 and/or second radial passages 236 may be used without departing from the spirit and scope of the shaft seal assembly 200 as disclosed and claimed herein.

In an embodiment of the shaft seal assembly 200 not pictured herein, but which embodiment is a corollary to that shown in FIGS. 14 & 15. It will be apparent in light of the present disclosure that in such an embodiment, the rotor 20 will include at least one roller cavity adjacent the shaft 10 with at least one roller positioned therein rather than a frictional seal 60. As with the previous embodiments of the shaft seal assembly 200 described herein, the roller(s) may be configured to rotatively couple the rotor 20 with the shaft 10. The rotor cavity and/or roller may be also be configured to allow the shaft 10 to move axially with respect to the shaft sealing assembly 200.

Multi-Shaft Seal Assembly

Figure 19:
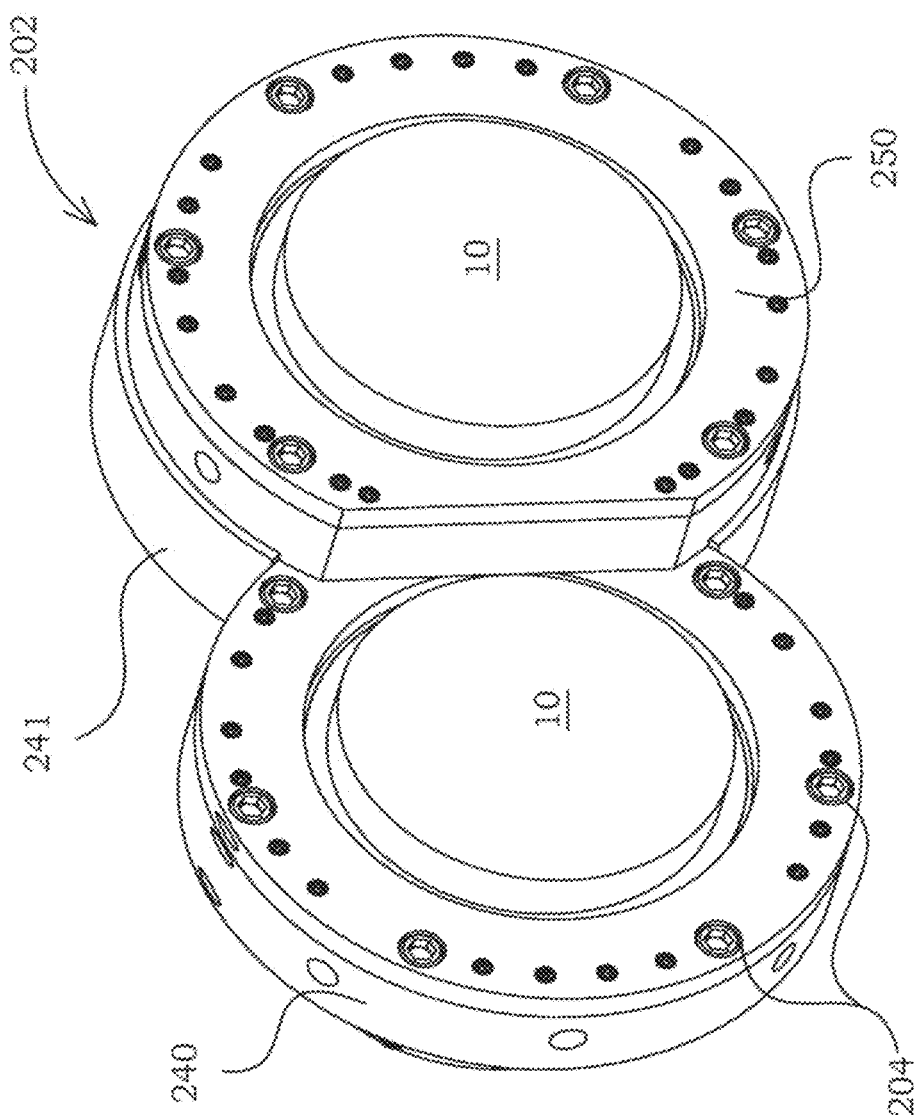
FIG. 19 is a perspective view of a first embodiment of a multi-shaft seal assembly.
Figure 19A:
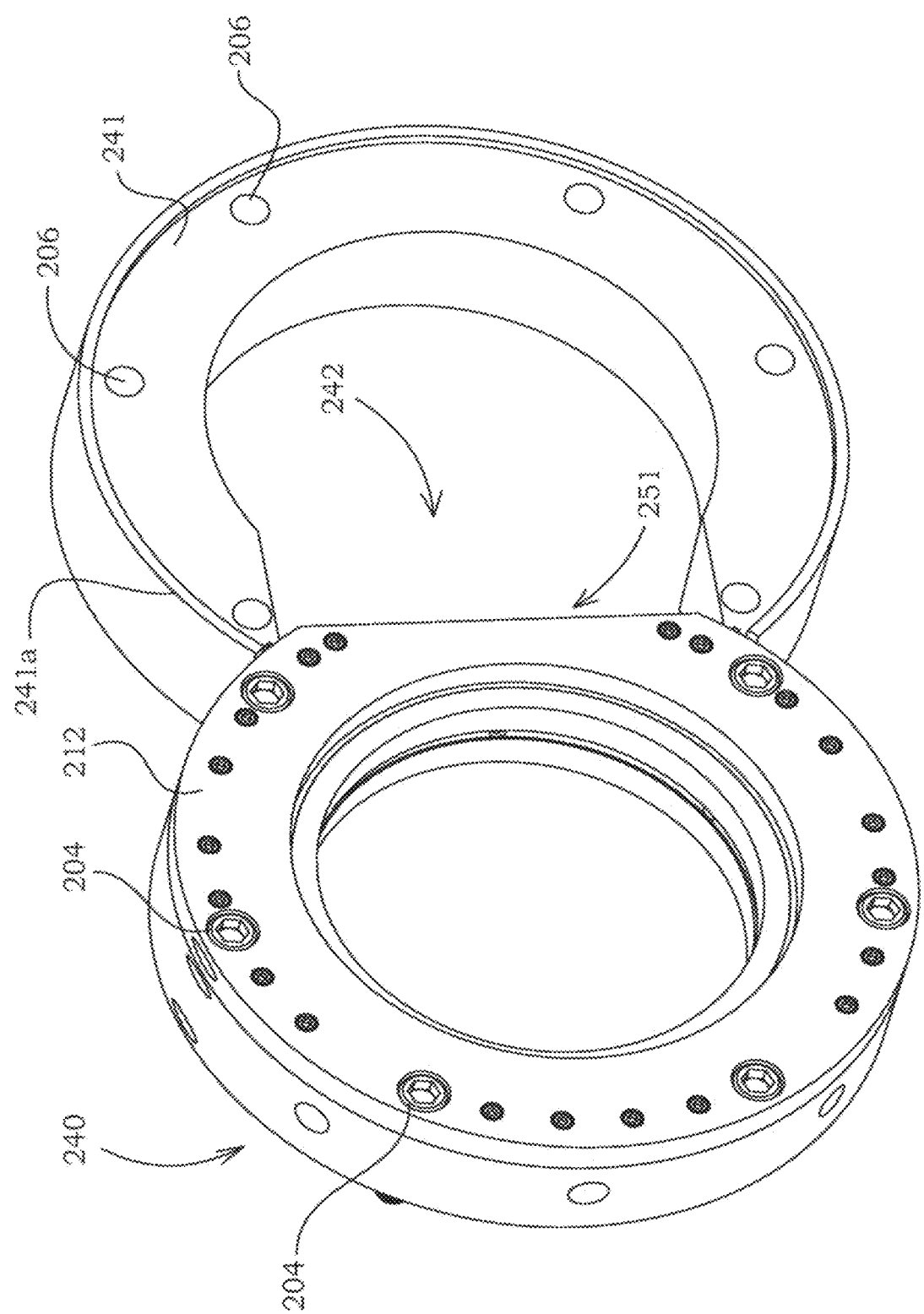
FIG. 19A is a perspective view of the embodiment of a multi-shaft seal assembly shown in FIG. 19 with the second seal removed for clarity.

FIG. 19 provides a perspective view of a first embodiment a multi-shaft seal assembly 202. It is contemplated that a multi-shaft seal assembly 202 may be especially useful in applications wherein two shafts 10 are positioned in relative close proximity to one another, as shown for the illustrative embodiment pictured herein. The shafts 10 pictured herein are also oriented such that the longitudinal axes thereof are parallel with respect to one another. However, the multi-shaft seal assembly 202 is not so limited, and other embodiments thereof exist for use with shafts 10 that are oriented differently than those pictured herein.

Figure 21:
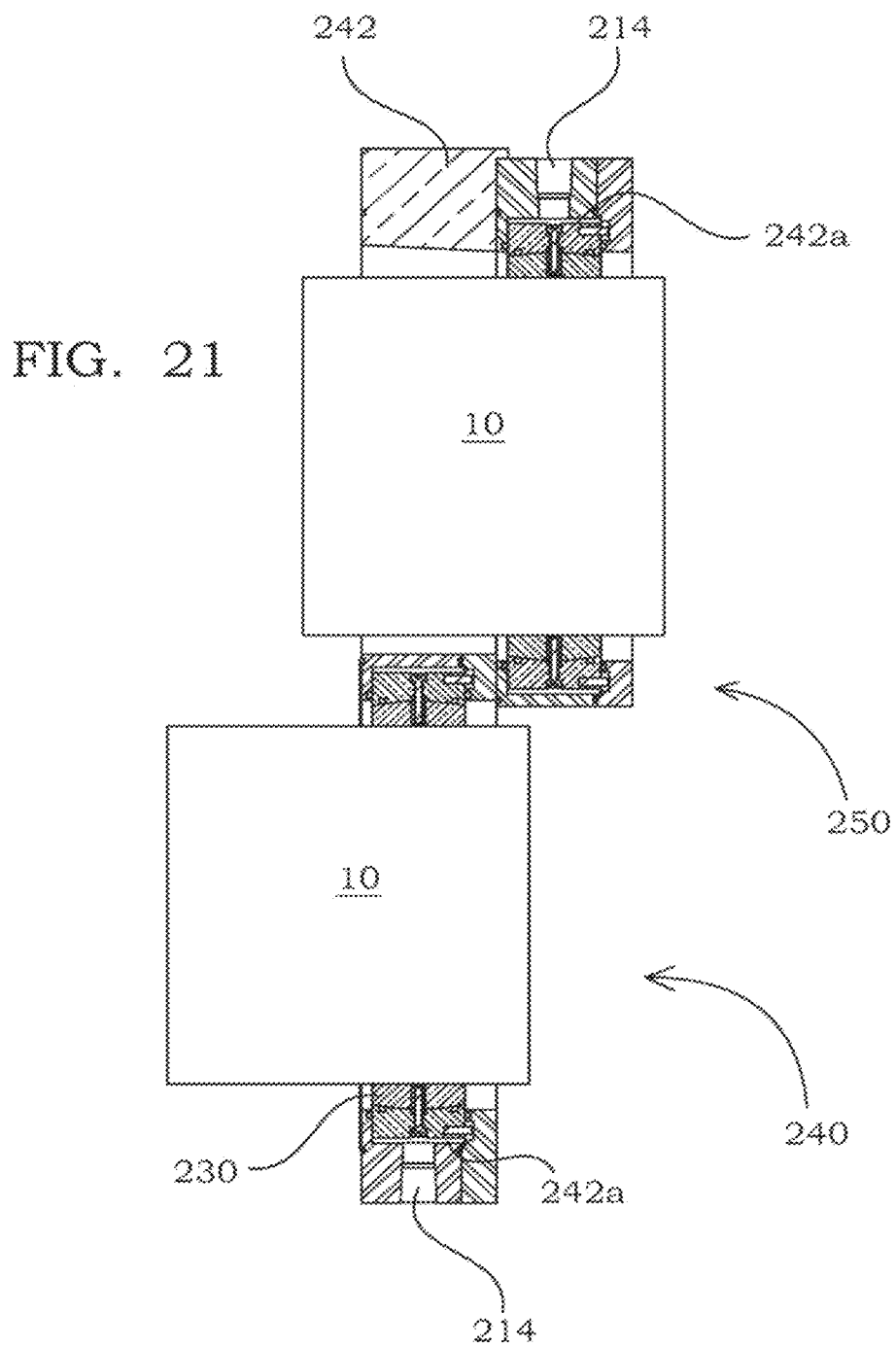
FIG. 21 is an axial, cross-sectional view of the embodiment shown in FIG. 19.

The illustrative embodiment of the multi-shaft seal assembly 202 includes a first seal 240. A sealing portion of the first seal 240 surrounds one shaft 10 and may be configured to operate in a manner substantially similar to other bearing isolators 18 and/or shaft seal assemblies 25, 200 disclosed herein or otherwise. A sealing portion of a second seal 250 surrounds the other shaft 10 and also may be configured to operate in a manner substantially similar to other bearing isolators 18 and/or shaft seal assemblies 25, 200 disclosed herein or otherwise. For example, FIG. 21 provides an axial, cross-sectional view of a first embodiment of the multi-shaft seal assembly 202, wherein both the first and second seals 240, 250 are configured to operate in a manner substantially similar to the bearing isolator 18 shown in FIGS. 13-17. However, in other embodiments of the multi-shaft seal assembly 202, either the first or second seal 240, 250 may be differently configured. For example, the first and second seals 240, 250 may be configured like the embodiment of a shaft seal assembly 200 shown in FIGS. 18 & 18A. Furthermore, in other embodiments of the multi-shaft seal 202, the first seal 240 and second seal 250 may be configured differently from one another. For example, the first seal 240 may be configured to operate in a manner substantially similar to the bearing isolator 18 shown in FIGS. 13-17 and the second seal 250 may be configured to operate in a manner substantially similar to the shaft seal assembly 200 shown in FIGS. 18 & 18A. Accordingly, the specific internal configuration of either the first or second seal 240, 250 in no way limits the scope of the multi-shaft seal assembly 202 as disclosed herein.

Figure 20:
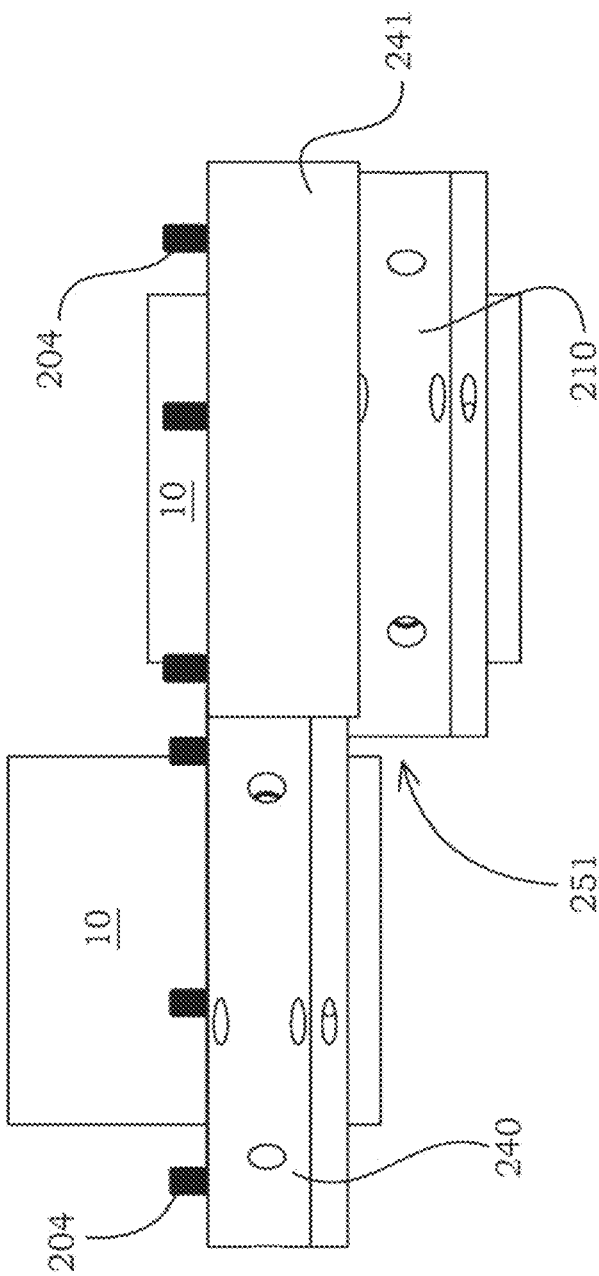
FIG. 20 is a plane vertical view of the embodiment shown in FIG. 19.

As shown in FIG. 21, each seal 240, 250 may be configured to include a fixed stator 210, floating stator 220, face plate 212, and a rotor 220, all of which are shown in FIG. 21 as being configured to operate in a manner substantially similar to the embodiment of a bearing isolator 18 as shown in FIGS. 13-17, as previously mentioned. The rotor 230 may be secured to a shaft 10 such that the rotor 230 is coupled thereto and rotates therewith in any suitable manner (several of which are described above for other embodiments of a bearing isolator 18 and/or shaft seal assemblies 25, 200). The fixed stator 210 may be secured to a housing 19 in any suitable manner (several of which are described above for other embodiments of a bearing isolator 18 and/or shaft seal assemblies 25, 200 and which include but are not limited to mechanical fasteners 204, chemical adhesives, welding, interference fit, and/or combinations thereof). One such suitable manner includes fasteners 204 as shown in FIGS. 19, 20, & 22 and corresponding apertures 206. The floating stator 220 may be positioned within a portion of an annular recess 216 formed in the fixed stator 10, wherein the exterior axial boundary of the annular recess 216 may be defined by the interior surface of a face plate 212, which may be engaged with the fixed stator 210 as previously described for other embodiments of the bearing isolator 18 and shaft seal assemblies 25, 200.

The fixed stator 210, floating stator 220, rotor 230, and/or face plate 212 may cooperate to form a labyrinth seal. The fixed stator 210, floating stator 220, and/or the rotor 230 may be constructed in a two-piece manner. As mentioned, in the illustrative embodiment, the fixed stator 210 may be configured to engage a face plate 212 via a plurality of fasteners 204, which may be distinct from the fasteners 204 used to engage the fixed stator 210 with the housing 19. Other methods and/or structures for engaging the face plate 212 with the fixed stator 210 may be used without limitation. Additionally, an interface between two portions of the rotor 230, two portions of the fixed stator 210, the fixed stator 210 and the floating stator 220, the rotor 230 and the floating stator 220, and/or the rotor 230 and fixed stator 210 may be semi-spherical, as shown for the interface between the rotor 230 and floating stator 220 for the embodiment pictured in FIG. 21. Furthermore, the seals 240, 250 may be formed with an inlet 214 therein, as previously described for the other embodiments of a bearing isolator 18 and shaft seal assemblies 25, 200 disclosed herein to provide a sealing fluid to various passages within the multi-shaft seal assembly 202.

To accommodate two shafts 10 in relative close proximity, the illustrative embodiment of a multi-shaft seal assembly 202 employs a configuration in which the first and second seals 240, 250 are configured in a stacked arrangement (see FIGS. 20 & 21). That is, the first seal 240 may reside in a different radially oriented plane than that in which the second seal 250 resides. In the illustrative embodiment, the planes are parallel with respect to one another. However, in other embodiments of the multi-shaft seal assembly 202 not pictured herein, the planes may have other orientations, which orientations may be dependent at least in part on the orientation of the shafts 10 and/or housing 19.

A collar 241 may be secured to the housing 19 and/or the first seal 240 to provide the proper axial spacing for the stacking arrangement of the first and second seals 240, 250. In the illustrative embodiment the collar 241 may be formed separately from either the first seal 240 or the housing 19, and later secured to the first seal 240 and/or housing 19. As clearly shown in FIG. 19B, which provides a rear side perspective view of the illustrative embodiment of a multi-shaft seal assembly 202, the collar 241 may be formed with a collar cutaway 242 therein to accommodate a portion of the second seal 250. As shown, the collar cutaway 242 may be configured with an angled portion to interface with the exterior surface of the first seal 240.

Figure 19B:
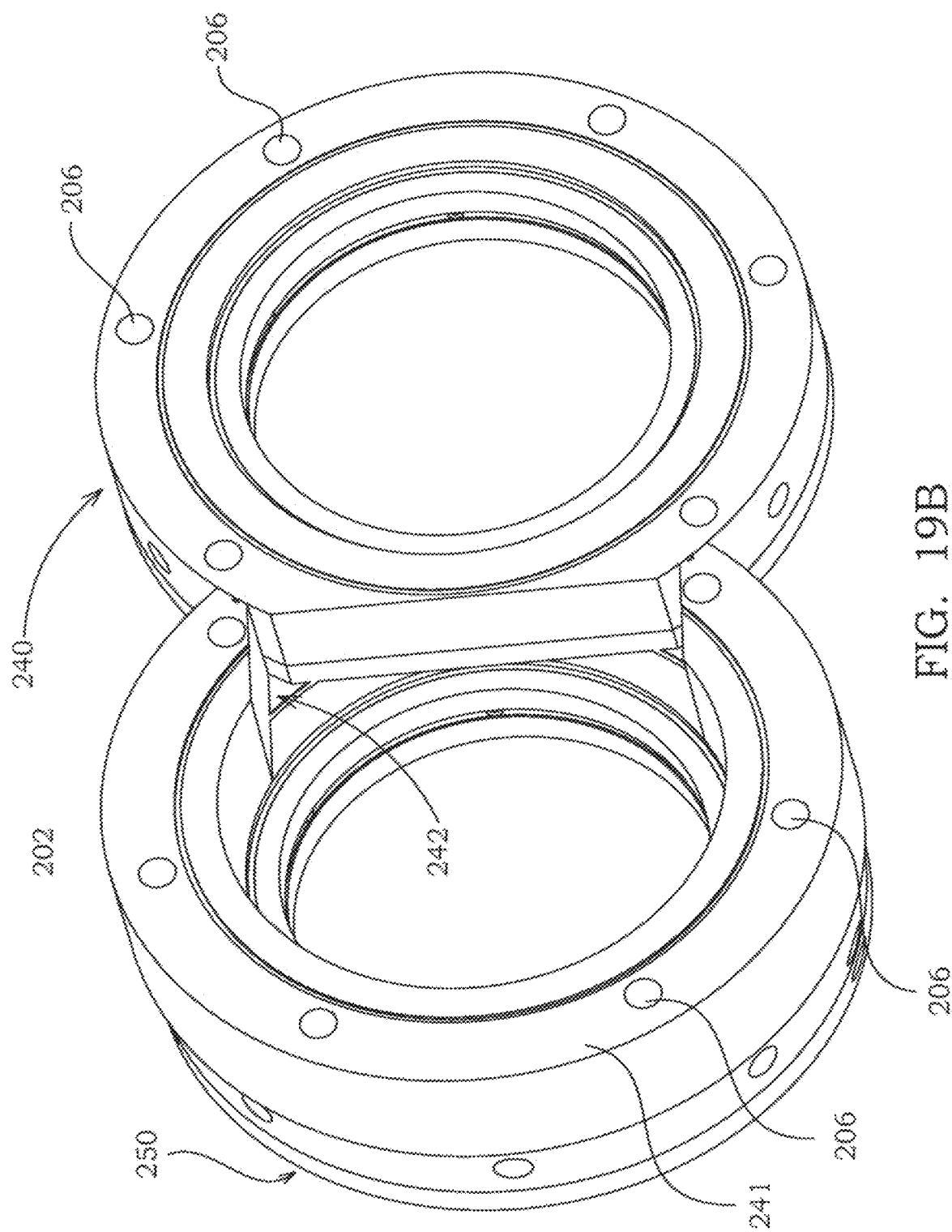
FIG. 19B is a rear perspective view of the embodiment of a multi-shaft seal assembly shown in FIG. 19.

In most applications, the surface prominently shown in FIG. 19B is adjacent a housing 19 during use of the multi-shaft seal assembly 202. Accordingly, the surface of the collar 241 and/or first seal 240 adjacent the housing 19 may be formed with an o-ring channel therein to accommodate an o-ring. An o-ring so positioned may serve to prevent air and/or other fluid from egress/ingress between the collar 241 and housing 19 and/or between the first seal 240 and housing 19. The specific shape, dimensions, and/or configuration of the collar cutaway 242 will vary from one embodiment of the twin-shaft seal assembly 202 to the next, and may be at least dependent upon the spacing of the shafts 10 and/or configuration of the first and second seals 240, 250, and is therefore in no way limiting to the scope of the multi-shaft seal assembly 202. As shown for the illustrative embodiment, the collar 241 may be secured to the housing 19 via one or more fasteners 204 and corresponding apertures 206. However, in other embodiments of the multi-shaft seal assembly 202 pictured herein, the collar 241 may be integrally formed with a portion of the first seal 240. In still other embodiments of the multi-shaft seal assembly 202 not pictured herein the collar 241 may be integrally formed with the housing 19. In another embodiment of a multi-shaft seal assembly 202 not pictured herein the collar 241 may be integrally formed with the second seal 250. Accordingly, the multi-shaft seal assembly 202 is not limited by the specific configuration of the first collar 241 with respect to the housing 19, first seal 240, and/or second seal 250.

The collar 241 may serve as an axial spacer between the equipment housing and the second seal 250 as clearly shown in FIGS. 20 & 21. In this embodiment, the axial dimension of the collar 241 is approximately equal to that of the first and second seals 240, 250. However, the collar 240 may be formed with a collar lip 241a into which a portion of the second seal 250 may seat, as shown in FIG. 21. Accordingly, in applications wherein the radial dimension of the first and/or second seal 240, 250 is too great for mounting thereof in the same radial plane due to the spacing of two adjacent shafts 10, the first and second seals 240, 250 may be applied to the shafts 10 in an axially offset configuration.

The multi-shaft seal assembly 202 may also include a cutaway 251 formed in a portion of the second seal 250. A cutaway 251 may be required to accommodate certain configurations of adjacent shafts 10 wherein the shafts 10 are in relative close proximity to one another. As best shown in FIGS. 20 & 22, the configuration of shafts 10 in the illustrative embodiment of the multi-shaft seal assembly 202 are in relatively close proximity to one another such that the second seal 250 must be formed with a cutaway 251 to accommodate adequate clearance with the shaft 10 corresponding to the first seal 240. However, in other configurations of adjacent shafts 10, the multi-shaft seal assembly 202 may not require a cutaway 251. Accordingly, the multi-shaft seal assembly 202 is in no way limited the presence, absence, and/or configuration of a cutaway 251. Generally, a cutaway 251 may reduce the radial dimension of the fixed stator 210 and/or face plate 212, as shown in FIG. 21. However, in other configurations the cutaway 251 may alternatively or additional reduce the radial dimension of the floating stator 220 and/or rotor 230.

Although the illustrative embodiment of a multi-shaft seal assembly 202 is configured to accommodate two shafts 10, other embodiments not pictured herein are configured to accommodate more than two shafts 10. Accordingly, the multi-shaft seal assembly 202 is not limited by the number of shafts 10 and/or seals 240, 250 associated therewith.

Additional Embodiments of a Shaft Seal Assembly

Figure 22A:
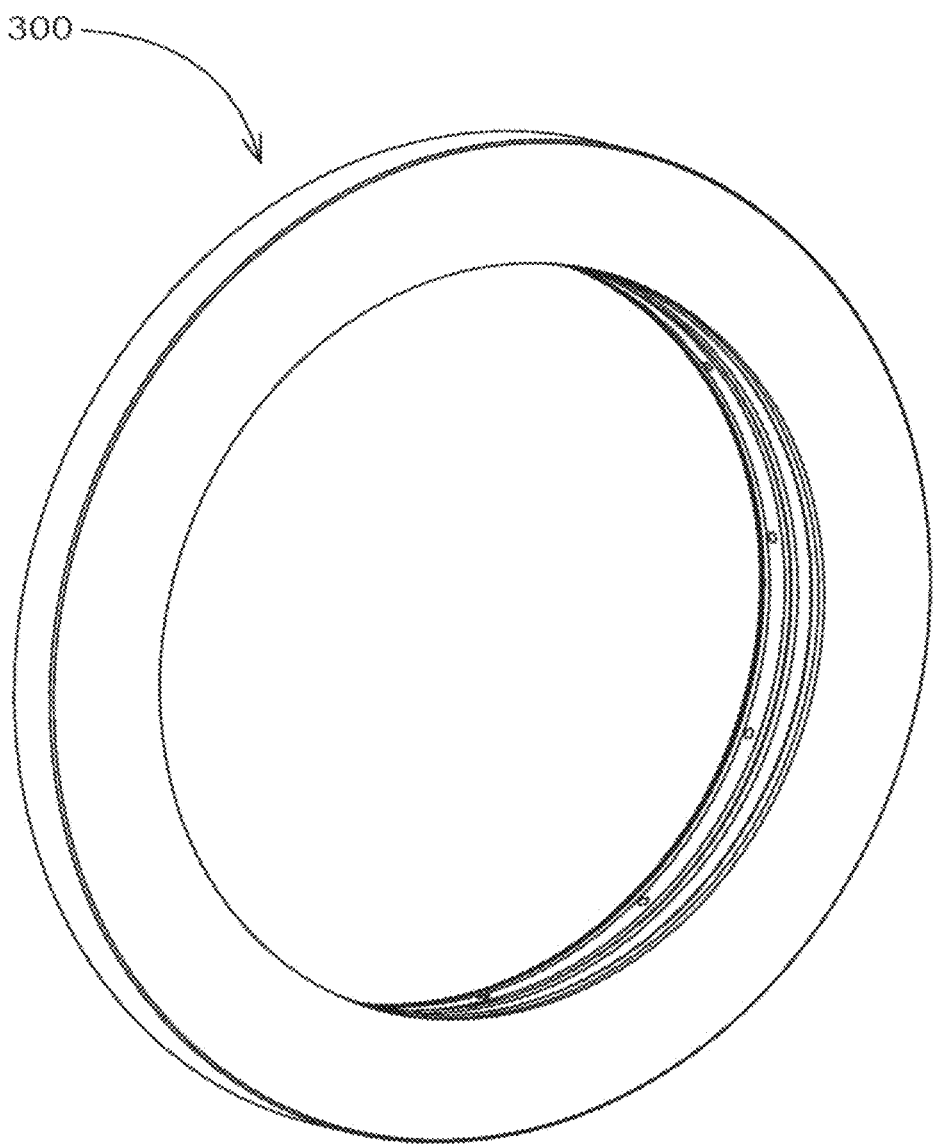
FIG. 22A is perspective view of another embodiment of a shaft seal assembly.
Figure 22B:
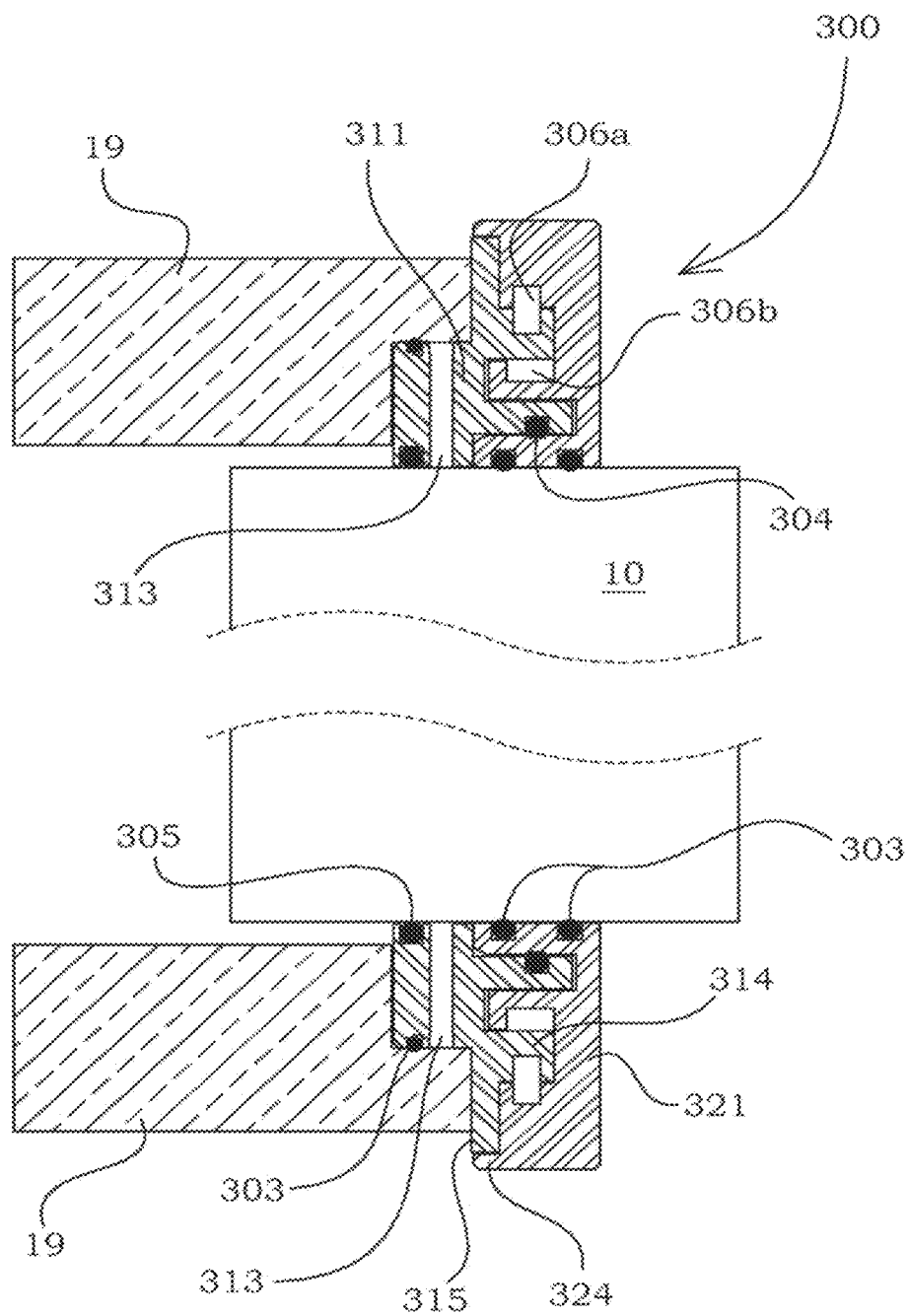
FIG. 22B is an axial, cross-sectional view of the embodiment of a shaft seal assembly shown in FIG. 22A.

Another embodiment of a shaft seal assembly 200 is shown in perspective view in FIG. 22A. The illustrative embodiment shown in FIG. 22A includes both a stator 310 and a rotor 320, which may rotate with respect to one another. The stator 310 may engage a housing 19 and surround a shaft 10 that is rotatable with respect to and extends from the housing 19. In the illustrative embodiment, an o-ring 303 positioned in an o-ring channel 302 formed in the stator 310 may be used to properly engage the stator 310 with the housing 19. However, any other suitable method and/or structure for adequately engaging the stator 310 with the housing 19 may be used with the shaft seal assembly 300 without departing from the spirit and scope as disclosed herein.

The rotor 320 may also surround the shaft 10, and it may also be engaged with the shaft 10 so as to rotate therewith. In the illustrative embodiment, an o-ring 303 positioned in an o-ring channel 302 formed in the rotor 320 may be used to properly engage the rotor 320 with the shaft 10. However, any other suitable method and/or structure for adequately engaging the rotor 320 with the shaft 10 may be used with the shaft seal assembly 300 without departing from the spirit and scope as disclosed herein. It is contemplated that this embodiment may be especially suited for applications in which the shaft 10 and/or housing 19 is oriented in a generally vertical arrangement and extends upward with respect to the housing 19, but the application of the shaft seal assembly 300 in no way limits the scope thereof. Furthermore, any embodiments of a shaft seal assembly 25, 200, 202 may be configured with advantageous features disclosed herein related to the embodiment of a shaft seal assembly 300 shown in FIGS. 22A-22D without limitation alone or in combination.

Figure 22C:
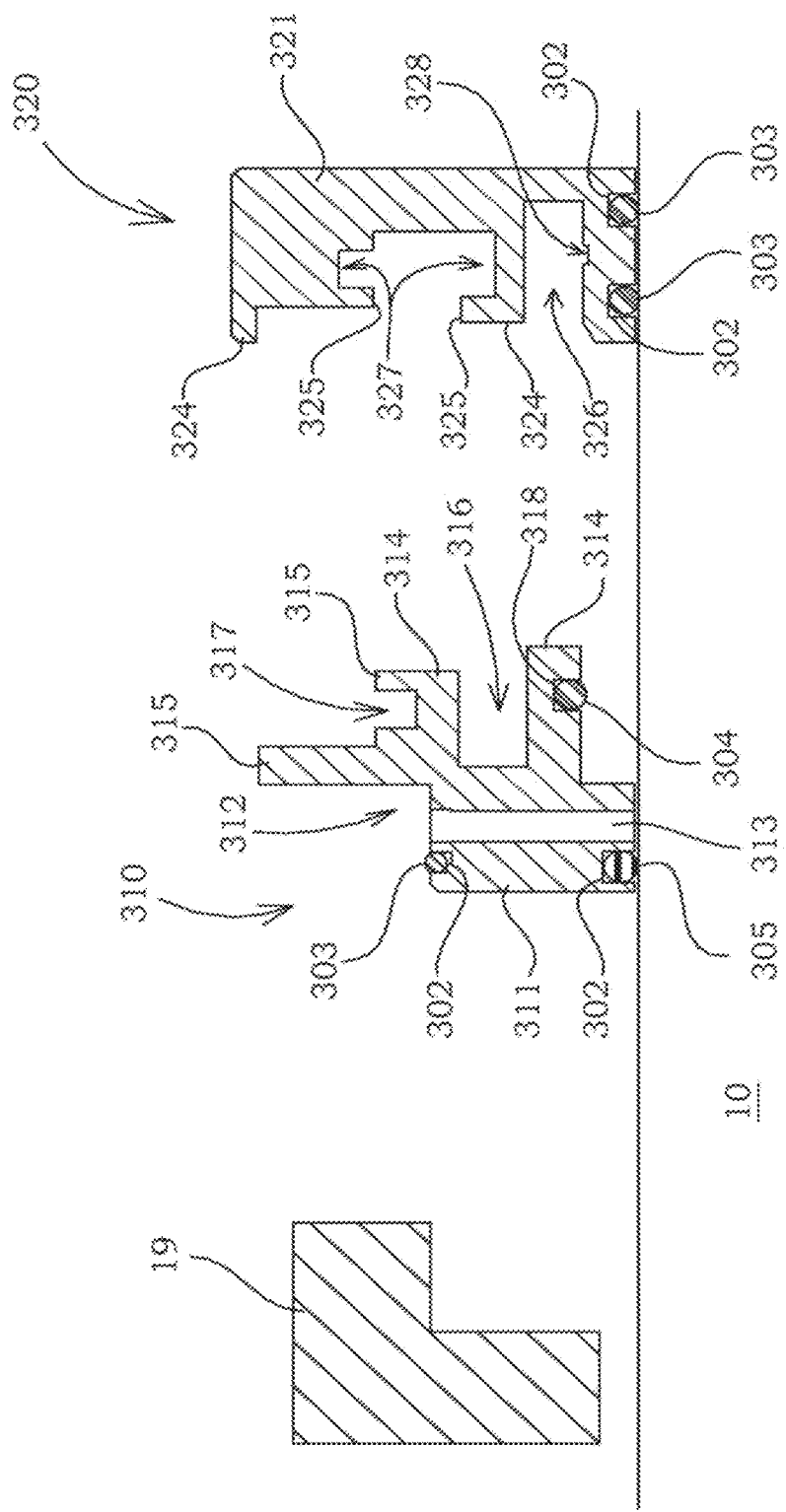
FIG. 22C is an axial, exploded cross-sectional view of the embodiment of a shaft seal assembly shown in FIG. 22A.

The stator 310 may be formed with a stator body 311 having one or more axial projections 314 and/or radial projections 315 extending therefrom. Additionally, an axial projection 314 may extend from a radial projection 315 or vice versa. The embodiment of a shaft seal assembly 300 from FIG. 22A is shown in FIG. 22C with the stator 310 and rotor 320 separated from one another. As shown, a shoulder 312 may be formed in the stator body 311 to provide an interface with a housing 19. An o-ring channel 302 may be formed in the shoulder 312 to accommodate an o-ring 303 to facilitate proper engagement of the stator 310 and housing 19, as previously described above. Another o-ring channel 302 may be formed on the interior surface of the stator body 311 adjacent the shaft 10. A slip ring 305 may be positioned in this o-ring channel 302 to mitigate egress of lubricant from the housing 19 and ingress of contaminants to the housing 19 via the space between the shaft 10 and stator 310. The stator body 311 may also be formed with one or more radial bores 313 to facilitate an optional sealing fluid (e.g., air, water, etc.) to further mitigate the egress and/or ingress described above.

The rotor 320 may be formed with a rotor body 321 having one or more rotor axial projections 324 and/or rotor radial projections 325 extending therefrom. Additionally, a rotor axial projection 324 may extend from a rotor radial projection 325 or vice versa. A unitizing ring 304 may reside partially within a unitizing ring channel 318 formed in the stator 310 and partially within a rotor unitizing ring channel 328 and function to allow only a predetermined amount of relative axial motion between the stator 310 and rotor 320. From a comparison of FIGS. 22B and 22C, it will be apparent to those of ordinary skill in the art that the various axial projections 314, radial projections 315, axial channels 316, and/or radial channels 317 formed in the stator 310 may cooperate with various rotor axial projections 324, rotor radial projections 325, rotor axial channels 326, and/or rotor radial channels 327 to create a labyrinth seal having a laborious and/or circuitous path of one or more axial channels 316 and/or one or more radial channels 317 for egress of lubricants from the housing 19 and/or ingress of contaminants to the housing 19. An infinite number of configurations for the various axial projections 314, radial projections 315, axial channels 316, and/or radial channels 317 formed in the stator 310 may cooperate with various rotor axial projections 324, rotor radial projections 325, rotor axial channels 326, and/or rotor radial channels 327 exist, and accordingly, the specific number, existence, and/or configuration thereof in no way limits the scope of the shaft seal assembly 300 as disclosed and claimed herein.

Figure 22D:
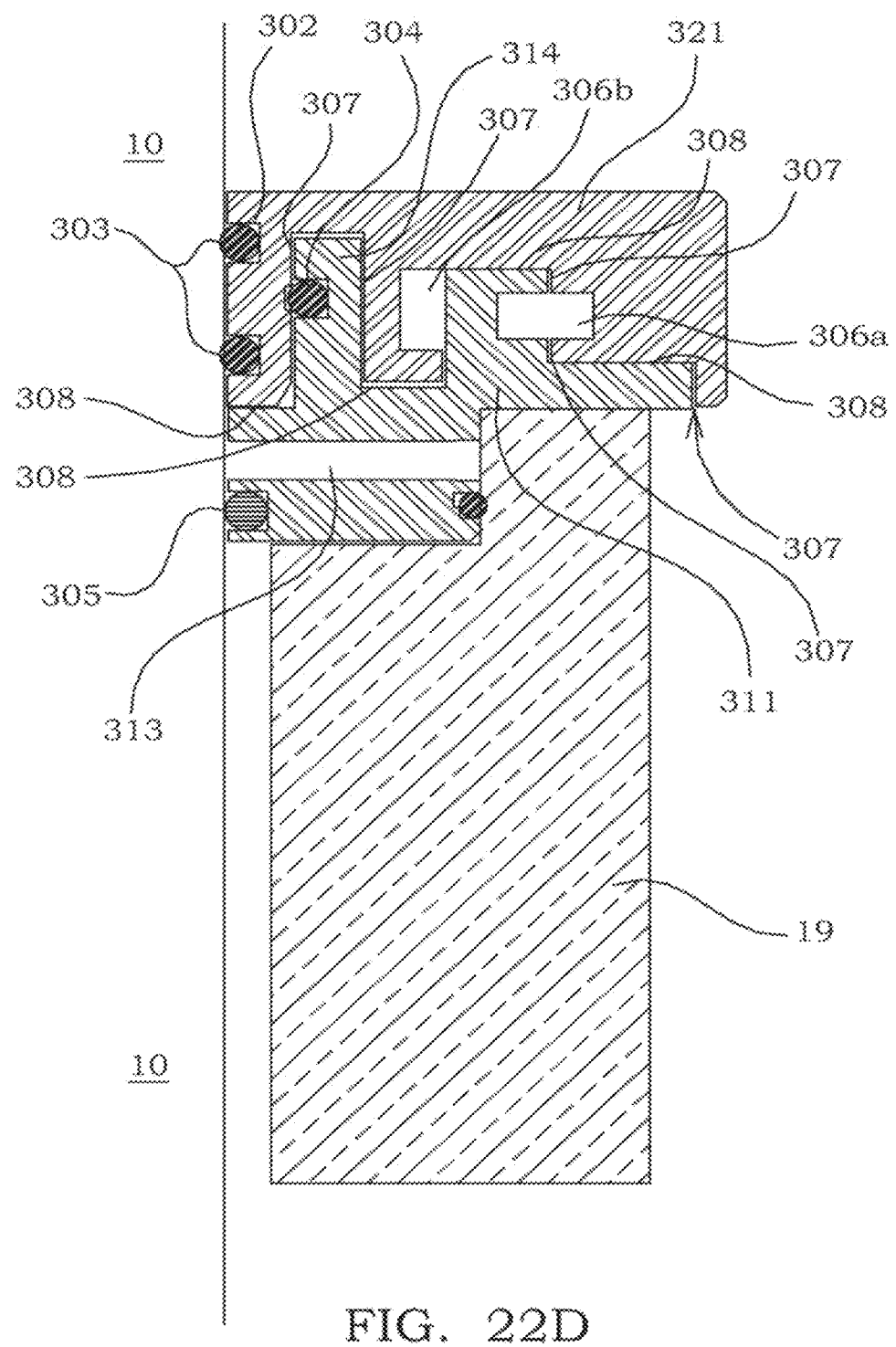
FIG. 22D is a detailed cross-sectional view of the embodiment of a shaft seal assembly shown in FIGS. 22A-22C wherein the shaft is vertically oriented.

In the illustrative embodiment of a shaft seal assembly 300 shown herein, the axial projections 314, radial projections 315, axial channels 316, and/or radial channels 317 formed in the stator 310 may cooperate with various rotor axial projections 324, rotor radial projections 325, rotor axial channels 326, and/or rotor radial channels 327 may be configured to form a first cooperating cavity 306a, a second cooperating cavity 306b, and an axial passage 307 for the first potential ingress point for contaminants. Referring to FIG. 22D, which shows the illustrative embodiment of the shaft seal assembly 300 engaged with a generally vertically oriented shaft 10 protruding upward from a housing 19, the path contaminants must traverse to pass through the illustrative embodiment of the shaft seal assembly 300 is exceedingly tortuous. The only ingress point is a downwardly oriented terminus of an axial passage 307, entry to which requires overcoming gravity. After a radial passage 308, contaminants are faced with another axial passage 307 requiring overcoming gravity once again. This axial passage 307 leads to a first cooperating cavity 306a. Contaminants retained in the first cooperating cavity 306a may simply drain downward therefrom via gravity. An axial passage 307 at the top of the first cooperating cavity 306a requires contaminants to completely fill the first cooperating cavity 306a and then overcome gravity to exit the first cooperating cavity 306a via the top axial passage 307.

A radial passage 308 may fluidly connect the axial passage 307 at the top of the first cooperating cavity 306a to a second cooperating cavity 306b. In the illustrative embodiment, three sides of the second cooperating cavity 306b may be formed via the rotor 320, which generally rotates with the shaft 10 during use. Accordingly, contaminants reaching the second cooperating chamber 306b may be flung radially outward due to centrifugal force imparted to the contaminants via rotation of the rotor 320. If contaminants within the second cooperating chamber 306b drain via gravity through an axial passage 307 at the bottom of the second cooperating chamber 306b, those contaminants must traverse a radial passage 308 prior to encountering a comparatively long radial passage 308 that leads to another axial passage 307 adjacent the distal end of an axial projection 314 formed in the stator 310. Another comparatively long radial passage 308 may be in fluid communication with the axial passage 307 adjacent the distal end of an axial projection 314 formed in the stator 310, the path through which radial passage 308 may be interrupted by a unitizing ring 304 occupying a portion of a unitizing ring channel 318 formed in the stator 310 and a portion of a rotor unitizing ring channel 328. Should contaminants traverse this radial passage 308, those contaminants must also traverse an axial passage 307 in fluid communication with that radial passage 308 before contacting the shaft 10. To enter the housing 19, contaminants positioned on the shaft 19 between the stator 310 and rotor 320 must traverse a slip ring 305 that, in the illustrative embodiment of a shaft seal assembly 300, may be positioned in an o-ring channel 302 in the stator 310 adjacent the shaft 10.

In the illustrative embodiment of the shaft seal assembly 300 pictured herein, the various transitions between axial passages 307 and radial passages 308 may be configured as right angles. Additionally, all axial passages 307 may be parallel with one another and perpendicular to all radial passages 308. However, in other embodiments the axial passages 307 and/or radial passages 308 may have different orientations without limitation. For example, in an embodiment not pictured herein, an axial passage 307 may be angled at 45 degrees with respect to the rotational axis of the shaft 10.

Porous Media Shaft Seal Assembly
Element Listing (FIGS. 23-27)

| Description | Element No. |
| --- | --- |
| Shaft | 10 |
| Housing | 12 |
| Housing contents | 13 |
| Porous media | 14 |
| Sealed surface | 14a |
| Open surface | 14b |
| O-ring | 16 |
| Stator | 20 |
| Stator groove | 20a |
| Pin cavity | 20b |
| Stator main body | 21 |
| Port | 21a |
| Passage | 21b |
| Floating stator first portion | 22a |
| Floating stator second portion | 22b |
| Stator cap | 23 |
| Cap groove | 23a |
| Connector | 24 |
| Pin | 26 |
| Seal | 30 |
| Seal convex surface | 32 |
| Seal passage | 34 |
| Rotor | 40 |
| Rotor collar | 42 |
| Interface member | 44 |
| Rotor connector | 46 |
| Biasing member | 50 |
| Cone sealing structure | 60 |
| First end | 62 |
| Second end | 64 |
| Fastener | 66 |
| Porous media shaft seal assembly | 100 |

Figure 23:
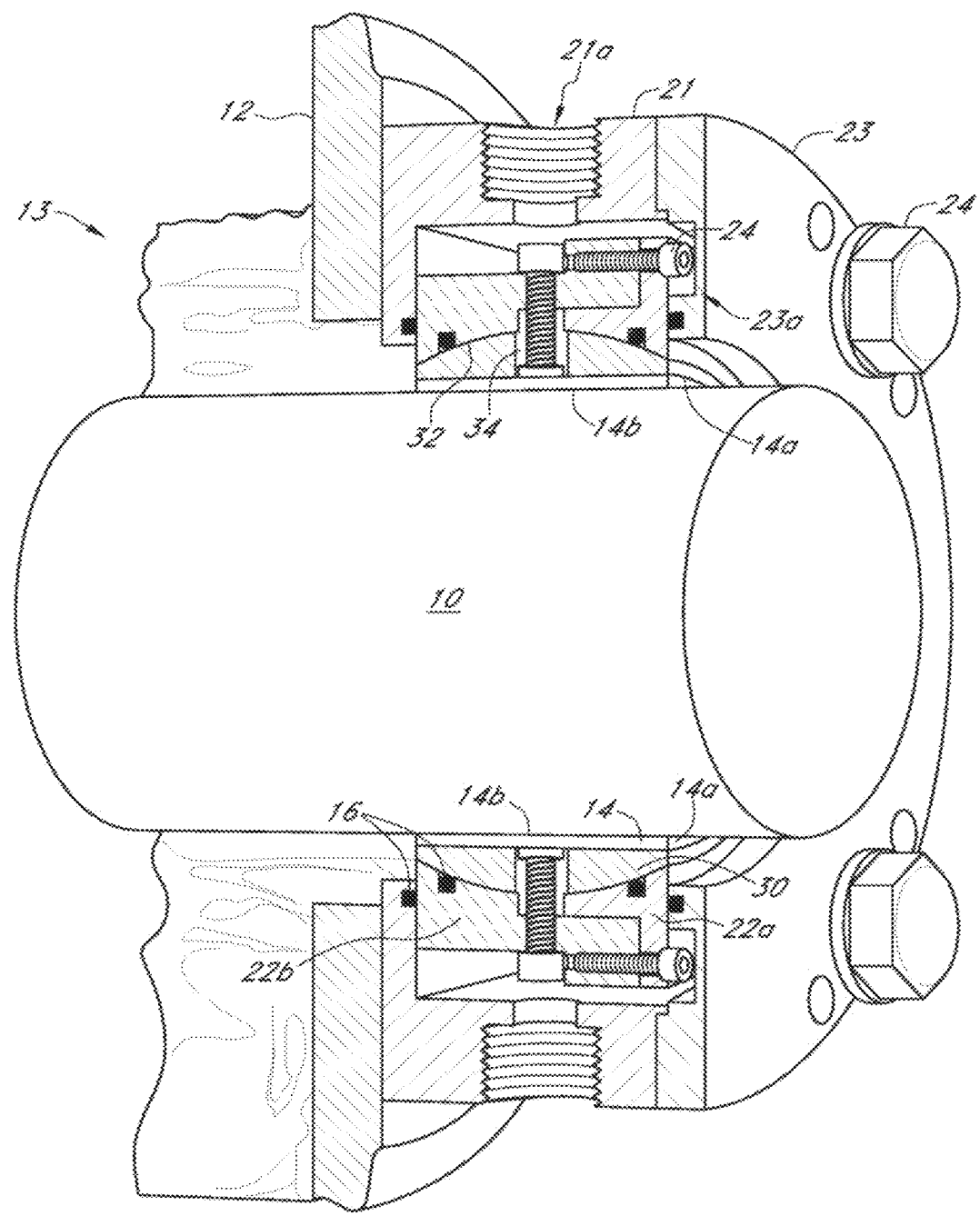
FIG. 23 is an axial, cross-sectional view of another embodiment of a porous media shaft seal assembly.

A perspective view of a first illustrative embodiment of a porous media shaft seal assembly 100 is shown in FIG. 23. Unless otherwise indicated, the orientation of all FIGS. 23 and 25-27 places the fluid side of the porous media shaft seal assembly 100 toward the left of the drawing and the outboard side toward the right of the drawing. Generally, the embodiment of a porous media shaft seal assembly 100 shown in FIG. 23 functions in a manner analogous to that of the shaft seal assembly 25 shown in FIG. 1-7 or 9-12.

Generally, the porous media shaft seal assembly 100 may accommodate angular misalignment of the shaft 10, as well as axial and radial movement thereof using generally the same principles as those previously explained for the shaft seal assembly 25 shown in FIG. 1-7 or 9-12. Accordingly, the stator 20 may include a stator main body 21 and a floating stator first and second portion 22a, 22b positioned within a cavity formed by the stator main body 21 and a stator cap 23. The seal 30 may be engaged with the floating stator first and/or second portion 22a, 22b about a spherical or semi-spherical interface as previously described above for the shaft seal assembly 25.

As with the embodiment of a shaft seal assembly 25 shown in FIG. 1-7 or 9-12, a seal fluid (which oftentimes may be pressurized, and which may be a gas, liquid, vapor, and/or combination thereof) may be introduced into the porous media shaft seal assembly 100 via a port 21a, which may be formed in the stator 20. The seal fluid may be communicated to the seal 30 through the stator 20 (e.g., via passages 21b formed in the floating stator first and/or second portions 22a, 22b). It is contemplated that in one embodiment, a plurality of radially oriented passages 21b may be formed in the floating stator second portion 22b and may serve to communicate seal fluid from an area between the stator main body 21 to the seal 30. These same passages 21b may correspond to one or more seal passages 34 formed in the seal 30, which seal passages 34 also may be radially oriented. In the porous media shaft seal assembly 100, a layer of porous media 14 may be engaged with the surface of the seal 30 that faces the shaft 10, as shown in FIG. 23. The porous media 14 may comprise one or more sealed surfaces 14a and one or more open surfaces 14b.

The sealed surfaces 14a may be configured to be impermeable to a desired fluid and/or group of fluids (which may comprise the seal fluid). Accordingly, the open surface(s) 14b may be configured to be permeable to a desired fluid and/or group of fluids (which may comprise the seal fluid). In this manner, seal fluid may be introduced to the porous media 14 and exit the porous media 14 only at the open surface(s) 14b, which may constitute the active surface of the porous media shaft seal assembly 100. Special compounds are used in the porous air bearing industry to provide this sealing capability. For the embodiment shown in FIG. 23, it is contemplated that the axial faces of the porous media 14 may comprise sealed surfaces 14a, as well as the surface of the porous media 14 positioned adjacent the seal 30. This configuration may serve to retain internal seal fluid pressure, but other configurations of sealed surfaces 14a and open surfaces 14b may be used with the porous media shaft seal assembly 100 without limitation. It is further contemplated that the interior periphery (or a portion thereof) of the porous media 14 may be configured as an open surface 14b such that seal fluid may exit the porous media shaft seal assembly 100 along the shaft 10.

Figure 24:
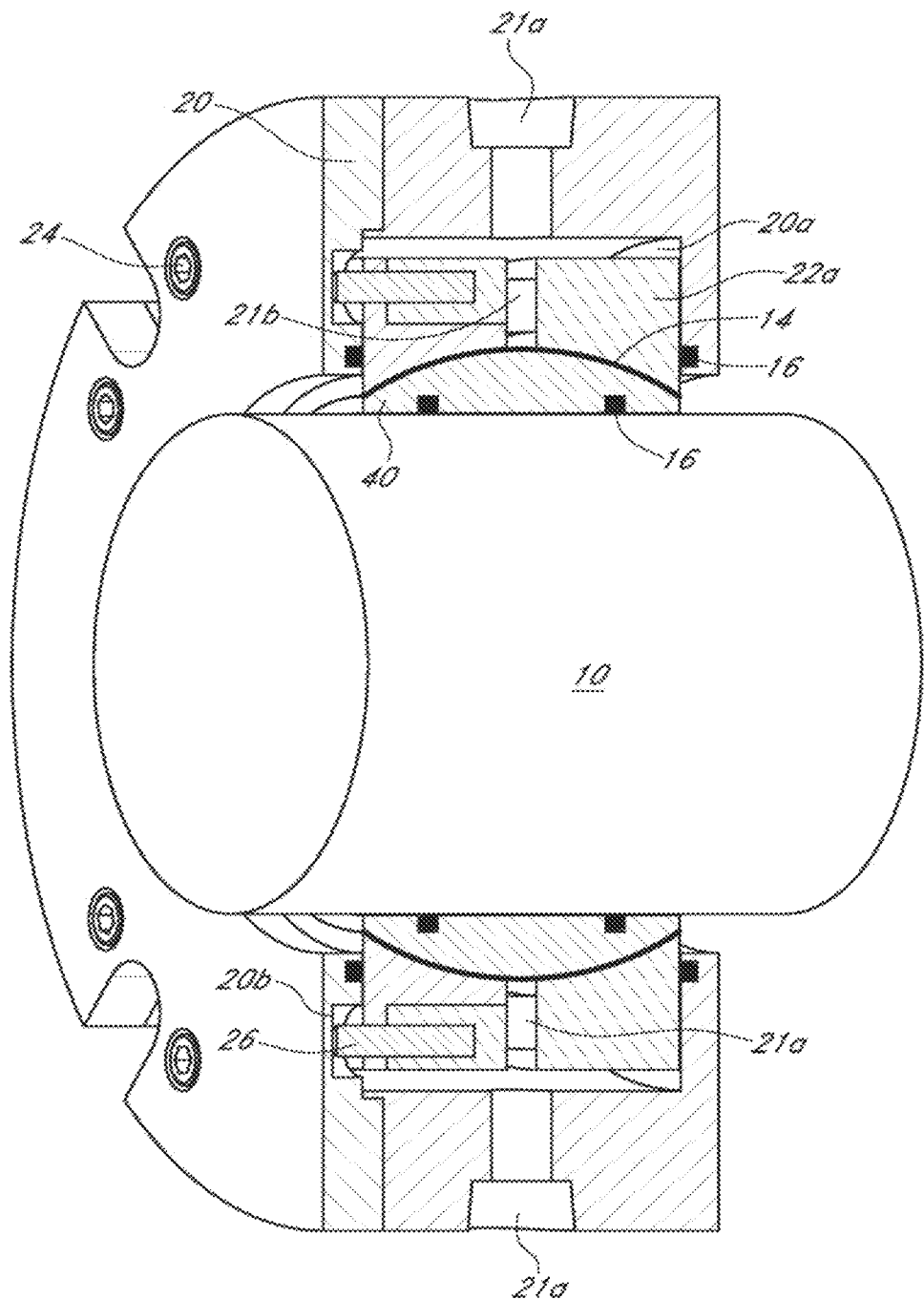
FIG. 24 is an axial, cross-sectional view of another embodiment of a porous media shaft seal assembly.

A perspective view of a second illustrative embodiment of a porous media shaft seal assembly 100 is shown in FIG. 24. Generally, this embodiment of a porous media shaft seal assembly 100 functions in a manner analogous to that of the bearing isolator 18 and/or shaft seal assembly 200, various embodiments of which are shown in FIGS. 13-18A and described in detail above. However, in the porous media shaft seal assembly 100, a layer of porous media 14 may be engaged with the surface of the rotor 40 adjacent the interface between a floating stator first portion 22a and the rotor 40 (which may be configured as a semi-spherical interface). Alternatively, a layer of porous media 14 may be engaged with the surface of the floating stator first portion 22a adjacent the interface between the floating stator first portion 22a and the rotor 40. As with the embodiment shown in FIG. 23, the porous media 14 in this embodiment may comprise one or more sealed surfaces 14a and one or more open surfaces 14b.

As with the embodiment of a porous media shaft seal assembly 100 shown in FIG. 23, a seal fluid may be introduced into the porous media shaft seal assembly 100 via a port 21*a*, which may be formed in the stator 20. The seal fluid may be communicated to the interface between the floating stator first portion 22*a* and the rotor 40 (e.g., via passages 21*b* formed in the floating stator first portion 22*a*). For the embodiment shown in FIG. 24, it is contemplated that for most applications it will be advantageous to configure the porous media 14 on an interior portion of the floating stator first portion 22*a*, such that the porous media 14 does not rotate and is secured with the stator 20. In one embodiment, a plurality of radially oriented passages 21*b* may be formed in the floating stator first portion 22*a* and may serve to communicate seal fluid from a stator groove 20*a* to the interface between the floating stator first portion 22*a* and the rotor 40. These same passages 21*b* may correspond to one or more open surfaces 14*b* in the porous media on a surface of the porous media 14 adjacent the floating stator first portion 22*a*. It is further contemplated that the axial faces of the porous media 14 may comprise sealed surfaces 14*a*, as well as at least a portion of the surface of the porous media 14 positioned adjacent the floating stator first portion 22*a* (e.g., any portion of that surface that does not align with a passage 21*b*). This configuration may serve to retain internal seal fluid pressure.

It is further contemplated that the interior periphery (or a portion thereof) of the porous media 14 may be configured as an open surface 14*b* such that seal fluid may exit the porous media shaft seal assembly 100 along the interface between the floating stator first portion 22*a* and the rotor 40. However, other configurations of sealed surfaces 14*a* and open surfaces 14*b* may be used with the porous media shaft seal assembly 100 without limitation. Furthermore, in any embodiments of the porous media shaft seal assembly 100, one or more O-rings (with or without a corresponding groove) may be used to provide a seal between various surfaces.

In another embodiment of a porous media shaft seal assembly 100 not pictured herein but similar to that shown in FIG. 24, the rotor 40 may be comprised to two separate portions biased away from one another (and consequently, toward the stator 20). The biasing member may be a magnetic field, a spring, or any other suitable method and/or apparatus for biasing the relevant portions away from one another. The seal fluid may serve to urge the two portions toward one another. Accordingly, the biasing member may cooperate with the rotor 40 and stator 20 (and/or floating stator first and/or second portions 22*a*, 22*b*) to physically seal the housing 12 from the external environment in the instance of loss of pressurized fluid to the porous media shaft seal assembly 100.

Figure 25:
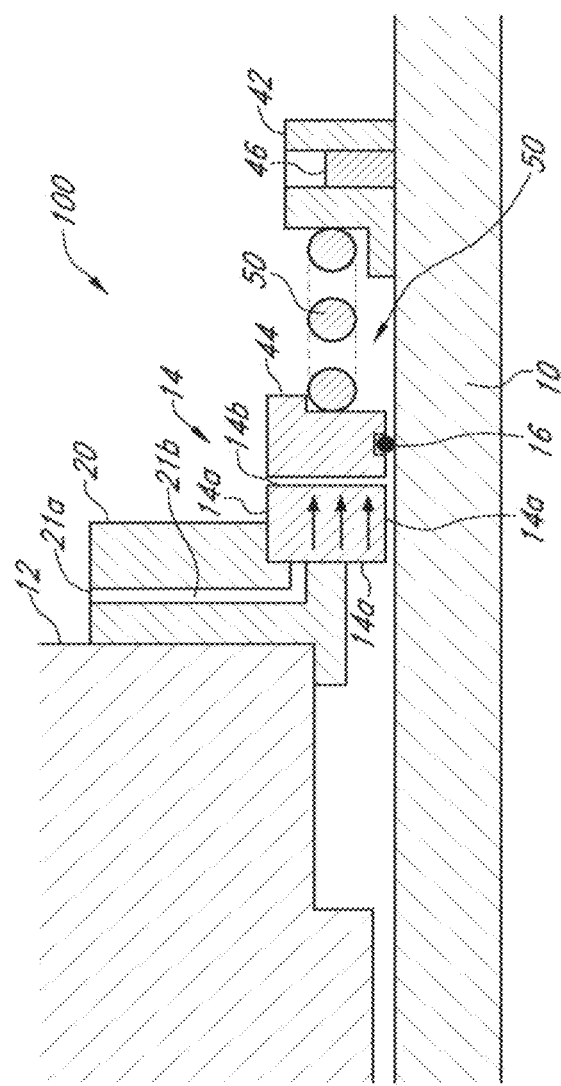
FIG. 25 is an axial, cross-sectional view of another embodiment of a porous media shaft seal assembly.

The top portion of another embodiment of a porous media shaft seal assembly 100 is shown in cross-section in FIG. 25. In this embodiment, the rotor 40 may include a rotor collar 42 and an interface member 44. The rotor collar 42 may be engaged with the shaft 10 such that the axial position of the rotor collar 42 on the shaft 10 may be fixed. This engagement may be accomplished via a rotor connector 46, which may be a set screw as shown in the illustrative embodiment. However, any suitable structure and/or method may be used to adequately engage the rotor collar 42 with the shaft 10, and the scope of the porous media shaft seal assembly 100 is in no way limited by the structure and/or method used therefor. The interface member 44 may be configured to be moveable along a portion of the shaft 10 in the axial dimension. An O-ring 16 may be positioned in a groove in the interface member 44 adjacent the shaft 10 and configured to allow movement of the interface member 44 with respect to the shaft 10 in the axial dimension with a predetermined amount of force applied to the interface member 44 in an axial dimension with respect to the shaft 10.

A stator 20 may be engaged with a housing 12. This engagement may be accomplished via any suitable structure and/or method for the specific application of the porous media shaft seal assembly 100, including but not limited to mechanical fasteners, press-fit engagement, chemical adhesives, and/or combinations thereof. A biasing member 50 may be employed to urge the interface member 44 of the rotor 40 toward a portion of the stator 20. Accordingly, the axial position of the interface member 44 on the shaft 10 may be variable in a manner as previously described. As with the previously described embodiments, a layer of porous media 14 may be positioned between the stationary and rotating portions of the porous media shaft seal assembly 100. The porous media 14 may comprise one or more sealed surfaces 14*a* and one or more open surfaces 14*b*.

A seal fluid may be introduced into the porous media shaft seal assembly 100 via a port 21*a*, which may be formed in the stator 20. The seal fluid may be communicated to the porous media 14 via one or more passages 21*b* formed in the stator 20. In the embodiment pictured in FIG. 25, it is contemplated that the interface member 44 may rotate with respect to the stator 20, such that a layer of porous media 14 may be positioned on the stator 20. In the embodiment shown in FIG. 25, the biasing member 50 may comprise a single spring that fits over the outside diameter of the shaft 10. However, other types of biasing members 50 may be used without limitation. Shoulders and/or corresponding recesses formed in the rotor collar 42 and/or interface member 44 may be used to adequately retain the biasing member 50 within the porous media shaft seal 100.

The seal fluid may be communicated to the porous media 14 in an array around the stator 20. The porous media 14 may be configured such that only the surface(s) adjacent a passage 21*b* in the stator 20 and the surface of the porous media 14 adjacent the interface member 44 of the rotor 40 are open surfaces 14*b* and the remaining surfaces of the porous media may be configured as sealed surfaces 14*a*. In this configuration, seal fluid may exit the stator 20 adjacent the interface member 44 of the rotor 40 (in the direction shown by the arrows in FIG. 25) to form an air barrier therebetween (which may be configured as any air bearing). Accordingly, the flow characteristics of the seal fluid may be manipulated such that under normal operating conditions, the seal fluid acts against the biasing member 50 and urges the interface member 44 away from the porous media 14. If the flow characteristics of the seal fluid deviate in a predetermined manner (e.g., pressure drop), the force of the biasing member 50 may overcome the force of the seal fluid and cause the interface member 44 to contact the porous media 14, thereby closing the porous media shaft seal assembly 100 and isolating the interior thereof from the exterior thereof. However, other configurations of sealed and open surfaces 14*a*, 14*b* may be used without limitation.

Figure 26:
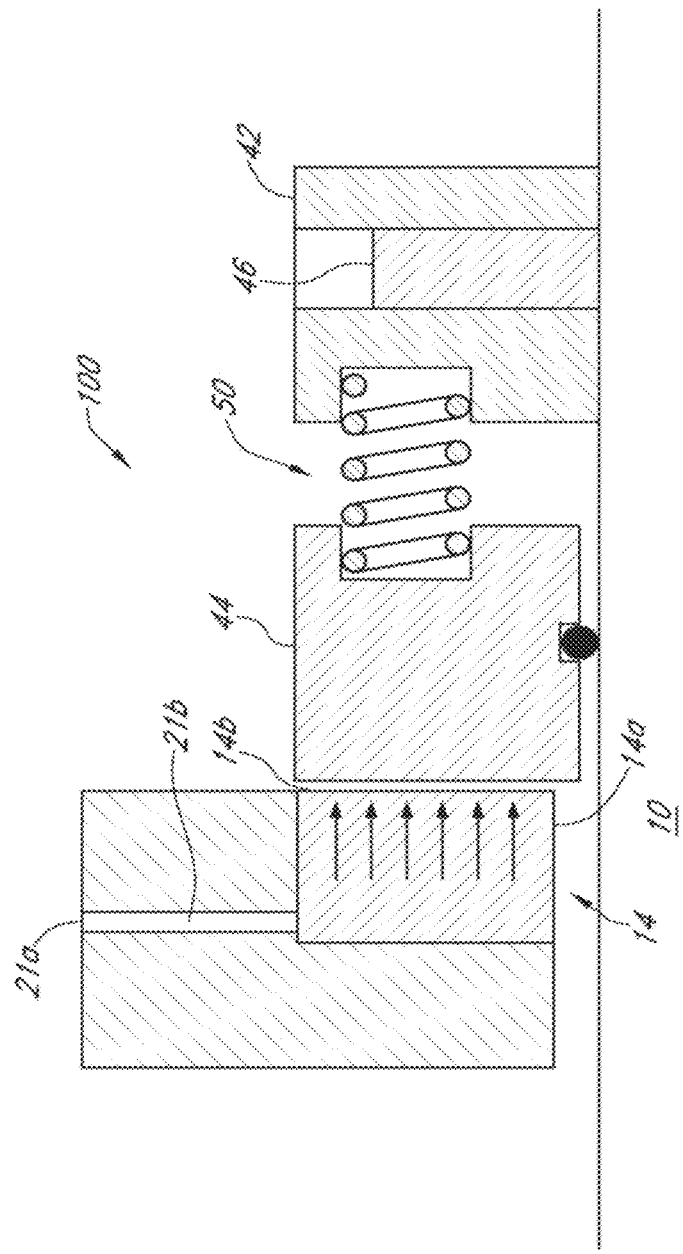
FIG. 26 is an axial, cross-sectional view of another embodiment of a porous media shaft seal assembly.

An axial, cross-sectional view of another embodiment of a porous media shaft seal assembly 100 is shown in FIG. 26. This embodiment is similar to that shown in FIG. 25 and may be configured to function in a similar manner to that shown in FIG. 25. The rotor collar 42 and interface member 44 may engage the shaft 10, and the stator 20 may engage a housing 12 in any of the manners previously described for the embodiment shown in FIG. 25, and the structure and/or method used therefor in no way limits the scope of the porous media shaft seal assembly 100.

The embodiment shown in FIG. 26 may employ multiple biasing members 50 between the rotor collar 42 and interface member 44. Accordingly, in the embodiment shown in FIG. 25, one or more biasing members may be positioned around the periphery of the shaft 10 in an array or other arrangement. It is contemplated that both the embodiment shown in FIG. 25 and that shown in FIG. 26 may be configured to mount directly to a housing 12 having a rotating shaft 10 protruding from the housing 12, or either embodiment may be configured to be used in conjunction with a stuffing box, wherein the porous media shaft seal assembly 100 may be used in addition to or in lieu of packing material.

Figure 27A:
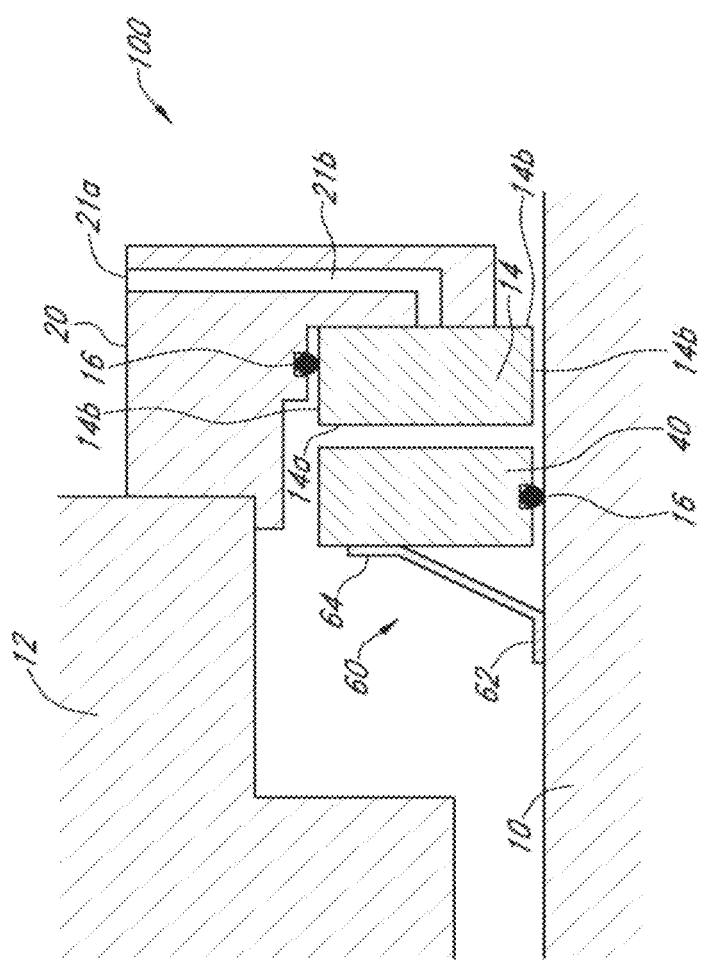
FIG. 27A is an axial, cross-sectional view of another embodiment of a porous media shaft seal assembly.

A cone sealing structure 60 is shown in the embodiment of a porous media shaft seal assembly 100 shown in FIG. 27A. In this embodiment, the cone sealing structure 60 may be mounted internally or externally to a housing 12 depending on the specific application, as described in further detail below. The cone sealing structure 60 may include a first end 62 and a second end 64. In the illustrative embodiment shown in detail in FIG. 27B, the first end 62 may provide an engagement area for the shaft 10 and the second end 64 may provide an engagement area with the rotor 40. The first end 62 may be engaged with a shaft 10 via a fastener 66 engaging a portion of the first end 62. The second end 64 may be engaged with a rotor 40 via a fastener 66 engaging a portion of the second end 64. Both fasteners may be configured as elastomeric members, wherein the fastener for the first end 62 comprises an elastomeric band and the fastener for the second end 64 comprises an elastomeric ring. Each fastener 66 may be configured to allow a certain amount of movement of the first end 62 with respect to the second end 64. However, any suitable fastener 66 may be used without limitation, including but not limited to chemical adhesives, other mechanical fasteners, and/or combinations thereof. An O-ring 16 may be positioned between a bottom surface of the rotor 40 and the shaft 10 and configured to allow movement of the rotor 40 with respect to the shaft 10 in the axial dimension with a predetermined amount of force applied to the interface member 44 in an axial dimension with respect to the shaft 10.

As in previous embodiments described herein, a biasing member 50 may be used to bias a portion of the cone sealing structure 60 toward or away from a second surface, which may be a portion of a housing 12 or a stator 20 mounted thereto. In the illustrative embodiment shown in FIG. 27A, a stator 20 may be engaged with a housing 12, which engagement may be accomplished via any suitable structure and/or method as previously disclosed herein for other embodiments of the porous media shaft seal assembly 100 without limitation. The force of the biasing member 50 may be opposed by pressurized fluid flowing through a portion of the porous media shaft seal assembly 100. The force of the biasing member 50 may be supplemented by a fluid within a vessel acting on the cone sealing structure 60 in a substantially parallel direction to that at which the biasing member 50 acts on the cone sealing structure 60. Additionally or alternatively, the cone sealing structure 60 may have an integrated biasing member between the first and second ends 62, 64.

Generally, it is contemplated that porous media 14 may be most advantageously applied to and/or engaged with a nonrotating portion of the porous media shaft seal assembly 100 to limit complexity for providing seal fluid to the porous media. For the embodiments shown in FIGS. 27A-27C, the cone sealing structure 60 may rotate with the shaft 10 via the engagement between the first end 62 and the shaft 10, which may consequently cause the second end 64 and rotor 40 to rotate. Accordingly, it is contemplated that porous media 14 may most advantageously be applied to and/or engaged with a surface of the stator 20 facing the rotor 40 for those embodiments. However, in other embodiments, it may be advantageous to apply porous media 14 to different elements and/or surfaces thereof. For example, in an embodiment not pictured herein, the cone sealing structure 60 may be engaged with a housing 12 adjacent the second end 64, such that the cone sealing structure 60 does not rotate with the shaft 10. A rotor 40 may be engaged with the shaft 10 such that it rotates therewith, and such that a portion of the rotor 40 is positioned adjacent the first end of the cone sealing structure 60. Porous media 14 may be engaged with the first end 62 either directly via the first end 62 of the cone sealing structure or via a stator 20 engaged with the cone sealing structure 60.

In either configuration (stationary or rotating cone sealing structure 60), seal fluid may be communicated to the porous media 14 of the porous media shaft seal assembly 100 via one or more ports 21*a* and/or passages 21*b* as previously described for other embodiments of the porous media shaft seal assembly 100. The porous media 14 may be configured with sealed surfaces 14*a* and open surfaces 14*b* to retain internal seal fluid pressure, as previously described for other embodiments of the porous media shaft seal assembly 100. Also as previously described for other embodiments, the flow characteristics of the seal fluid may be controlled such that under normal operating conditions, the seal fluid acts against the biasing member 50 and urges the rotor 40 away from the porous media 14. If the flow characteristics of the seal fluid deviate in a predetermined manner (e.g., pressure drop), the force of the biasing member 50 may overcome the force of the seal fluid and cause the rotor 40 to contact the porous media 14, thereby closing the porous media shaft seal assembly 100 and isolating the interior thereof from the exterior thereof. However, other configurations of sealed and open surfaces 14*a*, 14*b* may be used without limitation.

Figure 27C:
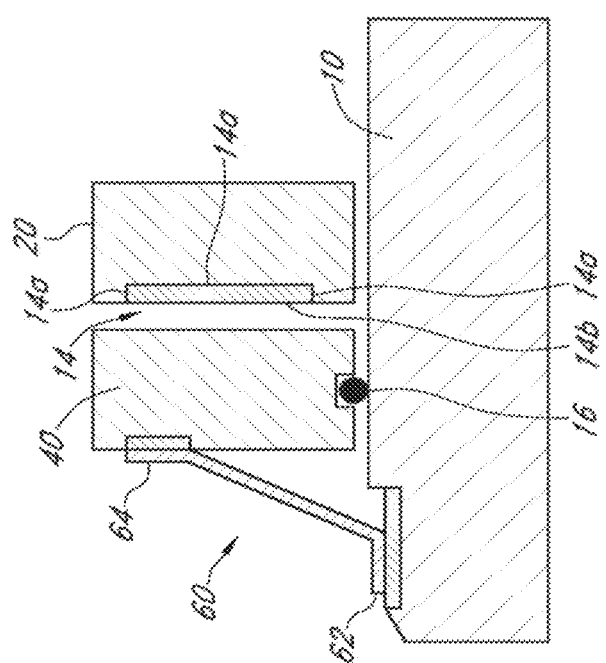
FIG. 27C is an axial, cross-sectional view of another embodiment of a portion of a porous media shaft seal assembly similar to that shown in FIG. 27A.

Another embodiment of a porous media shaft seal assembly 100 using a cone sealing structure 60 is shown in detail in FIG. 27C. This embodiment may function in a manner substantially the same as the embodiment shown in FIG. 27B. However, the porous media 14 may be configured as a ring embedded in the stator 20. The porous media 14 may comprise sealed surfaces 14*a* and open surfaces 14*b*, as previously described for other embodiments of the porous media shaft seal assembly 100. The porous media 14 may be secured to the stator 20 via any suitable method and/or structure, including but not limited to mechanical interference, mechanical fasteners, chemical adhesives, and/or combinations thereof.

It is contemplated that the embodiments shown in FIGS. 27A-27C may be positioned in a stuffing box of a pump or other housing. The cone sealing structure 60 may be used in place of packing, which is typically employed in a stuffing box. Alternatively, the embodiments shown in FIGS. 27A-27C may be mounted outside of a housing 12 rather than within a stuffing box.

In the various embodiments pictured in FIGS. 25-27, the seal fluid flow characteristics (pressure, flow rate, configuration of surface on which seal fluid flow acts) required to overcome the force of the biasing member 50 and separate the porous media 14 from the opposing face produces a pressurized fluid barrier between the porous media 14 and the opposing face. However, unlike mechanical seals found in the prior art, the porous media shaft seal 100 is not sensitive to the clearance between the porous media 14 and the opposing face—as long as there is a clearance, the seal fluid pressure may act to prevent product egress from the porous media shaft seal assembly 100 and contaminant ingress to the porous media shaft seal assembly 100. Furthermore, in the embodiments shown in FIGS. 25-27, the fluid pressure of the product within the vessel (or housing 12) may urge the porous media 14 and opposing face together to close any gap therebetween.

The porous media 14 may be comprised of carbon graphite, or any other suitable natural or synthetic material. It is contemplated that the porous media 14 may have characteristics that allow fluid pressure to be evenly distributed throughout the porous media 14. Additionally, it is contemplated that certain surfaces of the porous media 14 may be configured as sealed surfaces 14*a* such that fluid within the porous media 14 may not exit the porous media 14 via those sealed surfaces 14*a*. The sealant used to prevent seal fluid exiting the porous media 14 may be any suitable sealant for the particular application of the porous media shaft seal assembly 100, and in some applications may be comprised of an epoxy material. The porous media 14 may be engaged with and/or secured to the desired element using any suitable method and/or structure including but not limited to mechanical fasteners, press-fit securement, O-rings 16, chemical adhesives, and/or combinations thereof without limitation.

Typically during operation, the porous media 14 may become saturated with the seal fluid introduced through port 21*a* (which seal fluid may be communicated to the porous media 14 via one or more passages 21*b* in the stator 20 and/or seal passages 34 in the seal 30), and consequently flow out of the porous media 14 through any open surface 14*a* at a generally predictable and predetermined rate. Accordingly, the porous media 14 may provide a throttle to the seal fluid flow regardless of the clearance between the open surfaces 14*a* of the porous media 14 and adjacent components (e.g., the shaft 10 in FIG. 23). This results in the consumption of seal fluid to be dictated by the characteristics of the porous media 14 rather than the clearance between the porous media 14 and the other relevant structure. Accordingly, in such a configuration this clearance may dictate the pressure of the product within the housing 12 and/or other structure that the porous media shaft seal assembly 100 can effectively seal. If air is used as the seal fluid, then the air may act as a lubricant between the porous media 14 and adjacent component. This configuration may allow for lower air consumption and a more predictable rate thereof than that compared with product seals found in the prior art.

Figure 28A:
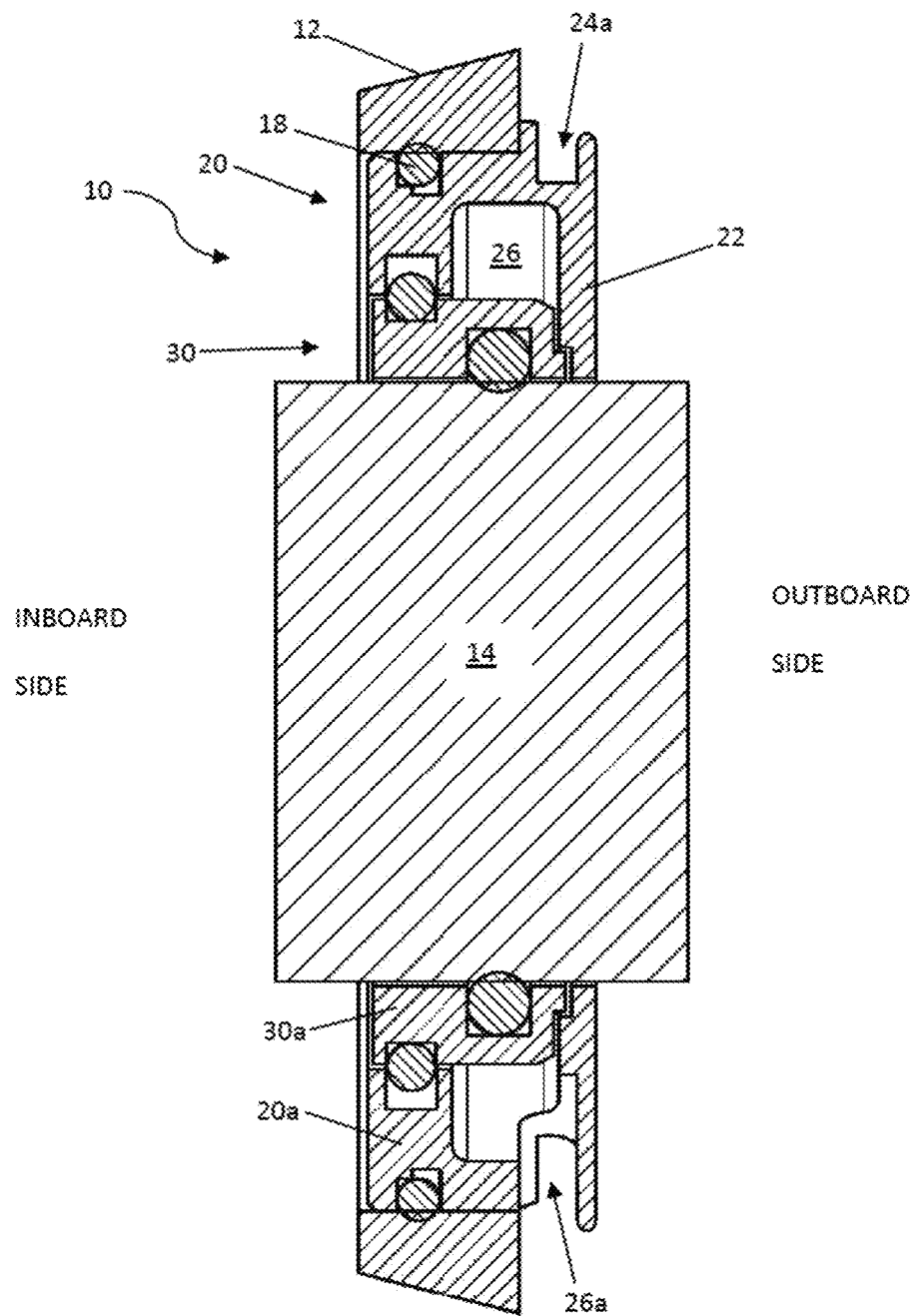
FIG. 28A is an axial, cross-sectional view showing other aspects of a shaft seal assembly.
Figure 28B:
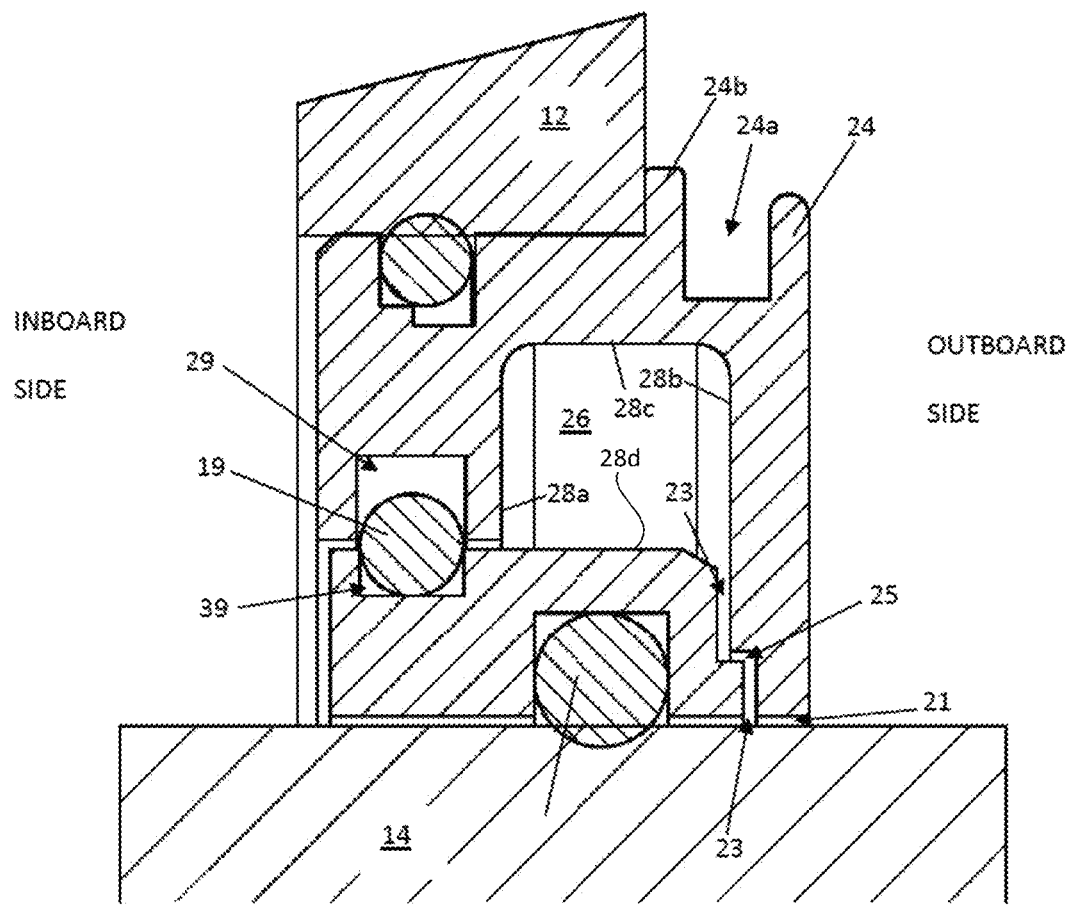
FIG. 28B is an axial, cross-sectional view of a top portion of the shaft seal assembly shown in FIG. 28A.
Figure 28C:
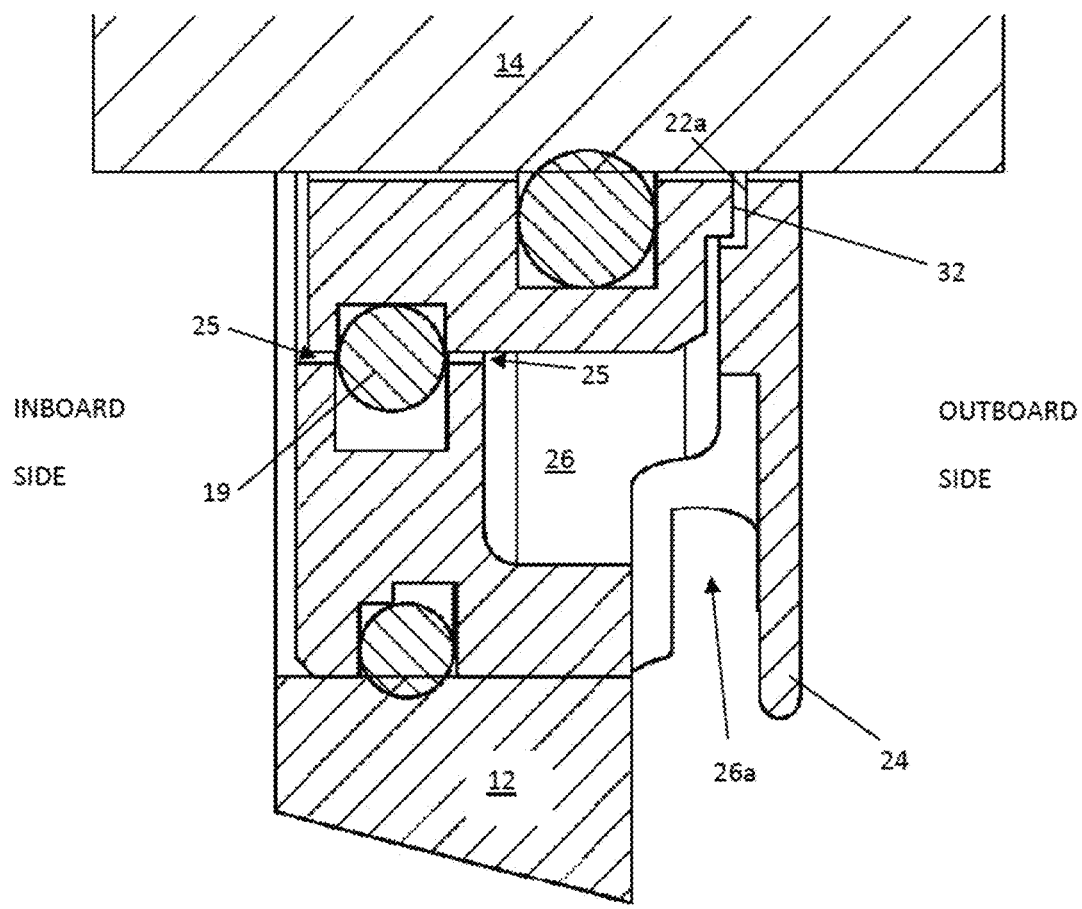
FIG. 28C is an axial, cross-sectional view of a bottom portion of the shaft seal assembly shown in FIG. 28A.
Figure 28D:
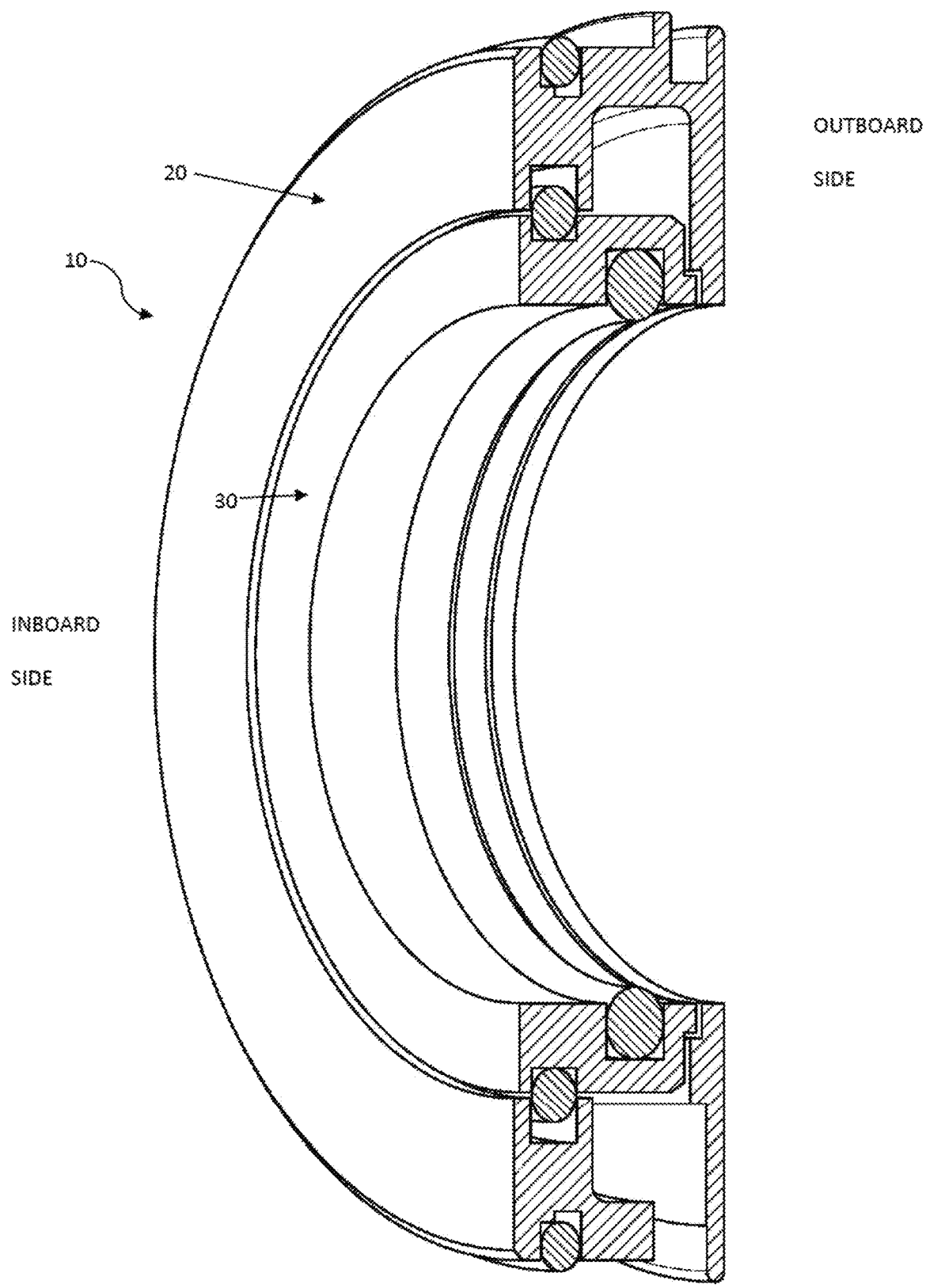
FIG. 28D is a perspective, cross-sectional view of the shaft seal assembly shown in FIGS. 28A-28C.
Figure 28E:
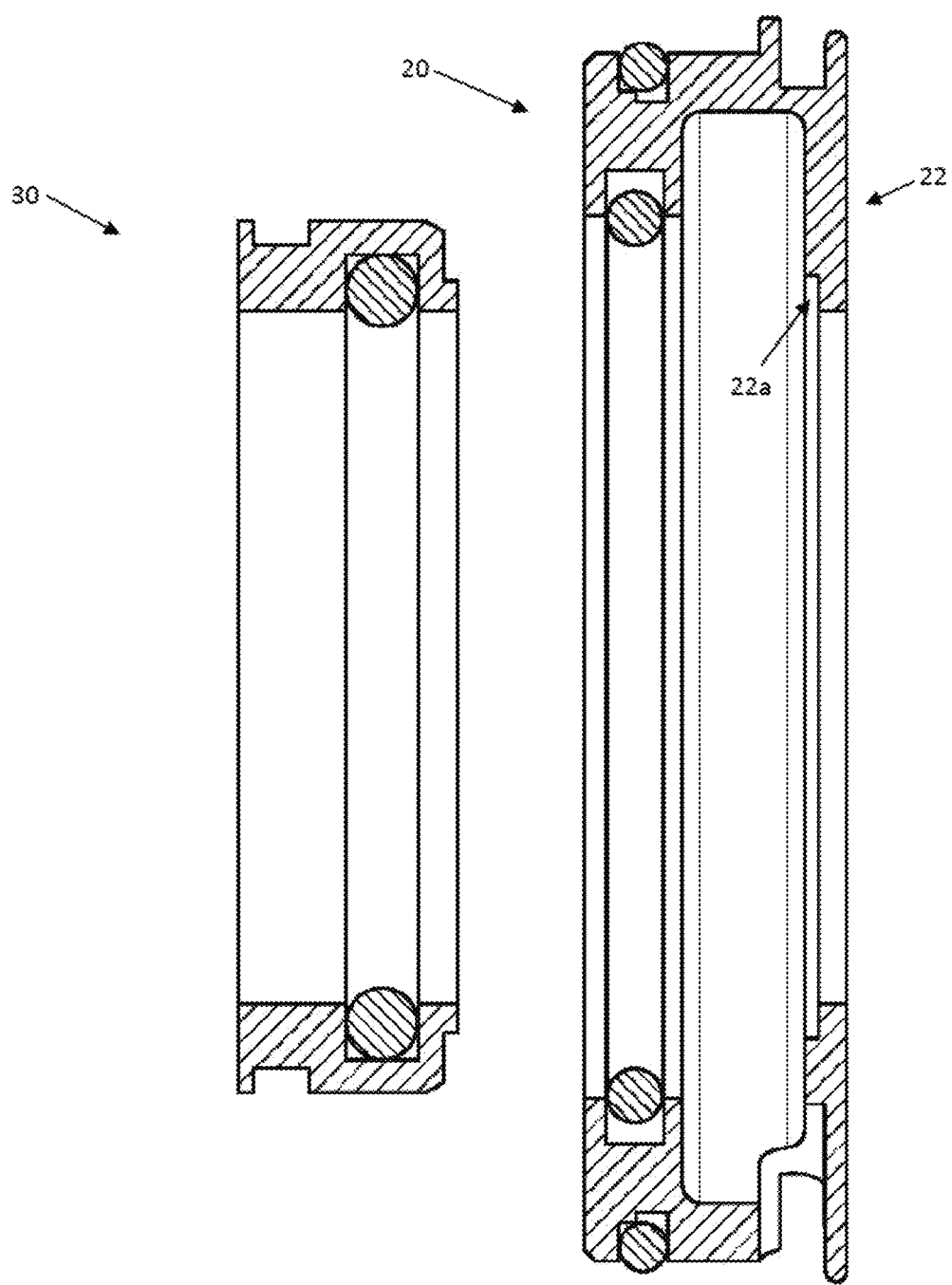
FIG. 28E is a cross-sectional view of the shaft seal assembly shown in FIGS. 28A-28D wherein the stator and rotor have been separated from one another.
Figure 29:
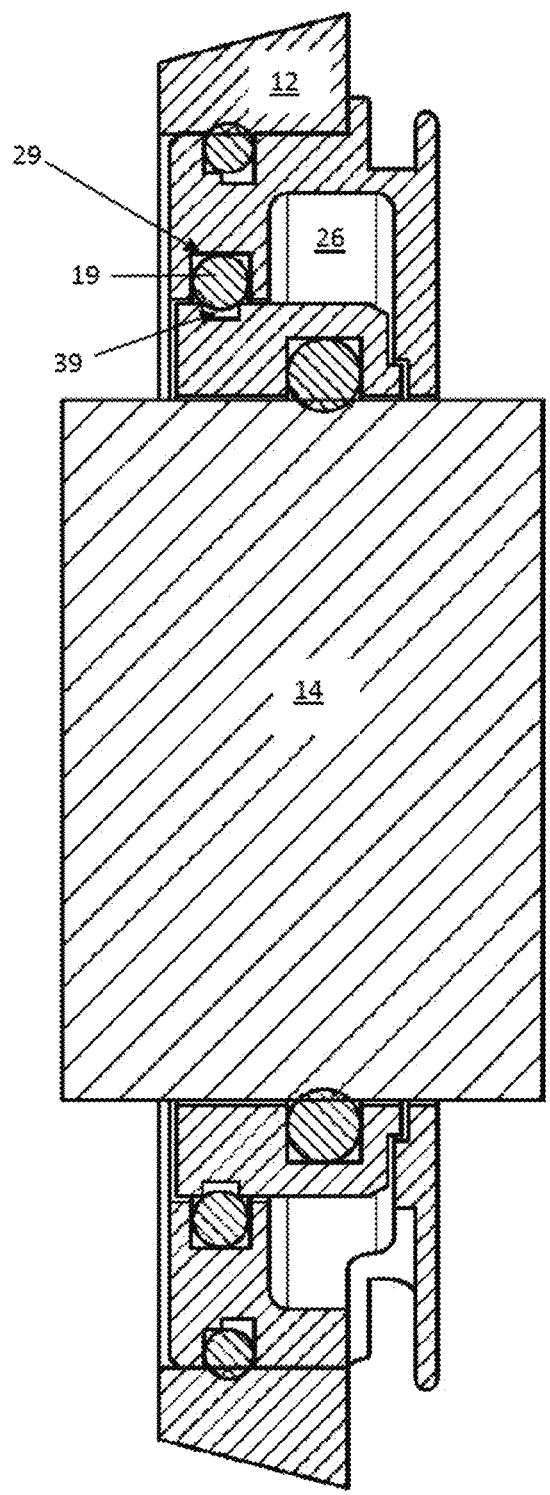
FIG. 29 is an axial, cross-sectional view showing alternative aspects of a shaft seal assembly.
Figure 30:
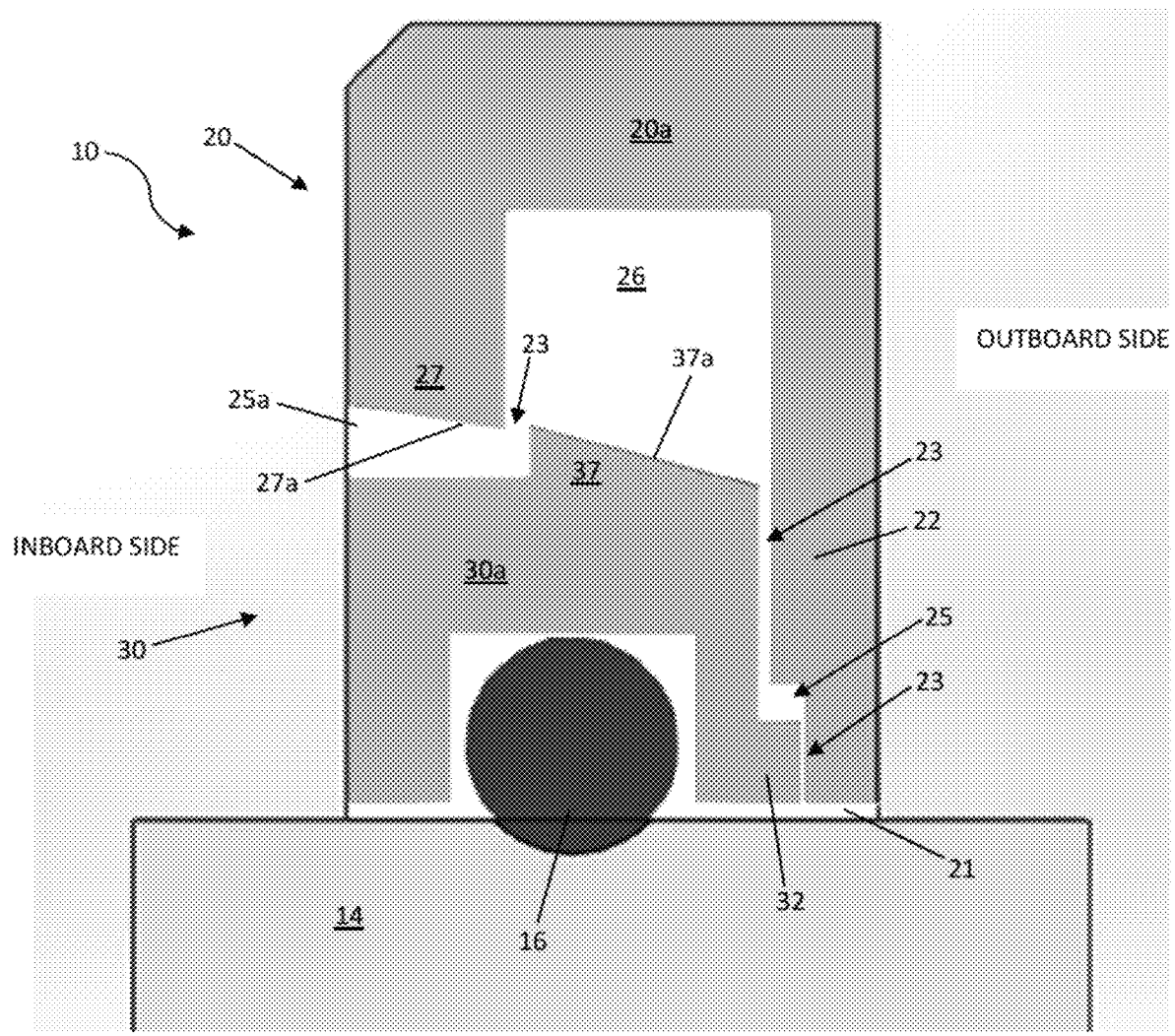
FIG. 30 is an axial, cross-sectional view showing further alternative aspects of a shaft seal assembly.

Additional Aspects of a Shaft Seal Assembly
Element Listing (FIGS. 28-30)

| Description | Element No. |
| --- | --- |
| Shaft seal assembly | 10 |
| Housing | 12 |
| Shaft | 14 |
| Shaft radial gap | 15 |
| Drive ring | 16 |
| Housing radial gap | 17 |
| O-ring | 18 |
| Sealing ring | 19 |
| Stator | 20 |
| Stator main body | 20a |
| Stator/shaft clearance | 21 |

-continued

| Description | Element No. |
| --- | --- |
| Stator inward radial projection | 22 |
| Annular recess | 22a |
| Radial stator/rotor clearance | 23 |
| Barrier | 24 |
| Exterior groove | 24a |
| Shoulder | 24b |
| Axial stator/rotor clearance | 25 |
| Atypical stator/rotor clearance | 25a |
| Collection groove | 26 |
| Drain | 26a |
| Ramped projection | 27 |
| Ramp surface | 27a |
| Inboard wall | 28a |
| Outboard wall | 28b |
| Floor | 28c |
| Stator sealing ring groove | 29 |
| Rotor | 30 |
| Rotor main body | 30a |
| Rotor axial projection | 32 |
| Rotor ramped projection | 37 |
| Rotor ramp surface | 37a |
| Rotor sealing ring groove | 39 |

In an aspect, a shaft seal assembly 10 such as that shown in FIGS. 28-30 herein may be designed specifically to provide a level of protection to the industry standard IP-66 level, as defined by the International Electrotechnical Commission (IEC) IP level of protection codes (IEC standard 60529). In an aspect of a shaft seal assembly 10 shown in FIGS. 28A-30, the shaft seal assembly 10 may achieve this level of performance in a much shorter axial length (in an aspect, 0.375 inches; 9.5 mm, but not limited thereto unless so indicated in the following claims) than has been previously possible. Previously, such a level of protection required an axial length of at least 0.700 inches; 1.778 cm; which is nearly twice as much axial length than what is possible with the shaft seal assembly 10 according to the present disclosure. Providing this level of protection in a smaller shaft seal assembly 10 allows the IP-66 level of protection to be applied to smaller size rotating equipment than was possible in the prior art.

In an aspect, the shaft seal assembly 10 shown in FIGS. 28-30 may comprise a stator 20 and a rotor 30. Generally, the stator 20 and rotor 30 may cooperate so as to prevent ingress of contaminants to a housing 12 having a shaft 14 protruding therefrom, while simultaneously prevent egress of lubricant from the housing 12. The stator 20 of the shaft seal assembly 10 may include a stator main body 20*a* and may be mounted to a relatively stationary housing 14 (which may be a housing 14 having an electrical motor therein, but which housing 14 is not so limited unless so indicated in the following claims).

The rotor 30 may include a rotor main body 30*a* and may be engaged with a rotatable shaft 14 protruding from the housing 12 such that the rotor 30 rotates with a shaft 14. In an aspect, the rotor 30 may be engaged with the shaft 14 via a drive ring 16. The drive ring 16 may be constructed of an elastomeric material and may be configured to seal a shaft radial gap 15 between the shaft 16 and the rotor 30. The drive ring 16 may also be configured to cause the rotor 20 to rotate with the shaft 16.

The stator 20 may be engaged with the housing 12 via an O-ring 18, which O-ring 18 may be employed in conjunction with an interference fit between an external surface of the stator 20 and an interior surface of the housing 12. In an aspect, an exterior portion of the stator 20 may be configured with a stair-step annular channel into which the O-ring 18 may be positioned. The stair-step feature of the annular channel may be positioned on the inboard side of the annular channel such that the outboard side of the annular channel is deeper (i.e., greater in the radial dimension) than the inboard side of the annular channel. It is contemplated that such a configuration of an annular channel may ease installation of the shaft seal assembly 10 into a housing 12, while simultaneously providing adequate sealing between the stator 20 and the housing 12 at least in part via the O-ring 18. The O-ring 18 may be constructed of an elastomeric material and may be configured to seal a housing radial gap 17 between the housing 12 and the stator 20. However, the stator 20 may be engaged with and/or secured to a housing 12 and the rotor 30 may be engaged with and/or secured to a shaft 14 using any suitable structures and/or methods (several of which are described above for other embodiments of a bearing isolator 18 and/or shaft seal assemblies 10, 25, 200 and which include but are not limited to mechanical fasteners, chemical adhesives, welding, interference fit, and/or combinations thereof) without limitation unless so indicated in the following claims.

In an aspect of a shaft seal assembly 10 as shown in FIGS. 28-30, the entire rotor 30 may be positioned within a portion of the stator 20, such that the rotor 30 may be effectively encapsulated by the stator 20. That is, the shaft seal assembly 10 may be configured such that the surfaces thereof that are directly exposed to the exterior environment may be surfaces of the stator 20 rather than one or more surfaces of the rotor 30, such that the entire rotor 30 is positioned inboard with respect to at least one surface of the stator 20. It is contemplated that such a configuration may provide for superior sealing attributes in a smaller axial dimension when compared to the prior art.

The shaft seal assembly 10 may be configured to effectively seal (and/or mitigate) contamination from entering the housing 12. In an aspect, an exterior stator inward radial projection 22 may form a stator/shaft clearance 21 between the distal end of the exterior stator inward radial projection 22 and the shaft 14. The resulting stator/shaft clearance 21 may be configured as a close gap seal clearance between the exterior stator inward radial projection 22 and the shaft 14, which close gap seal clearance may be between 0.018 inches (0.457 mm) and 0.007 inches (0.178 MM). This close gap seal clearance may serve to prevent and/or mitigate ingress of contaminants due to the small space available to such contaminants. Any contaminants that do enter the shaft seal assembly 10 through the stator/shaft clearance 21 may subsequently encounter a first radial stator/rotor clearance 22. In an aspect, a first radial stator/rotor clearance 22 may be formed between generally radially oriented corresponding surfaces of the stator 20 and rotor 30.

The first radial stator/rotor clearance 23 may be in communication with and/or lead to an axial stator/rotor clearance 25. As shown, the first radial stator/rotor clearance 23 may be perpendicular to the axial stator/rotor clearance 25, but other orientations between them may be used (e.g., less than ninety degrees, greater than ninety degrees) without limiting the scope of the shaft seal assembly 10 unless so indicated in the following claims.

The axial stator/rotor clearance 23 may be in communication with and/or lead to a second radial stator/rotor clearance 25. As shown, the second radial stator/rotor clearance 23 may be perpendicular to the axial stator/rotor clearance 25, but other orientations between them may be used (e.g., less than ninety degrees, greater than ninety degrees) without limiting the scope of the shaft seal assembly 10 unless so indicated in the following claims. Generally, it is contemplated that in an aspect of the shaft seal assembly 10 the radial stator/rotor clearance(s) 23 and/or axial stator/rotor clearance(s) 25 may be configured to impede ingress of contaminants into the shaft seal assembly 10.

Contaminants passing through the radial stator/rotor clearance(s) 23 and/or axial stator/rotor clearance(s) 25 may encounter a collection groove 26, which may be formed in the stator 20 and which may be relatively large in size compared to the radial stator/rotor clearance(s) 23 and/or axial stator/rotor clearance(s) 25. For example, in an aspect the axial length of the collection groove 25 may be more than ten times greater than the axial stator/rotor clearance 25 and the radial depth of the collection groove 25 may be more than ten times greater than the radial depth of the radial stator/rotor clearance(s) 23.

Referring now specifically to FIG. 28C, the limit on the inboard radially oriented surface of the collection groove 26 (wherein "inboard" is generally in the direction toward the left side of FIG. 28C and "outboard" is generally in the direction toward the right side of FIG. 28C) may be formed as an inboard wall 28a. The outboard radially oriented surface of the collection groove 26 may be formed as an outboard wall 28b. Together, the inboard wall 28a and the outboard wall 28b may serve to define the width of the collection groove 26 (wherein "width" is used do denote the axial dimension of the collection groove 26). In an aspect of the shaft seal assembly 10, the height of the inboard wall 28a (i.e., radial dimension) may great enough to accommodate a predetermined volume of contaminants within the collection groove 26 without rising to a level that would cause the contaminants to flow over the distal end of the inboard wall 28a.

During operation, it is contemplated that the rotor 30 may impart centrifugal force to contaminants passing through the radial stator/rotor clearance(s) 23 and/or axial stator/rotor clearance(s) 25 and encountering the collection groove 26. This centrifugal force may cause the contaminants to move radially outward to the axially oriented surface of the collection groove 26, which surface is referred to herein as a floor 28c. Referring again to FIGS. 28B and 28C, contaminants in contact with the floor 28c, inboard wall 28a, and/or outboard wall 28b may drain via gravity toward the lower portion of the collection groove 26, and exit the shaft seal assembly through a drain 26a in fluid communication with the collection groove 26. Generally, a drain 26a may be formed in a portion of an exterior groove 24a (which exterior groove 24 is discussed in further detail below) to provide a fluid passageway from the collection groove 26 to an exterior groove 24a.

In an aspect, it may be advantageous to have the drain 26a positioned at the lowest point of the collection groove 26 to aide expulsion of contaminants from the shaft seal assembly 10. In an additional aspect, it may be advantageous to position a barrier 24 adjacent the drain 26a and on the outboard side thereof. Still referring to FIG. 28C, a barrier 24 may be configured as an annular, radially extending wall. It is contemplated that such a barrier 24 may prevent direct ingress of contaminants into the shaft seal assembly 10 and/or collection groove 26. In an aspect of the shaft seal assembly 10, the distal edges of the barrier 24 may be radiused and/or smooth. As shown in FIGS. 28B and 28C, the corners on the distal end of the barrier 24 may be curved or otherwise configured such that there is no right angle thereon. It is contemplated that such a configuration may at least prevent unintended catching and/or snagging of foreign objects on the stator 20, which may increase safety of operators near the shaft seal assembly 10.

Additionally, an annular barrier 24 like that shown in FIGS. 28 and 29 may facilitate an exterior groove 24a, which may be formed as an annular channel on an axially oriented exterior surface of the stator 20. The annular barrier 24 may cooperate with an annular shoulder 24b to form two radially oriented walls of an exterior groove 24a. It is contemplated that an exterior groove 24a may serve to guide contaminants on the outboard face of the housing 12 around the opening of the housing 12 (into which a portion of the shaft seal assembly 10 may be positioned), thereby reducing the likelihood of the contaminants entering the shaft seal assembly 10 via the stator/shaft clearance 21 and/or reducing the exposure of the stator/shaft clearance 21 to contaminants on the outboard face of the housing 12.

The rotor 30 may be formed with a rotor axial projection 32. In an aspect of the shaft seal assembly 10 it is contemplated that a rotor axial projection 32 may cooperate with an annular recess 22a formed in the stator inward radial projection 22 to form one or more radial stator/rotor clearances 23 and/or one or more axial stator/rotor clearances 25. Although an aspect of the shaft seal assembly 10 shown in FIGS. 28 and 29 depicts two radial stator/rotor clearances 23 with one axial stator/rotor clearance 25 positioned therebetween adjacent the rotor axial projection 32, the scope of the present disclosure is not so limited unless indicated in the following claims. Accordingly, in other aspects of the shaft seal assembly 10 additional rotor axial projections 32 may be formed in the rotor 30 along with cooperating additional annular recesses 22a formed in the stator inward radial projection to facilitate additional radial stator/rotor clearances 23 and/or one or more axial stator/rotor clearances 25. For example, and as described in further detail below, a sealing ring 19 between the stator 20 and the rotor 30 may be arranged such that an axial rotor/stator clearance 25 may be positioned on either side of the sealing ring 19.

A phenomena observed in the study of the prior art is that air movement caused by the rotation of the rotor 30 inside a large annular channel (such as the collection groove 26) may cause the formation of a lubricant bubble. The lubricant bubble may form when air movement caused by the rotation the rotor 30 impedes contaminants within the collection groove 26 from exiting the shaft seal assembly 10 via the drain 26a. If the lubricant bubble grows large enough such that it contacts the rotor 30, a seal is likely to fail due to leakage of contaminants through the seal and into the housing 12. Configuring the collection groove 26 such that the radial dimension (depth) thereof is sufficiently large in relation to the diameter of the shaft 14 to prevent and/or mitigate the likelihood of a lubricant bubble contacting the rotor 30 increases the performance capabilities of the shaft seal assembly 10.

In an aspect of the shaft seal assembly 10 shown in FIGS. 28 and 29, the dimensions of the collection groove 26 may be correlated with the overall length (axial dimension) of the shaft seal assembly 10. For example, if the overall length of the shaft seal assembly 10 is 0.375 inches, the collection groove 26 may be configured such that it is 0.150 inches deep and 0.175 inches wide. In such and aspect the width of the collection groove 26 may be approximately 46.7% of the overall length of the shaft seal assembly 10 and the depth of the collection groove 26 may be approximately 40.0% of the overall length of the shaft seal assembly 10. However, the shaft seal assembly 10 may employ other relative dimensions of the overall length of the shaft seal assembly 10 with respect to the depth and/or width of the collection groove 26 without limitation unless so indicated in the following claims.

In an aspect, if the diameter of the shaft 14 is 2.0 inches, the depth of the collection groove 26 may be 0.375 inches. Accordingly, the depth of the collection groove 26 may be approximately 19% of the diameter of the shaft 14. The radial dimension (width) of the collection groove 26 may be 0.375 inches, such that also may be approximately 19% of the diameter of the shaft 14. However, in other aspects of the shaft seal assembly 10 the depth and/or width of the collection groove 26 may be greater than approximately 19% of the diameter of the shaft 14 without limitation unless so indicated in the following claims. And in still further aspects of the shaft seal assembly 10 the depth and/or width of the collection groove 26 may be less than approximately 19% of the diameter of the shaft 14 without limitation unless so indicated in the following claims.

A sealing ring 19 may be positioned between the stator 20 and rotor 30 in an inboard direction with respect to the collection groove 26. The sealing ring 19 may serve as an additional barrier for ingress of contaminants into the housing 12 through the seal and/or from egress of lubricant from the housing 12. A stator sealing ring groove 29 and a rotor sealing ring groove 39 may cooperate to properly position the sealing ring 19 between the stator 20 and rotor 30. In an aspect of the shaft seal assembly 10 shown in FIGS. 28 and 29, the shaft seal assembly 10 may be configured such that an axial stator/rotor clearance 25 leads to the sealing ring 19 from the outboard side thereof, and such that another axial stator/rotor clearance 25 leads to the sealing ring from the inboard side thereof.

In an aspect of the shaft seal assembly 10 shown in FIG. 28, the width (axial dimension) of both the stator sealing ring groove 29 and the rotor sealing ring groove 39 may be approximately equal to one another and to the cross-sectional width of the sealing ring 19. However, as described below other configurations exist, and the specific configuration of the stator sealing ring groove 29 and rotor sealing ring groove 39 in no way limit the scope of the shaft seal assembly 10 unless so indicated in the following claims.

In an aspect, the sealing ring 19 may be static with respect to the rotor 30, and the sealing ring 19 may be configured such that it does not rotate with the shaft 14. One benefit of a static sealing ring 19 that does not rotate with the rotor 30 and/or shaft 14 is that the sealing ring 19 may provide for and function as another close-clearance gap seal in a manner similar to that previously described for the stator/shaft clearance 21. The sealing ring 19 simultaneously may be configured such that it is compliant in that it may allow for the rotor 20 to move both radially and axially with corresponding movements of the shaft 12 while preventing and/or mitigating metal-to-metal contact typically associated with those types of shaft 12 movements. In an aspect, preventing and/or mitigating metal-to-metal contact generally increases the longevity of the shaft seal assembly 10 and/or prevents and/or mitigates premature failure thereof.

In an aspect, the shaft seal assembly 10 shown in FIGS. 28 and 29 may be disassembled, unlike many prior art seals and/or bearing isolators. Additionally, an aspect of this shaft seal assembly 10 having a portion of the stator 20 be the most outboard portion of the entire shaft seal assembly 10 (i.e., 12) may reduce the likelihood of separation of the rotor 30 from the stator 20 during installation of the shaft seal assembly 10 with an equipment housing 12. That is, a portion of the stator inward radial projection 22 immediately adjacent the rotor 30 (i.e., in an aspect, the distal portion of the stator inward radial projection 22) may prevent and/or mitigate unwanted movement of the rotor 30 in an axially outboard direction during installation of the shaft seal assembly 10 as the rotor 30 engages the shaft 14. Because the rotor 30 may be secured to the shaft 14 via a drive ring 16 having elastomeric properties, it is contemplated that in such a configuration a predetermined amount of axially directed force will be required to push the rotor 30 onto the proper position of the shaft 14. It is contemplated that to install the shaft seal assembly 10, a user may apply axially directed force to the outboard surface of the stator inward radial projection 22 (which surface may be collinear with the outboard surface of the barrier 24), and temporary engagement between the inboard surface of the stator inward radial projection 22 and the rotor 30 during installation may communicate that force to the rotor 30 so as to move it axially in the same direction as the stator 20 until the shaft seal assembly 10 is properly located with respect to the housing 12 and the shaft 14. The stator 20 may be formed with an annular shoulder 24b (as previously discussed in relation to an exterior groove 24a that may be formed in the stator 20), which may serve at least in part to properly locate the stator 20 and/or shaft seal assembly 10 with respect to the housing 12.

In an aspect of the shaft seal assembly 10 shown in FIG. 29, the stator sealing ring groove 29 and/or rotor sealing ring groove 39 may be configured differently than those shown in the shaft seal assembly in FIG. 28. The cross-sectional area of the rotor sealing ring groove 39 may be less in an aspect of the shaft seal assembly 10 shown in FIG. 29 than in that shown in FIG. 28. The smaller cross-sectional area may be a result of reduced width (in the axial dimension) and/or depth (in the radial dimension). In this aspect, a smaller volume of a sealing ring 19 is positioned within the rotor sealing ring groove 39 when compared to the volume of a sealing ring 19 positioned within the rotor sealing ring groove 39 shown in FIG. 28. It is contemplated that the rotor sealing ring groove 39 advantageously may be deep enough to prevent the sealing ring 19 from becoming axially misaligned with the rotor sealing ring groove 39 during installation. It is further contemplated that configuring the rotor sealing ring groove 39 with a width approximately equal to the cross-sectional width of the sealing ring 19 may serve to mitigate and/or prevent axially misalignment between the sealing ring 19 and the rotor sealing ring groove 39 during installation of the shaft seal assembly 10.

Furthermore, the cross-sectional area of the stator sealing ring groove 29 may be less in an aspect of the shaft seal assembly 10 shown in FIG. 29 than in that shown in FIG. 28. The smaller cross-sectional area may be a result of reduced width (in the axial dimension) and/or depth (in the radial dimension). In other aspects of a shaft seal assembly 10 the stator sealing ring groove 29 and/or rotor sealing ring groove 39 may be differently configured without limitation unless so indicated in the following claims. Accordingly, the specific amount of O-ring 17 that is positioned within the annular groove in the rotor and the specific amount of O-ring 17 that is positioned within the annular groove in the stator in no way limits the scope of the present disclosure unless so indicated in the following claims. It is contemplated that for some applications of the shaft seal assembly 10, it may be advantageous to increase the depth of the stator sealing ring groove 29 to accommodate radial expansion of the sealing ring 19. However, it may be desirable to ensure that the depth of the stator sealing ring groove 29 is selected such that it is not greater than the cross-sectional width of the sealing ring 19 such that when the sealing ring 19 is at the radial limit of the stator sealing ring groove 29 contaminants do not have a straight path between the sealing ring 19 and the rotor 30 to the inboard side of the shaft seal assembly 10.

Further aspects of a shaft seal assembly 10 are shown in FIGS. 30 & 30A, which provides an axial, cross-sectional view of another shaft seal assembly 10. Generally, this shaft seal assembly 10 shown in FIG. 30 may provide some or all of the benefits and/or features previously described for the shaft seal assemblies 10 disclosed herein, and specifically those shown in FIGS. 28 and 29, without limitation unless so indicated in the following claims.

Accordingly, in an aspect, the shaft seal assembly 10 shown in FIGS. 30 & 30A may comprise a stator 20 and a rotor 30. Generally, the stator 20 and rotor 30 may cooperate so as to prevent ingress of contaminants to a housing 12 having a shaft 14 protruding therefrom, while simultaneously prevent egress of lubricant from the housing 12. The stator 20 of the shaft seal assembly 10 may include a stator main body 20a and may be mounted to a relatively stationary housing 14 (which may be a housing 14 having an electrical motor therein, but which housing 14 is not so limited unless so indicated in the following claims).

The rotor 30 may include a rotor main body 30a and may be engaged with a rotatable shaft 14 protruding from the housing 12 such that the rotor 30 rotates with a shaft 14. In an aspect, the rotor 30 may be engaged with the shaft 14 via a drive ring 16. The drive ring 16 may be constructed of an elastomeric material and may be configured to seal a shaft radial gap 15 between the shaft 16 and the rotor 30. The drive ring 16 may also be configured to cause the rotor 20 to rotate with the shaft 16.

The stator 20 may be engaged with the housing 12 via an O-ring 18, which O-ring 18 may be employed in conjunction with an interference fit between an external surface of the stator 20 and an interior surface of the housing 12. In an aspect, an exterior portion of the stator 20 may be configured with a stair-step annular channel into which the O-ring 18 may be positioned. The stair-step feature of the annular channel may be positioned on the inboard side of the annular channel such that the outboard side of the annular channel is deeper (i.e., greater in the radial dimension) than the inboard side of the annular channel. It is contemplated that such a configuration of an annular channel may ease installation of the shaft seal assembly 10 into a housing 12, while simultaneously providing adequate sealing between the stator 20 and the housing 12 at least in part via the O-ring 18. The O-ring 18 may be constructed of an elastomeric material and may be configured to seal a housing radial gap 17 between the housing 12 and the stator 20. However, the stator 20 may be engaged with and/or secured to a housing 12 and the rotor 30 may be engaged with and/or secured to a shaft 14 using any suitable structures and/or methods (several of which are described above for other embodiments of a bearing isolator 18 and/or shaft seal assemblies 25, 200 and which include but are not limited to mechanical fasteners, chemical adhesives, welding, interference fit, and/or combinations thereof) without limitation unless so indicated in the following claims.

In an aspect of a shaft seal assembly 10 as shown in FIGS. 30 & 30A, the entire rotor 30 may be positioned within a portion of the stator 20, such that the rotor 30 may be effectively encapsulated by the stator 20. That is, the shaft seal assembly 10 may be configured such that the surfaces thereof that are directly exposed to the exterior environment may be surfaces of the stator 20 rather than one or more surfaces of the rotor 30, such that the entire rotor 30 is positioned inboard with respect to at least one surface of the stator 20. It is contemplated that such a configuration may provide for superior sealing attributes in a smaller axial dimension when compared to the prior art.

The shaft seal assembly 10 may be configured to effectively seal (and/or mitigate) contamination from entering the housing 12. In an aspect, an exterior stator inward radial projection 22 may form a stator/shaft clearance 21 between the distal end of the exterior stator inward radial projection 22 and the shaft 14. The resulting stator/shaft clearance 21 may be configured as a close gap seal clearance between the exterior stator inward radial projection 22 and the shaft 14. This close gap seal clearance (having dimensions as previously disclosed herein) may serve to prevent and/or mitigate ingress of contaminants due to the small space available to such contaminants. Any contaminants that do enter the shaft seal assembly 10 through the stator/shaft clearance 21 may subsequently encounter a first radial stator/rotor clearance 22. In an aspect, a first radial stator/rotor clearance 22 may be formed between generally radially oriented corresponding surfaces of the stator 20 and rotor 30.

The first radial stator/rotor clearance 23 may be in communication with and/or lead to an axial stator/rotor clearance 25. As shown, the first radial stator/rotor clearance 23 may be perpendicular to the axial stator/rotor clearance 25, but other orientations between them may be used (e.g., less than ninety degrees, greater than ninety degrees) without limiting the scope of the shaft seal assembly 10 unless so indicated in the following claims.

The axial stator/rotor clearance 23 may be in communication with and/or lead to a second radial stator/rotor clearance 25. As shown, the second radial stator/rotor clearance 23 may be perpendicular to the axial stator/rotor clearance 25, but other orientations between them may be used (e.g., less than ninety degrees, greater than ninety degrees) without limiting the scope of the shaft seal assembly 10 unless so indicated in the following claims. Generally, it is contemplated that in an aspect of the shaft seal assembly 10 the radial stator/rotor clearance(s) 23 and/or axial stator/rotor clearance(s) 25 may be configured to impede ingress of contaminants into the shaft seal assembly 10.

Contaminants passing through the radial stator/rotor clearance(s) 23 and/or axial stator/rotor clearance(s) 25 may encounter a collection groove 26, which may be formed in the stator 20 and which may be relatively large in size compared to the radial stator/rotor clearance(s) 23 and/or axial stator/rotor clearance(s) 25. For example, in an aspect the axial length of the collection groove 25 may be more than ten times greater than the axial stator/rotor clearance 25 and the radial depth of the collection groove 25 may be more than ten times greater than the radial depth of the stator/rotor clearance(s) 23. The collection groove 26 may be configured in any manner as previously described for the shaft seal assemblies 10 shown in FIGS. 28 and 29 without limitation unless so indicated in the following claims.

A limit on the inboard radially oriented surface of the collection groove 26 (wherein "inboard" is generally in the direction toward the left side of FIG. 30 and "outboard" is generally in the direction toward the right side of FIG. 30) may be formed as an inboard wall 28a. The outboard radially oriented surface of the collection groove 26 may be formed as an outboard wall 28b. Together, the inboard wall 28a and the outboard wall 28b may serve to define the width of the collection groove 26 (wherein "width" is used do denote the axial dimension of the collection groove 26). In an aspect of the shaft seal assembly 10, the height of the inboard wall 28a (i.e., radial dimension) may be great enough to accommodate a predetermined volume of contaminants within the collection groove 26 without rising to a level that would cause the contaminants to flow over the distal end of the inboard wall 28a.

The stator 20 may be formed with a ramped projection 27 extending radially inward from the stator main body 20a. The ramped projection 27 may be formed with a ramp surface 27a at the distal end thereof. The rotor 30 may be formed with a rotor ramped projection 37 extending radially outward from the rotor main body 30a, which may be formed with a rotor ramp surface 37a at the distal end of the rotor ramped projection 37. The stator ramped projection 27 and rotor ramped projection 37 may be configured such that a radial stator/rotor clearance 23 exists between them, and such that this radial stator/rotor clearance 23 leads to an atypical stator/rotor clearance 25a in the inboard direction. Generally, at least the ramped projection 27 (and additionally in various aspects, the rotor ramped projection 37) may be oriented inboard with respect to the collection groove 26, but the scope of the present disclosure is not so limited unless so indicated in the following claims such that additional ramped projections 27 and/or rotor ramped projections 37 may be employed.

It is contemplated that in an aspect of the shaft seal assembly 10 shown in FIG. 30, an interaction between the ramped projection 27 and rotor ramped projection 37 may provide a unitizing function to the shaft seal assembly 10, such that a sealing ring 19 may be omitted from a shaft seal assembly 10 so configured. It is contemplated that for a desired performance level, it may be required that the most-outboard located radial stator/rotor clearance 23 and/or the radial stator/rotor clearance 23 on either side of the collection groove 26 be formed as close clearance gap seals, as previously discussed above, and that the relative dimensions of those radial stator/rotor clearances 23 be maintained as much as possible during operation. Accordingly, in certain applications, axial shaft 14 movement in the inboard direction may cause an increase in the axial dimension of one or more of the radial stator/rotor clearances 23, which may in turn decrease the effectiveness of the entire shaft seal assembly 10. Such axial shaft 14 movement may occur as a result of thermal growth, shaft 14 loading, or axial shaft 14 movement may be an essential required feature of the rotating equipment on which the shaft seal assembly 10 is installed, though other causes may result in axial shaft 14 movement.

To prevent or mitigate the negative effects of axial shaft 14 movement, it may be desirable to configure the rotor 30 and/or stator 20 such that the relative axial positions therebetween are secure or relatively secure. In an aspect, this may be accomplished via a ramped projection 27 formed in the stator 20 having a ramp surface 27a on the distal end thereof and a rotor ramped projection 37 formed in the rotor 30 having a rotor ramp surface 37a on the distal end thereof. The ramp surface 27a and rotor ramp surface 37a may be configured such that they are generally parallel with respect to one another, and such that the angle thereof may allow the rotor 30 to be inserted into the stator 20 by moving the rotor 30 in a generally outboard direction with respect to the stator. The ramp surface 27a and rotor ramp surface 37a may be angled such that when an axial force is applied to the rotor 30 in an outboard direction, the stator 20 may be deformed momentarily as the ramp surface 27a and rotor ramp surface 37a interact with one another so as to allow the rotor 30 to be properly positioned within the stator 20 and with properly dimensioned and positioned radial stator/rotor clearance(s) 23. During this insertion process, it is contemplated that it may be essential that the deformation of the stator 20 be within the elastic limits of the material comprising the stator 20 so that once the rotor 30 is in proper position the stator 20 will return to its essentially original size and shape.

It is contemplated that the ramp surface 27a may be angled radially inward in the inboard-to-outboard direction, and that the rotor ramp surface 37a may be angled radially inward in the inboard-to-outboard direction though the scope of the shaft seal assembly 10 is not so limited unless indicated in the following claims. Further, it is contemplated that the ramp surface 27a and rotor ramp surface 37a may be generally parallel, though the scope of the shaft seal assembly 10 is not so limited unless indicated in the following claims.

Once the rotor 30 is properly positioned with respect to the stator 20 and the stator 20 generally returns to its original size and shape, the close clearance gap seals of the radial stator/rotor clearance(s) 23 may be maintained by the formation of a relatively small radial stator/rotor clearance 23 adjacent the overlapping axial surfaces between the largest diameter of the rotor ramped projection 37 and the smallest diameter of the ramped projection 20. This overlap may prevent shaft 14 movement in a generally inboard direction from separating the rotor 30 from the stator 20, which may compromise the effectiveness of the close clearance gap seals formed at a radial stator/rotor clearance(s) 23.

Generally, it may be desirable for the shaft seal assembly 10 to be configured such that if the rotor 30 experiences a force in a generally inboard direction (which may be caused by axial movement of the shaft 14 in a generally inboard direction), the shaft 14 may slide axially with respect to the rotor 30, and the overlapping ramp surface 27a and rotor ramp surface 37a may serve to retain the rotor 30 in the proper position relative to the stator 20. Axial movement of the shaft 14 with respect to the rotor 30 may require slippage at the drive ring 16 or other structure and/or method used to engage the rotor 30 with the shaft 14. Accordingly, it is contemplated that it may be advantageous to provide a sufficient amount of overlap at the ramp surface 27a and rotor ramp surface 37a such that the integrity of the overlap will prevent separation of the stator 20 and rotor 30 while the shaft 14 is slid through the rotor 30 in a generally inboard direction. In an aspect the amount of overlap may be between 0.1 and 1.0 inches without limitation unless so indicated in the following claims. Generally, it is contemplated that an optimal operating condition may be when the rotor 30 turns freely inside the stator 20 in such a manner that forced contact between the rotor 30 and stator 20 at any radial stator/rotor clearance 23 and/or any axial stator/rotor clearance 25 is mitigated and/or prevented.

It is contemplated that optimal functioning of a shaft seal assembly 10 such as those shown in FIGS. 28-30 may require the axial dimension of the most-outboard radial stator/rotor clearance 23 be less than the axial dimension of the radial stator/rotor clearance 23 adjacent outboard wall 28b of the collection groove 26. If the shaft seal assembly 10 is subjected to axial shaft 14 movement in a generally outboard direction during operation, the axial dimension of the radial stator/rotor clearances described immediately above may be reduced and/or eliminated, which may cause frictional dynamic contact between the adjacent surfaces of the stator 20 and rotor 30. This frictional dynamic contact may result in undesired heat generation, or the friction between the static and dynamic surfaces may be sufficient to overcome the friction between the drive ring 16 and shaft 14 and/or friction between the drive ring 16 and rotor 30. Any of these scenarios could result in failure of the shaft seal assembly 10. Accordingly, maintaining a closer clearance at radial stator/rotor clearances 23 described immediately above reduces the surface area that may be subjected to dynamic contact, which may result in less friction and/or heat generation upon contact, which may lower the likelihood of failure.

The materials used to construct the shaft seal assemblies 10, 25, 100, 200, 202 and various elements thereof will vary depending on the specific application, but it is contemplated that bronze, brass, stainless steel, or other non-sparking metals and/or metallic alloys and/or combinations thereof may be especially useful for some applications. Accordingly, the above-referenced elements may be constructed of any material known to those skilled in the art or later developed, which material is appropriate for the specific application of the shaft seal assembly, without departing from the spirit and scope of the shaft seal assemblies 25, 100, 200, 202 as disclosed and claimed herein. Further, the drive ring 16, O-ring 18, and/or sealing ring 19 may be constructed of any material suitable for the specific application of the shaft seal assembly 10, which material includes but is not limited to polymers, synthetic materials, elastomers, natural materials, and/or combinations thereof without limitation unless so indicated in the following claims.

Having described the preferred embodiments, other features of the shaft seal assemblies disclosed herein will undoubtedly occur to those versed in the art, as will numerous modifications and alterations in the embodiments as illustrated herein, all of which may be achieved without departing from the spirit and scope of the shaft seal assemblies disclosed herein. Accordingly, the methods and embodiments pictured and described herein are for illustrative purposes only, and the scope of the present disclosure extends to all method and/or structures for providing the various benefits and/or features of the shaft seal assemblies unless so indicated in the following claims. Furthermore, the methods and embodiments pictured and described herein are no way limiting to the scope of the shoe covering 10 unless so stated in the following claims.

It is understood that the shaft seal assemblies as disclosed herein extends to all alternative combinations of one or more of the individual features mentioned, evident from the text and/or drawings, and/or inherently disclosed. All of these different combinations constitute various alternative aspects of the shaft seal assemblies and/or components thereof. The embodiments described herein explain the best modes known for practicing the shaft seal assemblies and/or components thereof and will enable others skilled in the art to utilize the same. The claims are to be construed to include alternative embodiments to the extent permitted by the prior art.

While the shaft seal assemblies have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. A shaft seal assembly for a shaft, the shaft seal assembly comprising:
    a stator configured to engage a housing, wherein the stator comprises:
        a stator main body;
        a stator inward radial projection extending radially inward from the stator main body, wherein the stator inward radial projection comprises an inboard planar surface and a distal end; and
        a collection groove adjacent the stator inward radial projection, the collection groove having an axial dimension defined by an inboard wall and an outboard wall, the collection groove comprising a floor formed in the stator main body between the inboard wall and the outboard wall; and
    a rotor positioned within the stator, the rotor configured to engage the shaft, the rotor comprising:
        a rotor main body comprising a first radially exterior surface; and
        a rotor axial projection extending from the rotor main body, wherein the rotor axial projection comprises a second radially exterior surface, and wherein the rotor axial projection is positioned adjacent the distal end of the stator inward radial projection, such that the rotor axial projection and an annular recess on the stator inward radial projection cooperate to form an axial clearance between the second radially exterior surface and a radially interior surface that at least partially defines the annular recess;
    wherein the collection groove is further defined such that the first radially exterior surface of the rotor forms a radially inner limit of the collection groove, and wherein the floor formed in the stator between the inboard wall and the outboard wall forms a radially outer limit of the collection groove,
    wherein:
        a first portion of the inboard planar surface of the stator inward radial projection forms the outboard wall of the collection groove, the first portion starting at the floor of the collection groove and ending radially at a same level as the radially inner limit of the collection groove,
        a second portion of the inboard planar surface of the stator inward radial projection faces an outboard surface of the rotor such that a gap adjoining the collection groove is formed between the inboard planar surface of the stator inward radial projection and the outboard surface of the rotor, the second portion starting radially at the same level as the radially inner limit of the collection groove and ending radially inward from the radially inner limit,
        the distal end of the stator inward radial projection is configured to form a close gap seal clearance between the distal end of the stator inward radial projection and an external surface of the shaft, and
        the axial clearance is radially positioned between the close gap seal clearance and the radially inner limit of the collection groove.

2. The shaft seal assembly of claim 1, wherein the stator further comprises a stator ramped projection adjacent the collection groove, wherein an outboard surface of the ramped projection forms the inboard wall of the collection groove, and wherein a stator ramp surface is formed on a distal end of the stator ramped projection.

3. The shaft seal assembly of claim 1, wherein the rotor further comprises a rotor ramped projection extending from the rotor main body, and wherein the first radially exterior surface of the rotor comprises a rotor ramp surface formed on a distal end of the rotor ramped projection.

4. The shaft seal assembly of claim 1,
    wherein the stator further comprises a stator ramped projection adjacent the collection groove, wherein an outboard surface of the stator ramped projection forms an inboard wall of the collection groove, and wherein a stator ramp surface is formed on a distal end of the stator ramped projection,
    wherein the rotor further comprises a rotor ramped projection extending from the rotor main body, and wherein the first radially exterior surface of the rotor comprises a rotor ramp surface formed on a distal end of the rotor ramped projection, and
    wherein the ramp surfaces are configured to contact one another when the rotor is pressed into the stator.

5. The shaft seal assembly of claim 1, wherein the rotor further comprises a rotor radial projection, wherein the rotor radial projection comprises the first radially exterior surface of the rotor, and wherein the rotor radial projection is configured to radially overlap an inboard portion of the stator such that axial movement of the rotor relative to the stator is limited by contact with the inboard wall of the collection groove.

6. The shaft seal assembly of claim 1, wherein the rotor further comprises a rotor radial projection, wherein the rotor radial projection comprises the first radially exterior surface of the rotor, and wherein the rotor radial projection is configured to radially overlap an inboard portion of the stator such that a close-clearance gap seal is defined between the stator and the rotor on at least one end of the collection groove.

7. The shaft seal assembly of claim 1, wherein the rotor further comprises a rotor radial projection, wherein the rotor radial projection the first radially exterior surface of the rotor comprises a rotor ramp surface formed on a distal end of the rotor radial projection, and wherein a radially distal point of the rotor ramp surface and a radial distal point of an inboard portion of the stator overlap by at least 0.1 inches in the radial dimension.

8. The shaft seal assembly of claim 1, wherein the rotor axial projection and an annular recess on the stator inward radial projection further cooperate to form a first and second radial clearance between the stator and the rotor.

9. A shaft seal assembly for a shaft, the shaft seal assembly comprising:
    a stator configured to engage a housing, wherein the stator comprises:
        a stator main body;
        a stator inward radial projection extending radially inward from the stator main body, wherein the stator inward radial projection comprises an inboard planar surface and a distal end;
        a collection groove adjacent the stator inward radial projection, the collection groove having an axial dimension defined by a distance between an inboard wall and an outboard wall, the collection groove comprising a floor formed in the stator main body between the inboard wall and the outboard wall; and an inboard stator radial projection inboard of the collection groove, wherein an outboard planar surface of the inboard stator radial projection forms the inboard wall that at least partially defines the collection groove; and a rotor positioned within the stator, the rotor configured to engage the shaft, the rotor comprising:

a rotor main body; and a rotor radial projection comprising a first radially exterior surface; and a rotor axial projection extending from the rotor main body, wherein the rotor axial projection comprises a second radially exterior surface, and wherein the rotor axial projection is positioned adjacent the distal end of the stator inward radial projection, such that the rotor axial projection and an annular recess on the stator inward radial projection cooperate to form an axial clearance between the second radially exterior surface and a radially interior surface that at least partially defines the annular recess;

wherein the collection groove is further defined such that the first radially exterior surface of the rotor radial projection forms a radially inner limit of the collection groove, wherein the inboard stator radial projection and the rotor radial projection each comprise a distal end, wherein the distal end of at least one of the inboard stator radial projection or the rotor radial projection comprises a ramp surface, wherein:

a first portion of the inboard planar surface of the stator inward radial projection forms the outboard wall that at least partially defines the collection groove, the first portion starting at the floor of the collection groove and ending radially at a same level as the radially inner limit of the collection groove, a second portion of the inboard planar surface of the stator inward radial projection faces an outboard surface of the rotor such that a gap adjoining the collection groove is formed between the inboard planar surface of the stator inward radial projection and the outboard surface of the rotor, the second portion starting radially at the same level as the radially inner limit of the collection groove and ending radially inward from the radially inner limit, the distal end of the stator inward radial projection is configured to form a close gap seal clearance between the distal end of the stator inward radial projection and an external surface of the shaft, and the axial clearance is radially positioned between the close gap seal clearance and the radially inner limit of the collection groove.

10. The shaft seal assembly of claim 9, wherein the distal end of the inboard stator radial projection and the distal end of the rotor radial projection each comprise a ramp surface, wherein the ramp surfaces are configured to contact one another when the rotor is pressed into the stator.

11. The shaft seal assembly of claim 9, wherein the rotor radial projection is configured to radially overlap the inboard stator radial projection such that axial movement of the rotor relative to the stator is limited by contact with the inboard wall of the collection groove.

12. The shaft seal assembly of claim 1, wherein the stator further comprises a drain in fluid communication with the collection groove.

13. The shaft seal assembly of claim 1, wherein a width of the collection groove in an axial dimension is approximately 46.7% of an overall length the shaft seal assembly in an axial dimension.

14. The shaft seal assembly of claim 9, wherein the rotor axial projection and an annular recess on the stator inward radial projection further cooperate to form:

a first radial clearance between the stator and the rotor; and a second radial clearance between the stator and the rotor.

15. The shaft seal assembly of claim 14, wherein:

the distal end of the inboard stator radial projection comprises a first ramp surface; and the radially exterior surface of the rotor radial projection comprises a second ramp surface formed on the distal end of the rotor radial projection.

16. A method of sealing a shaft and a housing by a shaft seal assembly for a shaft, the method comprising:

engaging a stator with a housing, wherein the stator comprises:

a stator main body;

a stator inward radial projection extending radially inward from the stator main body, wherein the stator inward radial projection comprises an inboard planar surface and a distal end, and wherein the distal end of the stator inward radial projection provides is configured to form a close gap seal clearance between the distal end of the stator inward radial projection and an external surface of the shaft; and a collection groove adjacent the stator inward radial projection, the collection groove having an axial dimension defined by an inboard wall and an outboard wall, the collection groove comprising a floor formed in the stator main body between the inboard wall and the outboard wall;

engaging a rotor with the shaft extending from and rotatable with respect to the housing, wherein the rotor comprises:

a rotor main body comprising a first radially exterior surface; and a rotor axial projection extending from the rotor main body, wherein the rotor axial projection comprises a second radially exterior surface, and wherein the rotor axial projection is positioned adjacent the distal end of the stator inward radial projection, such that the rotor axial projection and an annular recess on the stator inward radial projection cooperate to form an axial clearance between the second radially exterior surface and a radially interior surface that at least partially defines the annular recess;

wherein:

the collection groove is further defined such that the first radially exterior surface of the rotor forms a radially inner limit of the collection groove, and the floor formed in the stator between the inboard wall and the outboard wall forms a radially outer limit of the collection groove;

a first portion of the inboard planar surface of the stator inward radial projection forms the outboard wall of the collection groove, the first portion starting at the floor of the collection groove and ending radially at a same level as the radially inner limit of the collection groove;

a second portion of the inboard planar surface of the stator inward radial projection faces an outboard surface of the rotor such that a gap adjoining the collection groove is formed between the inboard planar surface of the stator inward radial projection and the outboard surface of the rotor, the second portion starting radially at the same level as the radially inner limit of the collection groove and ending radially inward from the radially inner limit; and the axial clearance is radially positioned between the close gap seal clearance and the radially inner limit of the collection groove;

collecting a contaminant in the collection groove; and allowing the contaminant to exit the shaft seal assembly via a drain in fluid communication with the collection groove.

\* \* \* \* \*